United States Patent
Rune et al.

(10) Patent No.: US 12,127,270 B2
(45) Date of Patent: Oct. 22, 2024

(54) RECOVERY/FALLBACK AFTER UNSUCCESSFUL 2-STEP RANDOM ACCESS ATTEMPT

(71) Applicant: Telefonaktiebolaget LM Ericsson (publ), Stockholm (SE)

(72) Inventors: Johan Rune, Lidingö (SE); Icaro Leonardo Da Silva, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 199 days.

(21) Appl. No.: 17/617,707

(22) PCT Filed: Jun. 9, 2020

(86) PCT No.: PCT/EP2020/065934
§ 371 (c)(1),
(2) Date: Dec. 9, 2021

(87) PCT Pub. No.: WO2020/249548
PCT Pub. Date: Dec. 17, 2020

(65) Prior Publication Data
US 2022/0240326 A1 Jul. 28, 2022

Related U.S. Application Data

(60) Provisional application No. 62/859,365, filed on Jun. 10, 2019.

(51) Int. Cl.
*H04W 74/08* (2024.01)
*H04W 56/00* (2009.01)
(Continued)

(52) U.S. Cl.
CPC ...... *H04W 74/0841* (2013.01); *H04W 56/001* (2013.01); *H04W 72/046* (2013.01); *H04W 74/0866* (2013.01)

(58) Field of Classification Search
CPC .......... H04W 74/0841; H04W 56/001; H04W 72/046; H04W 74/0866; H04W 48/12;
(Continued)

(56) References Cited

U.S. PATENT DOCUMENTS 9,949,298 B1 * 4/2018 Akoum ................ H04B 7/0695
11,483,054 B2 * 10/2022 Yu ....................... H04W 72/046
(Continued)

FOREIGN PATENT DOCUMENTS

| CN | 109845387 A | 6/2019 |
| WO | 2018082283 A1 | 11/2018 |
| WO | 2020247318 A1 | 12/2020 |

OTHER PUBLICATIONS

Jeon62842344_Specification_May 2, 2019 (Year: 2019).*
(Continued)

*Primary Examiner* — Wutchung Chu
(74) *Attorney, Agent, or Firm* — Weisberg I.P. Law, P.A.

(57) ABSTRACT

A method, system, network node and wireless device for random access are provided. In one or more embodiments, a wireless device is configured to communicate with a network node. The wireless device includes processing circuitry configured to: trigger a random access (RA) process; select a first beam for the RA process, the selected first beam being associated with a two-step RA configuration, a characteristic of the selected first beam being determined to meet a predefined threshold; and perform the RA process associated with the two-step RA configuration using the selected first beam.

25 Claims, 27 Drawing Sheets

(51) Int. Cl.
*H04W 72/044* (2023.01)
*H04W 74/0833* (2024.01)

(58) Field of Classification Search
CPC ........... H04W 74/0833; H04W 74/004; H04W 74/006; H04W 72/1263; H04W 76/11; H04W 24/10; H04W 36/0072; H04W 36/0077; H04B 7/0695; H04B 7/088; H04B 7/0888; H04B 17/318; H04B 17/336; H04B 7/0404; H04B 17/345; H04B 17/382; H04B 7/0408; H04B 7/0617; H04B 7/0639; H04B 7/06952; H04L 5/0048; H04L 5/0053; H04L 5/0023; H04L 5/0094; H04L 5/0051; H04L 25/0226
See application file for complete search history.

(56) References Cited

U.S. PATENT DOCUMENTS

| | | | |
|---|---|---|---|
| 2018/0279186 | A1 | 9/2018 | Park et al. |
| 2018/0323856 | A1* | 11/2018 | Xiong .................. H04B 7/0695 |
| 2019/0132066 | A1 | 5/2019 | Park et al. |
| 2019/0132882 | A1 | 5/2019 | Li et al. |
| 2020/0146069 | A1* | 5/2020 | Chen .................... H04W 52/362 |
| 2020/0221504 | A1* | 7/2020 | Cirik .................... H04L 1/1822 |
| 2020/0252973 | A1* | 8/2020 | Zhang ............... H04W 74/0833 |
| 2020/0275319 | A1* | 8/2020 | Murray ............... H04W 36/304 |
| 2020/0314917 | A1* | 10/2020 | Jeon .................. H04W 74/0833 |
| 2020/0351801 | A1* | 11/2020 | Jeon ...................... H04W 52/48 |
| 2020/0351955 | A1* | 11/2020 | Jeon ...................... H04W 80/02 |
| 2020/0383141 | A1* | 12/2020 | Lei ....................... H04W 56/001 |
| 2021/0345424 | A1* | 11/2021 | Cirik ................. H04W 72/1263 |
| 2021/0392702 | A1* | 12/2021 | Han .................... H04W 74/006 |
| 2022/0007427 | A1* | 1/2022 | Fujishiro ............... H04W 48/16 |
| 2022/0022267 | A1* | 1/2022 | Shi ....................... H04W 72/044 |
| 2022/0053360 | A1* | 2/2022 | Sun ....................... H04W 24/10 |
| 2022/0078849 | A1* | 3/2022 | Han .................... H04W 74/004 |
| 2022/0150956 | A1* | 5/2022 | Xiong .................... H04L 5/0094 |
| 2022/0190906 | A1* | 6/2022 | Haghighat ............ H04W 76/19 |
| 2022/0191944 | A1* | 6/2022 | Reial ................. H04W 72/0466 |

OTHER PUBLICATIONS

Lei62856683_Specification_Jun. 3, 2019 (Year: 2019).*
3GPP TS 38.211 V15.5.0; 3rd Generation Partnership Project; Technical Specification Group Radio Access Network; NR; Physical channels and modulation (Release 15); Mar. 2019; consisting of 96 pages.
3GPP TS 38.300 V15.5.0; 3rd Generation Partnership Project; Technical Specification Group Radio Access Network; NR; NR and NG-RAN Overall Description; Stage 2 (Release 15); Mar. 2019; consisting of 97 pages.
European Search Report dated Jun. 2, 2023 for Application No. 20732801.4, consisting of 7 pages.
International Search Report and Written Opinion dated Aug. 28, 2020 for International Application No. PCT/EP2020/065934 filed Jun. 9, 2020, consisting of 14 pages.
3GPP TSG RAN WG1 #97 R1-1906747; Title: On 2-step RACH Procedure; Agenda item: 7.2.1.2; Source: Nokia, Nokia Shanghai Bell; Document for: Discussion and Decision; Location and Date: Reno, USA May 13-17, 2019, consisting of 23 pages.
3GPP TSG-RAN WG2 Meeting 106 R2-1907733; Title: RACH type switching between 2-steps, 4-steps RACH and CFRA; Agenda Item: 11.13.3; Source: Huawei, HiSilicon; Document for: Discussion, Decision; Location and Date: Reno, Nevada, US, Apr. 13-May 17, 2019, consisting of 7 pages.
3GPP TS 38.3213GPP TS 38.321; 3rd Generation Partnership Project; Technical Specification Group Radio Access Network; NR; Medium Access Control (MAC) protocol specification (Release 15); Mar. 2019, consisting of 78 pages.
European Search Report dated May 29, 2024 for Application No. 20732801.4, consisting of 8 pages.
Chinese Office Action and English summary dated Apr. 29, 2024 for Application No. 202080056843.7, consisting of 13 pages.
3GPP TSG-RAN WG2 Meeting AH1807 R2-1810002; Title: Discussion on RA procedure for msg1-based on-demand SI request; Agenda item: 10.3.1.4.3; Source: Huawei, HiSilicon; Document for: Discussion and Decision; Location and Date: Montreal, Canada, Jul. 2-6, 2018, consisting of 9-pages.
3GPP TSG-RAN5 Meeting #82 R5-191393; Title: Correction to NR test case 7.1.1.1.6—Random access procedure; Source to WG: Huawei, HiSilicon; Source to TSG: R5; Location and Date: Athens, Greece, Feb. 25-Mar. 1, 2019, consisting of 16 pages.
3GPP TSG-WG2 Meeting #106 R2-1906306; Title: MsgB content and format; Source: ZTE, Sanechips; Agenda Item: 11.13.4; Document for: Discussion and decision; Location and Date: USA, Reno, May 17-13, 2019, consisting of 13 pages.
3GPP TSG-RAN WG2 Meeting #106 R2-1906257; Title: On recognition of msgB or msg2; Source: Fujitsu; Agenda Item: 11.13.5; Document for: Discussion and decision; Location and Date: USA, Reno, May 17-13, 2019, consisting of 3 pages.
3GPP TSG RAN WG2 Meeting #106 R2-1908021; Title: Open aspects of the fallback operation; Source: ZTE, Sanechips; Agenda Item: 11.13.3; Document for: Discussion and decision; Location and Date: USA, Reno, May 17-13, 2019, consisting of 4 pages.
Chinese Notice of Allowance and English translation dated Sep. 10, 2024 for Application No. 202080056843.7, consisting of 10 pages.
Hou, Qinglian "Analysis and Simulation of Random Access Process in 3G LTE", May 5, 2010, consisting of 5 pages.

* cited by examiner

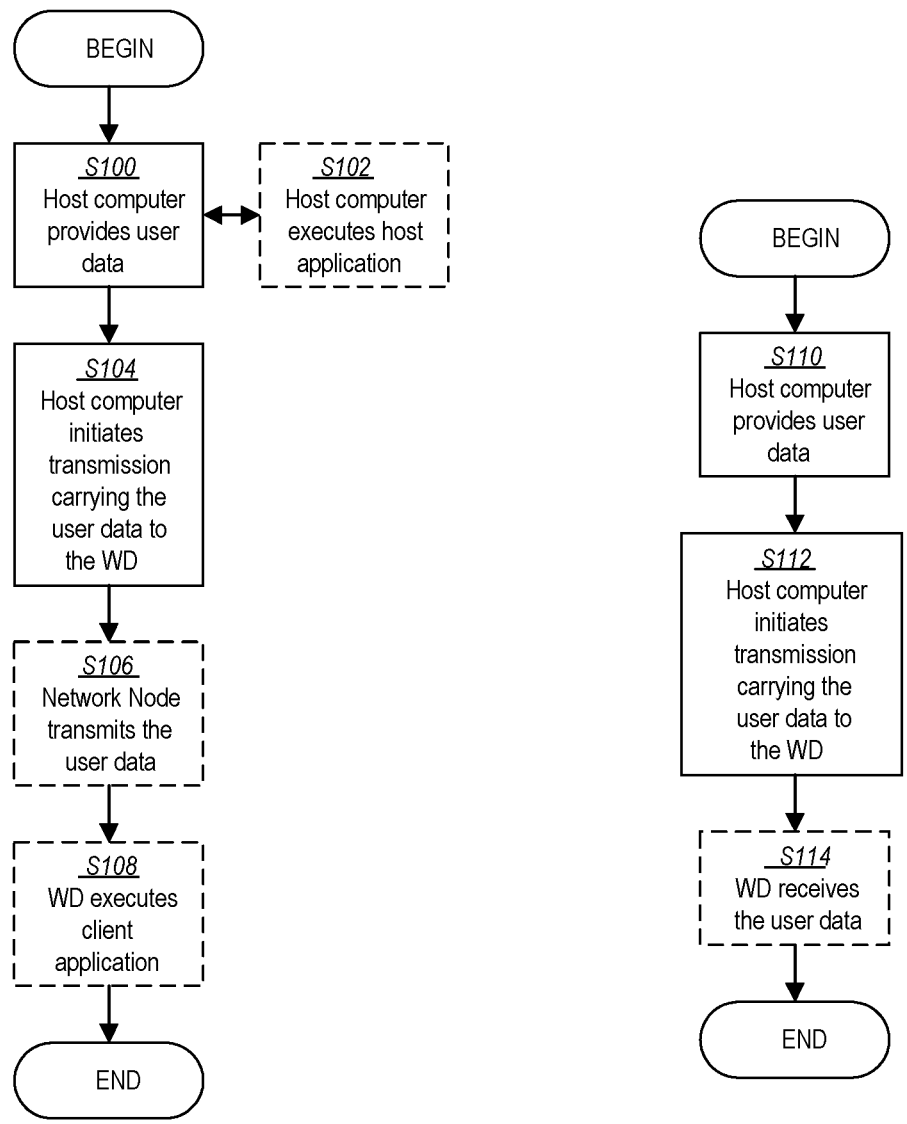

RECOVERY/FALLBACK AFTER UNSUCCESSFUL 2-STEP RANDOM ACCESS ATTEMPT

CROSS-REFERENCE TO RELATED APPLICATIONS

This application is a Submission Under 35 U.S.C. § 371 for U.S. National Stage Patent Application of International Application No.: PCT/EP2020/065934, filed Jun. 9, 2020 entitled "RECOVERY/FALLBACK AFTER UNSUCCESSFUL 2-STEP RANDOM ACCESS ATTEMPT," which claims priority to U.S. Provisional Application No. 62/859,365, filed Jun. 10, 2019, entitled "RECOVERY/FALLBACK AFTER UNSUCCESSFUL 2-STEP RANDOM ACCESS ATTEMPT," the entireties of both of which are incorporated herein by reference.

TECHNICAL FIELD

The present disclosure relates to wireless communications, and in particular, to two-step random access such as recovery and fallback after an unsuccessful two-step random access attempt.

BACKGROUND

Wireless Communication Systems in Third Generation Partnership Project (3GPP)

Referring to the example of a simplified wireless communication system illustrated in FIG. 1, wireless device WD 102, communicates with one or multiple access nodes 103-104, using radio connections 107-108. The access nodes 103-104 are connected to a core node 106. The access nodes 103-104 are part of the radio access network 100.

For wireless communication systems pursuant to the Third Generation Partnership Project (3GPP) Evolved Packet System, EPS (also referred to as Long Term Evolution, LTE, or 4G) standard specifications, such as specified in 3GPP Technical Standard (TS) 36.300 and related specifications, the access nodes 103-104 typically correspond to an Evolved NodeB (eNB) and the network node 106 typically corresponds to either a Mobility Management Entity (MME) and/or a Serving Gateway (SGW). The eNB is part of the radio access network 100, which in this case is the E-UTRAN (Evolved Universal Terrestrial Radio Access Network), while the MME and SGW are both part of the EPC (Evolved Packet Core).

For wireless communication systems pursuant to 3GPP 5G System, 5GS (also referred to as New Radio, NR, or 5G) standard specifications, such as specified in 3GPP TS 38.300 and related specifications, the access nodes 103-104 correspond typically to a 5G NodeB (gNB) and the core node 106 corresponds typically to either an Access and Mobility Management Function (AMF) and/or a User Plane Function (UPF). The gNB is part of the radio access network 100, which in this case is the NG-RAN (Next Generation Radio Access Network), while the AMF and UPF are both part of the 5G Core Network (5GC).

Properties of 5G/NR

A property of the coming 5G system (e.g., NR) is the use of high carrier frequencies, e.g., in the range 24.25-52.6 GHz. For such high frequency spectrum, the atmospheric, penetration and diffraction attenuation properties can be much worse than for lower frequency spectrum. In addition, the receiver antenna aperture, as a metric describing the effective receiver antenna area that collects the electromagnetic energy from an incoming electromagnetic wave, is inversely proportional to the frequency, i.e., the link budget would be worse for the same link distance even in a free space scenario, if omnidirectional receive and transmit antennas are used. This motivates the use of beamforming to compensate for the loss of link budget in the high frequency spectrum. This may be important when communicating with WDs with poor receivers, e.g., low cost/low complexity WDs. Other means for improving the link budget include repetition of the transmissions (e.g., to allow wide beam or omnidirectional transmission) or use of Single Frequency Network transmission from multiple total radiated powers (TRPs) in the same or different cells.

Due to the above described properties, in the high frequency bands, many downlink signals, such as synchronization signals, system information, and paging, which should cover a certain area (i.e., not just targeting a single WD with known location/direction), e.g., a cell, are expected to be transmitted using beam sweeping, i.e., transmitting the signal in one beam at a time, sequentially changing the direction and coverage area of the beam until the entire intended coverage area, e.g., the cell, has been covered by the transmission. Also, in lower carrier frequencies, e.g., ranging from below 3 GHz to 6 GHz, beamforming is envisioned to be used in NR to improve coverage, albeit with fewer beams to cover a cell area.

The signals and channels in New Radio (NR) which correspond to the primary synchronization signal (PSS), secondary SS (SSS), cell specific reference signal (CRS) and physical broadcast channel (PBCH) (which carries the master information block (MIB) and layer 1 generated bits) in LTE, i.e., PSS, SSS, demodulation reference signal (DMRS) for PBCH and PBCH (sometimes referred to as NR-PSS, NR-SSS, DMRS for NR-PBCH and NR-PBCH in NR) are put together in an entity/structure denoted SS Block (SSB) or, with other terminology, SS/PBCH block (the term SS Block is typically used in 3GPP TSG-RAN WG2 (RAN2) while 3GPP TSG-RAN WG1 (RAN1) usually uses the term SS/PBCH block). Hence, SS Block, SSB and SS/PBCH block are three synonyms (although SSB is really an abbreviation of SS Block). The PSS+SSS enables a WD to synchronize with the cell and also carries information from which the Physical Cell Identity (PCI) can be derived. The PBCH part (including demodulation reference signal (DMRS)) of the SSB carries a part of the system information denoted MIB (Master Information Block) or NR-MIB, 8 layer-one generated bits and the SSB index within the SS Burst Set. In high frequencies, SS Blocks will be transmitted periodically using beam sweeping. Multiple such beamformed SS Block transmissions are grouped into an SS Burst Set which constitutes a full beam sweep of SS Block transmissions. When many beams are used, longer gaps, e.g., 2 or 4 slots (where each slot contains 14 OFDM symbols) are inserted into the beam sweep. This effectively creates groups of SS Block transmissions within the SS Burst Set, which, using an obsolete term, could be referred to as SS Bursts.

The Synchronization Signal and PBCH block (SSB) consists of primary and secondary synchronization signals (PSS, SSS), each occupying 1 symbol and 127 subcarriers, and PBCH spanning across 3 OFDM symbols and 240 subcarriers but leaving one symbol in an unused part on some subcarriers in the middle for SSS, as shown in FIG. 2. The possible time locations of SSBs within a half-frame are determined by sub-carrier spacing and the periodicity of the half-frames where SSBs are transmitted as configured by the network. During a half-frame, different SSBs may be transmitted in different spatial directions (i.e., using different beams, spanning the coverage area of a cell). Within the frequency span of a carrier, multiple SSBs can be transmitted. The PCIs of SSBs transmitted in different frequency locations do not have to be unique, i.e., different SSBs in the frequency domain can have different PCIs. However, when an SSB is associated with a remaining minimum system information (RMSI), the SSB corresponds to an individual cell, which has a unique NR cell global identifier (NCGI). Such an SSB is referred to as a Cell-Defining SSB (CD-SSB). A primary cell (PCell) is associated with a CD-SSB located on the synchronization raster.

For PBCH, polar coding is used. Also, the WD may assume a band-specific sub-carrier spacing for the SSB unless a network has configured the WD to assume a different sub-carrier spacing. PBCH symbols carry their own frequency-multiplexed DMRS. Quadrature phase shift keyed (QPSK) modulation is used for PBCH.

Similar to LTE, NR uses OFDM (Orthogonal Frequency Division Multiplexing) in the downlink (i.e., from a network node, gNB, eNB, or base station, to a user equipment or WD). The basic NR physical resource over an antenna port can thus be seen as a time-frequency grid as illustrated in FIG. 3, where a resource block (RB) in a 14-symbol slot is shown. A resource block corresponds to 12 contiguous subcarriers in the frequency domain. Resource blocks are numbered in the frequency domain, starting with 0 from one end of the system bandwidth. Each resource element corresponds to one OFDM subcarrier during one OFDM symbol interval.

Different subcarrier spacing values are supported in NR. The supported subcarrier spacing values (also referred to as different numerologies) are given by $\Delta f=(15\times2^{\alpha})$ kHz where $\alpha\in(0, 1, 2, 3, 4)$. $\Delta f=15$ kHz is the basic (or reference) subcarrier spacing that is also used in LTE.

In the time domain, downlink and uplink transmissions in NR may be organized into equally-sized subframes of 1 ms each similar to LTE. A subframe is further divided into multiple slots of equal duration. The slot length for subcarrier spacing $\Delta f=(15\times2^{\alpha})$ kHz is $\frac{1}{2}^{\alpha}$ ms. There is only one slot per subframe at $\Delta f=15$ kHz and a slot has 14 OFDM symbols.

As may be understood from the above, there is a difference in the time domain structure of L1 of the radio interface between LTE and NR. While LTE always has the same structure, NR has different structures, because it may include different so-called numerologies (which essentially can be translated to different subcarrier spacings (SCSs) and consequent differences in the time domain, e.g., the length of an OFDM symbol). In LTE, the L1 radio interface time domain structure consists of symbols, subframes and radio frames, where a 1 ms subframe consists of 14 symbols (12 if extended cyclic prefix is used) and 10 subframes form a 10 ms radio frame. In NR, the concepts of subframes and radio frames are reused in the sense that they represent the same time periods, i.e., 1 ms and 10 ms respectively, but their internal structures vary depending on the numerology. For this reason, the additional term "slot" is introduced in NR, which is a time domain structure that always contains 14 symbols (for normal cyclic prefix), regardless of the symbol length. Hence, the number of slots and symbols in a subframe and a radio frame vary with the numerology, but the number of symbols in a slot remains consistent. The numerologies and parameters are chosen such that a subframe always contains an integer number of slots (i.e., no partial slots). More details about the physical layer structure are described below.

Downlink transmissions are dynamically scheduled, i.e., in each slot the gNB transmits downlink control information (DCI) about which WD data is to be transmitted to and which resource blocks in the current downlink slot the data is transmitted on. This control information is typically transmitted in the first one or two OFDM symbols in each slot in NR. The control information is carried on the Physical Downlink Control Channel (PDCCH) and data is carried on the Physical Downlink Shared Channel (PDSCH). A WD first detects and decodes PDCCH and if a PDCCH is decoded successfully, the WD then decodes the corresponding PDSCH based on the decoded control information in the PDCCH.

In addition to PDCCH and PDSCH, there may be other channels and reference signals transmitted in the downlink.

Mobility in RRC_CONNECTED State in LTE and NR

An RRC_CONNECTED WD in LTE (also called E-UTRA) can be configured by the network, e.g., a network node, to perform measurements and, upon triggering measurement reports the network may send a handover command to the WD (in LTE an RRConnectionReconfiguration with a field called mobilityControlInfo and in NR an RRCReconfiguration with a reconfigurationWithSync field).

These reconfigurations are actually prepared by the target cell upon a request from the source node (for example over X2 or 51 interface in case of E-UTRA-EPC or Xn or NG interface in case of E-UTRA—5GC/E-UTRA—NGC or NR) and takes into account the existing radio resource control (RRC) configuration the WD has with the source cell (which are provided in the inter-node request). Among other parameters, the reconfiguration provided by the target cell contains all information the WD should need to access the target cell, e.g., random access configuration, a new C-RNTI (radio network temporary identifier) assigned by the target cell and security parameters enabling the WD to calculate new security keys associated with the target cell so that the WD can send a handover complete message on SRB1 (encrypted and integrity protected) based on new security keys upon accessing the target cell.

FIG. 4 summarizes the flow signaling between WD, source node and target node during a handover procedure.

Both in LTE and NR, some principles exist for handovers (or in more general terms, mobility in RRC_CONNECTED):

Mobility in RRC_CONNECTED is Network-based as the network has best information regarding current situation such as load conditions, resources in different nodes, available frequencies, etc. The network can also consider the situation of many WDs in the network, for a resource allocation perspective.

The network prepares a target cell before the WD accesses that cell. Source provides WD with the RRC configuration to be used in the target cell, including SRB1 configuration to send a handover (HO) complete message.

The WD is provided by target node with a target C-RNTI, i.e., target identifies the WD from message 3, Msg3, on MAC level for the HO complete message. Hence, there is no context fetching, unless a failure occurs.

To speed up the handover, the network, e.g., via a network node, provides information on how to access the target, e.g., RACH configuration, so the WD does not have to acquire SI prior to the handover.

The WD may be provided with CFRA resources, i.e., in that case target identifies the WD from the preamble (message 1, Msg1). The procedure may always be optimized with dedicated resources. In HO there might be uncertainty about the final target but also about the timing.

Security is prepared before the WD accesses the target cell, i.e., keys should be refreshed before sending the RRCConnectionReconfigurationComplete (in LTE) or RRCReconfigurationComplete (in NR) message, based on new keys and encryption and integrity protection so the WD can be verified in target cell.

Both full and delta reconfiguration are supported so that the HO command can be minimized.

System Information in NR

In NR, the System Information (SI) is divided into "minimum SI" and "other SI", where the minimum SI is the SI that is required to access the cell. The minimum SI, which consists of the Master Information Block (MIB) and SIB1 (where SIB1 is also referred to as Remaining Minimum System Information, RMSI) is periodically broadcast in a cell, while the other SI may be either periodically broadcast or delivered on demand, e.g., triggered by a random access preamble (also referred to as Msg1) or a random access message 3 (also referred to as Msg3) from a WD in RRC_IDLE or RRC_INACTIVE state or requested via RRC signaling from a WD in RRC_CONNECTED state. If random access preamble (Msg1) transmissions are used, there may be different preambles for requesting different parts (e.g., SIB(s) or groups of SIBs or SI message(s)) of the other SI. If random access message 3 (Msg3) transmissions are used, a WD may in such a message specify which parts (e.g., SIB(s) or groups of SIBs or SI message(s)) of the other SI the WD wants the network to broadcast/transmit.

With the Msg1 solution, reception of one of the concerned dedicated preambles triggers the network to broadcast the requested SIB(s) in accordance with scheduling information in the minimum SI. The network, i.e., the gNB, also transmits a Msg2 to the requesting WD, in response to the Msg1, confirming the successful reception of the Msg1 and confirming that the requested SI will be broadcast. When a WD uses the Msg1 method for request of on-demand SI, WD selects the preamble associated with the desired on-demand SI (as specified in the minimum SI) and transmits this preamble to the network using PRACH resources. The WD then awaits the confirming Msg2 (during a Msg2 window) and, after receiving the confirming Msg2, the WD monitors the downlink for the broadcast of the requested SI in accordance with the scheduling information for the requested SI, as indicated in the minimum SI. The procedure is illustrated in FIG. 5.

With the Msg3 solution, the request procedure begins like a regular random access procedure—i.e., the WD transmits one of the regular (non-dedicated) preambles in Msg1 and receives a regular Msg2 in response, where the Msg2, as any regular Msg2, allocates uplink transmission resources for transmission of Msg3, as well as provides a timing advance indication to enable the WD to transmit Msg3 with correct timing. The SI request included in Msg3 triggers the network to broadcast/transmit the parts of the other SI that are specified in the Msg3 from the WD in accordance with scheduling information in the minimum SI. The network, i.e., the gNB, also transmits a Msg4 confirming the successful reception of the Msg3 and confirming that the requested SI will be broadcast. When a WD uses the Msg3 method for request of on-demand SI, the WD randomly selects one of the regular non-dedicated preambles (as specified in the minimum SI) and transmits this preamble to the network using PRACH resources. The WD then awaits Msg2 (during a Msg2 window) and after receiving the Msg2 the WD transmits Msg3 (using timing advance and uplink transmission resources as indicated in Msg2) and monitors the downlink for the confirming Msg4. After receiving the confirming Msg4, the WD monitors the downlink for the broadcast of the requested SI in accordance with the scheduling information for the requested SI, as indicated in the minimum SI. The procedure is illustrated in FIG. 6 below.

The MIB is transmitted on the PBCH as a part of the SS Block and can thus be found when the WD has detected the PSS/SSS. The MIB in turn includes information that allows the WD to receive system information block, SIB1. And as described above, SIB1 contains scheduling information for the other SIBs, as well as indications of whether they are periodically broadcast or provided on-demand.

Operation in Unlicensed Spectrum

For LTE, 3GPP has specified a standard for LTE based communication in unlicensed spectrum, i.e., co-existing with other systems, such as Wi-Fi. For LTE this is enabled only in tight interworking (e.g., dual connectivity) with a system using licensed spectrum (i.e., regular LTE). The LTE based communication in the unlicensed spectrum in this manner is labeled License-Assisted Access (LAA). For NR, such a system is denoted NR Unlicensed (NR-U). NR-U will be specified both for tight interworking (e.g., dual connectivity) with a regular NR system and as a stand-alone system. The coexistence with other systems (and other NR-U systems/cells) in unlicensed spectrum requires a different kind of operation on the physical layer than in regular NR in licensed spectrum, including, e.g., the Listen Before Talk (LBT) principle, i.e., Clear Channel Assessment (CCA), where a gNB or WD listens to the radio channel to verify that the channel is clear (unused) before accessing the medium for transmission. The essentially uncoordinated operation of different systems in unlicensed spectrum also makes a signal more prone to destructive interference.

Random Access Channel (RACH) Configurations in NR

As with LTE, a random access procedure is described in the NR MAC specifications and parameters are configured by RRC, e.g., in system information or handover (RRCReconfiguration with reconfigurationWithSync). Random access is triggered in many different scenarios, for example, when the WD is in RRC_IDLE or RRC_INACTIVE and wants to access a cell that the WD is camping on (i.e., transition to RRC_CONNECTED).

In NR, RACH configuration is broadcasted in SIB1, as part of the servingCellConfigCommon information element (IE) (with both DL and UL configurations), where the RACH configuration is within the uplinkConfigCommon IE. The exact RACH parameters are within what is called initialUplinkBWP, since this is the part of the UL frequency the WD may access and search for RACH resources.

Example RACH configuration parameters are shown below (as described in 3GPP TS 38.331), focusing primarily on parameters related to the mapping of preamble and RACH resources/occasions, which, in future versions of the specification, potentially also may be mapped to PUSCH resources for MsgA transmission in 2-step random-access.

RACH-ConfigGeneric Information Element

-- ASN1START
-- TAG-RACH-CONFIGGENERIC-START

-continued

```
RACH-ConfigGeneric ::=      SEQUENCE {
  prach-ConfigurationIndex      INTEGER (0..255),
  msg1-FDM            ENUMERATED {one, two, four, eight},
  msg1-FrequencyStart           INTEGER (0..maxNrofPhysicalResourceBlocks-1),
  zeroCorrelationZoneConfig     INTEGER(0..15),
  preambleReceivedTargetPower   INTEGER (-202..-60),
  preambleTransMax              ENUMERATED {n3, n4, n5, n6, n7, n8, n10, n20, n50, n100, n200},
  powerRampingStep              ENUMERATED {d0, dB2, dB4, dB6},
  ra-ResponseWindow             ENUMERATED {sl1, sl2, sl4, sl8, sl10, sl20, sl40, sl80},
  ...
}
-- TAG-RACH-CONFIGGENERIC-STOP
-- ASN1STOP
```

RACH-ConfigGeneric field descriptions msg1-FDM
The number of PRACH transmission occasions FDMed in one time instance. (see 3GPP TS 38.211, clause 6.3.3.2)
msg1-FrequencyStart
Offset of lowest PRACH transmission occasion in frequency domain with respective to PRB 0. The value is configured so that the corresponding RACH resource is entirely within the bandwidth of the UL BWP. (see 3GPP TS 38.211, clause 6.3.3.2).
powerRampingStep
Power ramping steps for PRACH (see 3GPP TS 38.321, 5.1.3).
prach-ConfigurationIndex
PRACH configuration index. For prach-ConfigurationIndex configured under beamFailureRecovery-Config, the prach-ConfigurationIndex can only correspond to the short preamble format, (see 3GPP TS 38.211, clause 6.3.3.2).
preambleReceivedTargetPower
The target power level at the network receiver side (see 3GPP TS 38.213, clause 7.4, 3GPP TS 38.321, clauses 5.1.2, 5.1.3). Only multiples of 2 dBm may be chosen (e.g. -202, -200, -198, . . .).
preamble TransMax
Max number of RA preamble transmission performed before declaring a failure (see 3GPP TS 38.321, clauses 5.1.4, 5.1.5).
ra-Response Window
Msg2 (RAR) window length in number of slots. The network configures a value lower than or equal to 10 ms (see 3GPP TS 38.321, clause 5.1.4). WD ignores the field if included in SCellConfig.
zeroCorrelationZoneConfig
N-CS configuration, see Table 6.3.3.1-5 in 3GPP TS 38.211

RACH-ConfigCommon Information Element

```
-- ASN1START
-- TAG-RACH-CONFIGCOMMON-START
RACH-ConfigCommon ::=         SEQUENCE {
  rach-ConfigGeneric          RACH-ConfigGeneric,
  totalNumberOfRA-Preambles        INTEGER (1..63) OPTIONAL, -- Need S
  ssb-perRACH-OccasionAndCB-PreamblesPerSSB CHOICE {
    oneEighth               ENUMERATED {n4,n8,n12,n16,n20,n24,n28,n32,n36,n40,n44,n48,n52,n56,n60,n64},
    oneFourth               ENUMERATED {n4,n8,n12,n16,n20,n24,n28,n32,n36,n40,n44,n48,n52,n56,n60,n64},
    oneHalf                 ENUMERATED {n4,n8,n12,n16,n20,n24,n28,n32,n36,n40,n44,n48,n52,n56,n60,n64},
    one                     ENUMERATED {n4,n8,n12,n16,n20,n24,n28,n32,n36,n40,n44,n48,n52,n56,n60,n64},
    two                     ENUMERATED {n4,n8,n12,n16,n20,n24,n28,n32},
    four                    INTEGER (1..16),
    eight                   INTEGER (1..8),
    sixteen                 INTEGER (1..4)
  }                                  OPTIONAL,
-- Need M
  groupBconfigured            SEQUENCE {
    ra-Msg3SizeGroupA              ENUMERATED {b56, b144, b208, b256, b282, b480, b640,
```

-continued

```
                                    b800, b1000, b72, spare6, spare5,spare4, spare3,
spare2, spare1},
    messagePowerOffsetGroupB            ENUMERATED { minusinfinity, dB0, dB5,
dB8, dB10, dB12, dB15, dB18},
    numberOfRA-PreamblesGroupA          INTEGER (1..64)
    }                                   OPTIONAL,
-- Need R
    ra-ContentionResolutionTimer        ENUMERATED { sf8, sf16, sf24, sf32, sf40,
sf48, sf56, sf64},
    rsrp-ThresholdSSB         RSRP-Range
OPTIONAL, -- Need R
    rsrp-ThresholdSSB-SUL              RSRP-Range
OPTIONAL, -- Cond SUL
    prach-RootSequenceIndex            CHOICE {
       l839              INTEGER (0..837),
       l139              INTEGER (0..137)
    },
    msg1-SubcarrierSpacing             SubcarrierSpacing
OPTIONAL, -- Cond L139
    restrictedSetConfig       ENUMERATED {unrestrictedSet,
restrictedSetTypeA, restrictedSetTypeB},
    msg3-transformPrecoder             ENUMERATED {enabled}
OPTIONAL, -- Need R
    ...
}
-- TAG-RACH-CONFIGCOMMON-STOP
-- ASN1STOP
```

| RACH-ConfigCommon field descriptions |
|---| messagePowerOffsetGroupB
Threshold for preamble selection. Value in dB. Value minus infinity corresponds
to −infinity. Value dB0 corresponds to 0 dB, dB5 corresponds to 5 dB and so on.
(see 3GPP TS 38.321, clause 5.1.2)
msg1-Subcarrier Spacing
Subcarrier spacing of PRACH (see 3GPP TS 38.211, clause 5.3.2). Only the values 15
or 30 kHz (<6 GHz), 60 or 120 kHz (>6 GHz) are applicable (see 3GPP TS 38.211,
section FFS_Section). If absent, the WD applies the SCS as derived from the prach-
ConfigurationIndex in RACH-ConfigGeneric (see tables Table 6.3.3.1-1 and Table
6.3.3.2-2, 3GPP TS 38.211). The value also applies to contention free random access
(RACH-ConfigDedicated), to SI-request and to contention-based beam failure recovery
(CB-BFR). But it does not apply for contention free beam failure recovery (CF-BFR)
(see BeamFailureRecoveryConfig).
msg3-transformPrecoder
Enables the transform precoder for Msg3 transmission. If the field is absent, the WD
disables the transformer precoder (see 3GPP TS 38.213, clause 8.3)
numberOfRA-PreamblesGroupA
The number of CB preambles per SSB in group A. This determines implicitly the
number of CB preambles per SSB available in group B. (see 3GPP TS 38.321, clause
5.1.1). The setting should be consistent with the setting of ssb-perRACH-
OccasionAndCB-PreamblesPerSSB.
prach-RootSequenceIndex
PRACH root sequence index (see 3GPP TS 38.211, clause 6.3.3.1). The value range
depends on whether L = 839 or L = 139. The short/long preamble format indicated in this
IE should be consistent with the one indicated in prach-ConfigurationIndex in the
RACH-ConfigDedicated (if configured).
ra-ContentionResolutionTimer
The initial value for the contention resolution timer (see 3GPP TS 38.321, clause 5.1.5).
Value sf8 corresponds to 8 subframes, value sf16 corresponds to 16 subframes, and so on.
ra-Msg3SizeGroupA
Transport Blocks size threshold in bit below which the WD may use a contention-based
RA preamble of group A. (see 3GPP TS 38.321, clause 5.1.2)
rach-ConfigGeneric
Generic RACH parameters
restrictedSetConfig
Configuration of an unrestricted set or one of two types of restricted sets, see 3GPP TS
38.211, clause 6.3.3.1.
rsrp-ThresholdSSB
WD may select the SS block and corresponding PRACH resource for path-loss
estimation and (re)transmission based on SS blocks that satisfy the threshold (see 3GPP
TS 38.213)
rsrp-ThresholdSSB-SUL
The WD selects SUL carrier to perform random access based on this threshold (see
3GPP TS 38.321, clause 5.1.1). The value applies to all the BWPs.
ssb-perRACH-OccasionAndCB-PreamblesPerSSB
The meaning of this field is twofold: the CHOICE conveys the information about the

| RACH-ConfigCommon field descriptions |
| --- |
| number of SSBs per RACH occasion (L1 parameter 'SSB-per-rach-occasion'). Value oneEight corresponds to one SSB associated with 8 RACH occasions, value oneFourth corresponds to one SSB associated with 4 RACH occasions, and so on. The ENUMERATED part indicates the number of Contention Based preambles per SSB (L1 parameter 'CB-preambles-per-SSB'). Value n4 corresponds to 4 Contention Based preambles per SSB, value n8 corresponds to 8 Contention Based preambles per SSB, and so on. The total number of CB preambles in a RACH occasion is given by CB-preambles-per-SSB * max(1, SSB-per-rach-occasion). <br> totalNumberOfRA-Preambles <br> Total number of preambles used for contention based and contention free random access in the RACH resources defined in RACH-ConfigCommon, excluding preambles used for other purposes (e.g., for SI request). If the field is absent, the all 64 preambles are available for RA. The setting may be consistent with the setting of ssb-perRACH-OccasionAndCB-PreamblesPerSSB, i.e., it may be a multiple of the number of SSBs per RACH occasion. |

In NR, random access resource selection may be performed within a cell depending on measurements performed on SSBs (Synchornization Signal Blocks) or CSI-RSs. A cell in NR is basically defined by a set (one or more) of these SSBs that may be transmitted in one or multiple downlink beams (where a single or a few SSB(s)/beam(s) are more suitable for lower carrier frequencies, e.g., below 6 GHz, while implementations with many SSBs/berams are more suitable for higher carrier frequencies). For the same cell, these SSBs carry the same physical cell identifier (PCI) and a MIB. For standalone operation, i.e., to support WDs camping on an NR cell, they also carry in SIB1 the RACH configuration, which comprises a mapping between the detected SSB covering the WD at a given point in time and the PRACH configuration (e.g., time, frequency, preamble, etc.) to be used. For that, each of these beams may transmit its own SSB which may be distinguished by an SSB index as illustrated in FIG. 7.

The mapping between RACH resources and SSBs (or CSI-RS) is also provided as part of the RACH configuration (in RACH-ConfigCommon, as shown above). Two settings are relevant here:
- #SSBs-per-PRACH-occasion: ⅛, ¼, ½, 1, 2, 8 or 16, which represents the number of SSBs per RACH occasion; and
- #CB-preambles-per-SSB preambles to each SS-block: within a RACH occasion, how many preambles are allocated.

For example, if the number of SSBs per RACH occasion is 1, and if the WD is under the coverage of a specific SSB, e.g., with SSB index 2, there will be a RACH occasion for that SSB index 2. If the WD moves and is now under the coverage of another specific SSB, e.g., with SSB index 5, there will be another RACH occasion for that SSB index 5, i.e., each SSB detected by a given WD would have its own RACH occasion. Hence, at the network side, upon detecting a preamble in a particular RACH occasion, the network knows which SSB the WD has selected and, consequently, which downlink beam is covering the WD, so that the network can continue the downlink transmission, e.g., random access response (RAR), etc., using that beam. The factor 1 is an indication that each SSB has its own RACH resource i.e., a preamble detected in that RACH resource/occasion indicates to the network which SSB the WD has selection, i.e., which DL beam the network should use to communicate with the WD, such as the one to send the RAR. FIG. 8 is a time frequency diagram of channels and synchronization signals. FIG. 9 is an alternative time frequency diagram of channels and synchronization signals.

For example, if #SSBs-per-PRACH-occasion has a CHOICE equals to ⅛, there will be 8 RACH occasions for each SSB and, if n12 is set, there will be 12 preambles that may be chosen by the WD for that selected SSB, i.e., up to 12 WDs could be multiplexed in the same RACH occasion.

Note that each SS-block typically maps to multiple preambles (different cyclic shifts and Zadoff-Chu roots) within a PRACH occasion, so that it is possible to multiplex different WDs in the same RACH occasions since they may be under the coverage of the same SSB. In a second example, shown below, the number of SSBs per RACH occasion is 2. Hence, a preamble received in that RACH occasion indicated to the network that one of the two beams are being selected by the WD. So either the network has means via implementation to distinguish these two beams and/or should perform a beam sweeping in the downlink by transmitting the RAR in both beams, either simultaneously or, transmitting in one, waiting for a response from the WD, and if absent, transmit in the other. Within a RACH occasion the network can also configure different (sets of) preambles for the different SSBs that map to the RACH occasion, so that the preamble indicates to the network which of the SSB beams that map to the RACH occasion the WD has chosen (and hence in which DL beam the response should be transmitted).

According to 3GPP TS 38.211, random access preambles may only be transmitted in the time resources given by the higher-layer parameter prach-ConfigurationIndex according to Tables 6.3.3.2-2 to 6.3.3.2-4 in 3GPP TS 38.211 and depends on FR1 or FR2 and the spectrum type. Random access preambles can only be transmitted in the frequency resources given by the higher-layer parameter msg1-FrequencyStart.

Beam selection and the mapping to a particular RACH resource for preamble transmission is defined as part of the random access procedure as part of the medium access control (MAC) specifications (3GPP TS 38.321) and is sometimes called RACH resource selection.

See Appendix a for Additional Examples of Random Access Procedure Initialization and Random Access Resource Selection.

WD Actions Upon Expiry of Random Access Response (RAR) Timer in 4 Step Random Access in NR Assuming now that in the first attempt the WD has selected an SSB (based on measurements performed in that cell), has transmitted with initial power a selected preamble associated with the PRACH resource mapped to the selected SSB, and has not received a RAR within the RAR time window (i.e., timer associated to the RAR time window expires). According to the MAC specifications (3GPP TS 38.321), the WD may still perform preamble re-transmission (i.e., maximum number of allowed transmissions not reached).

As in LTE, at every preamble retransmission attempt, the WD may assume the same SSB as the previous attempt and perform power ramping similar to LTE. A maximum number of attempts is also defined in NR, which is also controlled by the parameter PREAMBLE_TRANSMISSION_COUNTER.

On the other hand, different from LTE, at every preamble retransmission attempt, the WD may alternatively select a different SSB, as long as that new SSB has an acceptable quality (i.e., its measurements are above a configurable threshold). In that case, when a new SSB (or, in more general term, a new beam) is selected, the WD does not perform power ramping, but transmits the preamble with a transmit power aiming for the same target reception power at the receiving node (e.g., gNB) as the preceding preamble transmission. This is shown in FIG. 10.

Note that when the WD re-selects a new beam the preamble transmission power may be different from the transmission power used for the preceding preamble transmission, despite the lack of power ramping, because the transmission power is calculated based on the target for the reception power at the receiver and the estimated path loss, where the estimated path loss may be different in different beams.

For that reason, a new variable is defined in the NR MAC specifications (3GPP TS 38.321) called PREAMBLE POWER RAMPING COUNTER, in case the same beam is selected at a retransmission. At the same time, the previous LTE variable still exists in the NR MAC specifications (PREAMBLE_TRANSMISSION_COUNTER), so that the total number of attempts is still limited, regardless if the WD performs at each attempt SSB/beam re-selection or power ramping.

Hence, if the initial preamble transmission, e.g., associated with SSB-2, does not succeed, and the WD selects the same SSB/beam, PREAMBLE_POWER_RAMPING_COUNTER is incremented (i.e., set to 2 in this second attempt) and the transmission power will be:

PREAMBLE_RECEIVED_TARGET_POWER=preamble ReceivedTargetPower+DELTA_PREAMBLE+ 1*PREAMBLE_POWER_RAMPING_STEP;

Else, if instead the WD selects a different SSB/beam, the PREAMBLE_POWER_RAMPING_COUNTER is not incremented (i.e., remains 1) and the transmission power will be as in the first transmission:

PREAMBLE_RECEIVED_TARGET_POWER=preamble ReceivedTargetPower+DELTA_PREAMBLE;

In summary, upon sending a preamble and not receiving a RAR, the WD may either select the same beam and perform power ramping before the next attempt or perform beam re-selection.

Fallback between CFRA and CBRA during beam selection/re-selection in 4-steps RACH (legacy):

This beam selection/re-selection procedure upon the expiry of the RAR timer becomes slightly more complicated when the WD is also configured with Contention-Free Random Access (CFRA) resources, for at least one beam (e.g., a specific SSB and/or CSI-RS), for example, in the case of handovers. As described in the stage-2 specifications (e.g., 3GPP TS 38.300), the following is allowed as possible configurations from network to the WD:

The common RACH configuration for beams in the target cell is only associated with the SSB(s);

The network can have dedicated RACH configurations associated with the SSB(s) and/or have dedicated RACH configurations associated with CSI-RS(s) within a cell;

Possible combinations:
a) Common RACH configuration (only SSBs);
b) Common RACH configuration+Dedicated RACH configuration associated with SSBs;
c) Common RACH configuration+Dedicated RACH configuration associated with CSI-RSs.

The dedicated RACH configuration allocates RACH resource(s) together with a quality threshold to use them. When dedicated RACH resources are provided, they are prioritized by the WD and the WD should not switch to contention-based RACH resources as long as the quality threshold of those dedicated resources is met. The order to access the dedicated RACH resources is up to WD implementation.

Another aspect is the prioritization of CSI-RS based random access resource selection compared to SSB based random access resource selection. What is meant here is that random access resource selection is based on a specific RS type (e.g., SSB) and that the WD performs measurements on that particular RS type to perform beam selection, which implicitly is a random access resource selection.

It is shown how CFRA is prioritized over CBRA and, within each case how CSI-RS based random access is prioritized over SSB based random access:

See Appendix B for examples of section 5.1.2 of 3GPP Technical Standard (TS) 38.321.

Two Step Random Access

The 2-step random access is a possible modification of the regular 4-step random access procedure that has been discussed such as at the TSG-RAN plenary #82 meeting where it was decided that a 2-step random access procedure should be specified for NR (including NR-U, i.e., NR operated in unlicensed spectrum).

This variant of the random access procedure can in brief be described as lumping Msg1 and Msg3 into a single first step, transmitted by the WD in the form of message labeled MsgA followed by a second, concluding step consisting of a combination of Msg2 and Msg4, labeled MsgB. MsgA thus contains a random access preamble transmitted on PRACH transmission resources combined with a transmission of the remainder of MsgA (corresponding to Msg3) on PUSCH transmission resources.

The term "MsgA" may have one or more definitions/interpretations. One interpretation is that it contains Msg1+Msg3, while another interpretation is that MsgA only corresponds to Msg3. According to the former definition, the first step of the 2-step RA procedure thus consists of MsgA, which is divided into two transmissions, one (the preamble) on the PRACH and one (the part of MsgA that corresponds to Msg3) on the PUSCH. With the latter definition, the first step of the 2-step RA procedure instead consists of transmission of a preamble (on PRACH resources) and transmission of MsgA (on PUSCH resources). The former definition seems to have the most support and that is the one used in this disclosure. With this definition, the PUSCH transmission of the first step of the 2-step RA procedure is sometimes referred to as the "payload of MsgA" and another possible term is "the PUSCH part of MsgA". This disclosure introduces the abbreviation $MsgA_{PUSCH}$ to refer to the part of MsgA that is transmitted on the PUSCH.

A comparison between 2-step RA and the legacy RA is shown FIGS. 11-12. One of benefits of 2-step RA is the latency gains. In FIG. 13, the latency calculations for LTE are illustrated. As can be seen, the minimum latency from the WD transmitting the RA preamble in the 4-step legacy procedure until receiving the final response is 13 subframes (preamble in x, RAR in x+3, Msg3 in x+3+6, Msg4 in x+3+6+4).

Depending on the numerology or TTI duration that is used in NR, this will result in a latency not exceeding 13 ms until the RA procedure is completed. In the 2-step procedure shown below, the corresponding minimum latency is 4 subframes, i.e., 4 ms (MsgA (i.e., preamble+MsgA$_{PUSCH}$ in x, MsgB (i.e., Msg2+Msg4) in x+4), even when assuming the long processing delays specified currently for LTE. Hence, the 2-step procedure could lead to a reduction of approximately factor 3 compared to the 4-step procedure. Even when NR achieves shorter processing times than LTE, the 2-step RA procedure offers significant latency reduction compared with the legacy 4-step procedure. FIG. 14 is a diagram of latency for a two-step RA procedure.

According to some proposals for the yet to be written specification of 2-step RA, there may be an association between the random access preamble and the PUSCH transmission resources to be used for MsgA$_{PUSCH}$. Such preamble-PUSCH resource associations could potentially be one-to-one or even one-to-many.

Hence, there may be a set of preambles that are dedicated for use for 2-step RA in a cell. Alternatively, separate PRACH resources (e.g., time/frequency resources) may be provided for 2-step RA. In the latter case, there may for instance be N frequency multiplexed PRACH resources (i.e., occurring simultaneously but on different frequencies, e.g., different subcarriers), where M (M≤N) of these PRACH resources are associated with regular 4-step RA, while the remaining N-M PRACH resources are associated with 2-step RA.

In RAN2 #105bis, the following was discussed:

Criteria on whether the WD uses 2-step RACH or 4-step RACH should be clearly specified.

The start of the msgB reception window is after the PUSCH transmission opportunity of msgA. Details are for further study (FFS), i.e., currently undefined, for 2-step RACH and fallback.

If CCCH SDU was included in MsgA, then the contention resolution may be based on the contention resolution ID included in MsgB. FFS for other conditions.

Other Discussions 1. 2-step RACH is applicable for Msg3 based SI request.
2. 2-step RACH is applicable for CB BFR. FFS for CFRA A 2-step RA reduces the access delay and, for NR-U, also reduces the number of times the channel has to be accessed through a listen before talk (LBT) process. However, there is a cost in terms of transmission resources, since PUSCH transmission resources used for the transmission of MsgA-PUSCH (e.g., an RRCSetupRequest message, an RRCResumeRequest message or a HO Complete like message, such as RRCReconfigurationComplete) have to be allocated for each 2-step RA occasion, regardless whether they are used or not. In addition, the MsgAPUSCH transmissions are not very resource-efficient in themselves, because they are transmitted without dynamic link adaptation (i.e., since, excluding the preamble on the PRACH, this is the first transmission to the network, a default configuration is used). Hence, 2-step RA, including configuration of 2-step RA occasions (PRACH resources and PUSCH resources), may be used with care and methods for selectively applying the 2-step RA based on relevant criteria may be desired.

Due to different tradeoffs in terms of load, network efficiency and latency, it is described herein that for a given target cell, for example, on a per beam basis (e.g., SSB or CSI-RS resource), the WD may be configured with:

2-steps CFRA;
2-steps CBRA;
4-steps CFRA; or
4-steps CBRA.

Any combinations of these, e.g., 2-step CBRA and 4-step CFRA in a given beam;

In initial 3GPP releases, 2-steps CFRA may not be supported, i.e., one may have the following as a likely combination, e.g., for a given SSB or CSI-RS being selected:

2-step CBRA+4-step CFRA+4-step CBRA.

At least in the case of CFRA, that may be available only for a subset of beams (e.g., a subset of specific SSBs for a target cell, a subset of specific CSI-RSs for a target cell, etc.), while 2-step CBRA and 4-step CBRA may be configured for all subsets. FIG. 15 is an example of an RA selection method.

Flexible configurations and how the WD may perform resource selection depending on the various possible configurations are described herein. In terms of prioritizations, multiple configurations may be provided for the same selected beam or even making the WD prioritize a certain beam for which a particular configuration is available, e.g., 2-step RA.

Further, this only addresses the initial resource selection for the first RA preamble transmission attempt, based on the provided configuration. In other words, it remains unclear what kind of prioritization should be performed in case the WD tries a first method (e.g., 2-step RA) for initial resource selection and that is not successful.

Some high-level discussions occurred in RAN2 #106 regarding fallback between 2-step RA and 4-step RA, mainly, concerning the detection of the failure (which is performed via the reception of a RAR) and that possibility. The following are agreements from those discussions:

From RAN2 perspective, 2-step RACH selections can be based on indicating to all WDs via SIB, or dedicated configuration in RRC_CONNECTED/INACTIVE/IDLE states. FFS if radio quality is used for 2-step RACH selection.

From RAN2 perspective, for msgA retransmission (i.e., preamble and PUSCH) assume that the WD retries on 2-step RACH.

FFS whether the WD can fallback to 4-step RACH after certain time. RAN1 to determine whether the preamble transmission performance for 2-step RACH and 4-step RACH is the same.

. . .

For CCCH, MsgB can include the SRB RRC message. The format may be designed for both with and without RRC message.

. . .

Network response to msgA (i.e., msgB/msg2) can include the following:

a) SuccessRAR;
b) FallbackRAR; and/or
c) Backoff Indication.
    FFS: format of successRAR and whether successRAR is split into more than one message and format of fallbackRAR and whether legacy msg2 can be reused for fallbackRAR Upon receiving the fallbackRAR, the WD may proceed to msg3 step of 4-step RACH procedure FallbackRAR may contain the following fields
a) RAPID;
b) UL grant (to retransmit the msgA payload). FFS on restrictions on the grant and WD behavior if different grant and rebuilding;
c) TC-RNTI; and
d) TA command From RAN2 perspective, no further offset is used for the start of msgB monitoring window (i.e., no offset is used to cover the RRC processing delay and/or F1 delay).

The WD 22 may monitor for a response message using the single msgB agreed window.

MsgB Containing the succcessRAR May not be Multiplexed with the Legacy 4-Step RACH RAR in the Same MAC PD Despite these agreements and discussions, much remains unresolved with respect to, for example, 2-step RA error and fallback cases. For example, left unresolved is what happens in case of contention free random access (CFRA) (e.g., if a 4-step CFRA configuration is available in parallel with the 2-step RA, e.g., 2-step CBRA). Prioritizations and how priority works in conjunction with resource selection upon fallback (e.g., whether the WD must always try the same beam or whether the WD is allowed to re-select another beam, or even another RS type, etc.) are open issues that remain unresolved.

SUMMARY

Some embodiments advantageously provide methods and WDs for recovery and fallback after an unsuccessful two-step random access attempt.

Some embodiments include methods at a wireless device (WD) (also referred to herein as a User Equipment—UE) for performing random access including fallback actions upon detection of an unsuccessful completion of a 2-step random access attempt. The WD actions may comprise:
selecting random access resources upon triggering random access and selecting a beam, e.g., an SSB or a CSI-RS resource, with associated random access configuration(s), and initiating 2-step RA configuration if the selected beam has available configuration for 2-steps RA and fulfills conditions for performing 2-step RA);
detecting an unsuccessful attempt to perform 2-step RA (e.g., by reception of a RAR-like message such as fallback RAR, instead of a MsgB, by the expiry of a timer supervising the response to MsgA, or by receiving a MsgB containing contention resolution information. One example is a WD Contention Resolution Identity medium access control (MAC) control element (CE), indicating that the MsgB is intended for another WD (i.e., contention resolution failure));
determining suitable fallback actions or other reactions to the detected failure, based on configuration and/or current conditions; and
performing the determined fallback actions or other reactions to the detected failure.

Fallback actions may either be prepared (controlled by an explicit indication from the network) for example, may fall back to 4-step RA (e.g., if the network responds to MsgA with a RAR-like message) or unprepared fallback (uncontrolled, without explicit indication from the network) (e.g., if the WD does not receive a RAR-like message). The fallback actions, or other reactions, may include:

re-initiation of the 2-step RA procedure (with or without power ramping) using the 2-step RA configuration of the same beam;
initiating 4-step CFRA (if a configuration is available) (with or without power ramping) using the 4-step CFRA configuration of the same beam;
fallback to 4-step CBRA (with or without power ramping) using the 4-step CBRA configuration of the same beam; or
fallback to beam (re)selection and re-initiation of a random access procedure (2-step RA, 4-step CFRA or 4-step CBRA) using the RA configuration associated with an alternative beam.

With the methods and/or processes described herein, the WD can properly fallback from 2-step RA to 4-step RA when such fall back is beneficial. In some cases, it may be possible to try again a 2-step RA (e.g., in the same beam or a different beam with available 2-step RA configurations and resources and with good radio conditions) or to only try to perform 4-step RA (in case a more robust fallback procedure is desired), e.g., in the same beam.

According to one aspect of the disclosure, a wireless device is configured to communicate with a network node. The wireless device includes processing circuitry configured to: trigger a random access (RA) process; select a first beam for the RA process, the selected first beam being associated with a two-step RA configuration, a characteristic of the selected first beam being determined to meet a predefined threshold; and perform the RA process associated with the two-step RA configuration using the selected first beam.

According to one or more embodiments of this aspect, the processing circuitry is further configured to: receive system information; and determine whether the selected first beam is associated with the two-step RA configuration based at least on the system information, the two-step RA configuration corresponding to a mapping of the selected first beam to a physical uplink shared channel, PUSCH, configuration. According to one or more embodiments of this aspect, the selected first beam is selected from a plurality of beams, a subset of the plurality of beams being associated with the two-step RA configuration. According to one or more embodiments of this aspect, the subset of the plurality of beams are one of a subset of synchronization signal blocks, SSBs, beams and a set of channel state information reference signal, CSI-RS, beams.

According to one or more embodiments of this aspect, the subset of SSBs beams are associated with contention free RA resources for contention free RA. According to one or more embodiments, at least one other beam of the plurality of beams is not associated with the two-step RA configuration. According to one or more embodiments of this aspect, at least one of the subset of beams are associated with contention based RA, the contention free RA is prioritized over the contention based RA. According to one or more embodiments of this aspect, the characteristic of the selected first beam is a channel quality and the predefined threshold is a channel quality threshold.

According to one or more embodiments of this aspect, the processing circuitry is further configured to: determine a step of the two-step RA process has failed; and in response to determining a step of the two-step RA process has failed, perform one of: retransmit an uplink shared channel portion of a message A, msgA, as an uplink shared channel message in a four step RA process; and re-attempt the two-step RA process at least in part by performing beam reselection. According to one or more embodiments of this aspect, the processing circuitry is further configured to determine the step of the two-step RA process has failed based on one of: an absence of a response to the msgA receiving a random access response, RAR, message that includes fallback information; and receiving a message B, msgB, containing first information indicating that the step of the two-step RA process has failed.

According to one or more embodiments of this aspect, the fallback information includes an indication that the step of the two-step RA process has failed. According to one or more embodiments of this aspect, the first information is contention resolution information. According to one or more embodiments of this aspect, the retransmission is performed based on reselection of a beam from the plurality of beams, the reselection includes using contention-free RA resources configured for one of channel state information reference signal, CSI-RS, and synchronization signal block, SSB.

According to another aspect of the disclosure, a method implemented by a wireless device that is configured to communicate with a network node is provided. A random access (RA) process is triggered. A first beam for the RA process is selected where the selected first beam is associated with a two-step RA configuration, and where a characteristic of the selected first beam is determined to meet a predefined threshold. The RA process associated with the two-step RA configuration is performed using the selected first beam.

According to one or more embodiments of this aspect, system information is received, and a determination is performed as to whether the selected first beam is associated with the two-step RA configuration based at least on the system information, and where the two-step RA configuration corresponds to a mapping of the selected first beam to a physical uplink shared channel, PUSCH, configuration. According to one or more embodiments of this aspect, the selected first beam is selected from a plurality of beams, a subset of the plurality of beams being associated with the two-step RA configuration. According to one or more embodiments of this aspect, the subset of the plurality of beams are one of a subset of synchronization signal blocks, SSBs, beams and a set of channel state information reference signal, CSI-RS, beams.

According to one or more embodiments of this aspect, the subset of SSBs beams are associated with contention free RA resources for contention free RA. According to one or more embodiments of this aspect, at least one other beam of the plurality of beams is not associated with the two-step RA configuration. According to one or more embodiments of this aspect, at least one of the subset of beams are associated with contention based RA, the contention free RA is prioritized over the contention based RA.

According to one or more embodiments of this aspect, the characteristic of the selected first beam is a channel quality and the predefined threshold is a channel quality threshold. According to one or more embodiments of this aspect, a step of the two-step RA process is determined to have failed, and in response to determining a step of the two-step RA process has failed, perform one of: retransmitting an uplink shared channel portion of a message A, msgA, as an uplink shared channel message in a four step RA process; and re-attempting the two-step RA process at least in part by performing beam reselection. According to one or more embodiments of this aspect, the determination that the step of the two-step RA process has failed is based on one of: an absence of a response to the msgA; receiving a random access response, RAR, message that includes fallback information; and receiving a message B, msgB, containing first information indicating that the step of the two-step RA process has failed.

According to one or more embodiments of this aspect, the fallback information includes an indication that the step of the two-step RA process has failed. According to one or more embodiments of this aspect, the first information is contention resolution information. According to one or more embodiments of this aspect, the retransmission is performed based on reselection of a beam from the plurality of beams where the reselection includes using contention-free RA resources configured for one of channel state information reference signal, CSI-RS, and synchronization signal block, SSB.

According to another aspect of the disclosure, a network node configured to communicate with a wireless device is provided. The network node includes processing circuitry configured to: associate a plurality of beams with a plurality of random access, RA, configuration, a first beam of the plurality of beams being associated with a two-step RA configuration; and perform an RA process using the first beam based on the two-step RA configuration associated with the first beam.

According to one or more embodiments of this aspect, the processing circuitry is further configured to transmit system information, the system information indicating the plurality of RA configurations. According to one or more embodiments of this aspect, a subset of the plurality of beams are associated with the two-step RA configuration. According to one or more embodiments of this aspect, the subset of the plurality of beams are one of a subset of synchronization signal blocks, SSBs, beams and a set of channel state information reference signal, CSI-RS, beams According to one or more embodiments of this aspect, the subset of SSBs beams are associated with contention free RA resources for contention free RA. According to one or more embodiments of this aspect, at least one of the subset of beams are associated with contention based RA, the contention free RA is prioritized over the contention based RA. According to one or more embodiments of this aspect, at least one other beam of the plurality of beams is not associated with the two-step RA configuration.

According to one or more embodiments of this aspect, the processing circuitry is further configured to one of: receive a transmitted uplink shared channel portion of a message A, msgA, as an uplink shared channel message in a four step RA process; and determine a beam reselection occurred, the beam selection being associated with a re-attempt to perform the two-step RA process. According to one or more embodiments of this aspect, the processing circuitry is further configured to: determine a two-step RA process has failed; and in response to the determination that the two-step RA process has failed, one of: transmit a random access response, RAR, message that includes fallback information; and transmit a message B, msgB, containing first information indicating that the step of the two-step RA process has failed. According to one or more embodiments of this aspect, the fallback information includes an indication that the step of the two-step RA process has failed. According to one or more embodiments of this aspect, the first information is contention resolution information.

According to another aspect of the disclosure, a method implemented by a network node that is configured to communicate with a wireless device is provided. A plurality of beams as associated with a plurality of random access, RA, configuration, where a first beam of the plurality of beams is associated with a two-step RA configuration, and an RA process using the first beam is performed based on the two-step RA configuration associated with the first beam.

According to one or more embodiments of this aspect, transmitting system information is transmitted where the system information indicates the plurality of RA configurations. According to one or more embodiments of this aspect, a subset of the plurality of beams are associated with the two-step RA configuration. According to one or more embodiments of this aspect, the subset of the plurality of beams are one of a subset of synchronization signal blocks, SSBs, beams and a set of channel state information reference signal, CSI-RS, beams According to one or more embodiments of this aspect, the subset of SSBs beams are associated with contention free RA resources for contention free RA. According to one or more embodiments of this aspect, at least one of the subset of beams are associated with contention based RA, the contention free RA is prioritized over the contention based RA. According to one or more embodiments of this aspect, at least one other beam of the plurality of beams is not associated with the two-step RA configuration.

According to one or more embodiments of this aspect, a transmitted uplink shared channel portion of a message A, msgA, is received as an uplink shared channel message in a four step RA process, and a beam reselection is determined to have occurred where the beam selection is associated with a re-attempt to perform the two-step RA process. According to one or more embodiments of this aspect, a two-step RA process is determined to have failed, and in response to the determination that the two-step RA process has failed, one of: transmitting a random access response, RAR, message that includes fallback information; and transmitting a message B, msgB, containing first information indicating that the step of the two-step RA process has failed. According to one or more embodiments of this aspect, the fallback information includes an indication that the step of the two-step RA process has failed. According to one or more embodiments of this aspect, the first information is contention resolution information.

According to another aspect of the disclosure, a computer storage medium storing computer instructions that, when executed by a processor, cause the processor to control and/or perform any one of the above methods.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 18 is a flowchart illustrating exemplary methods implemented in a communication system including a host computer, a network node and a wireless device for executing a client application at a wireless device according to some embodiments of the present disclosure;

FIG. 19 is a flowchart illustrating exemplary methods implemented in a communication system including a host computer, a network node and a wireless device for receiving user data at a wireless device according to some embodiments of the present disclosure;

DETAILED DESCRIPTION

Figure 1:
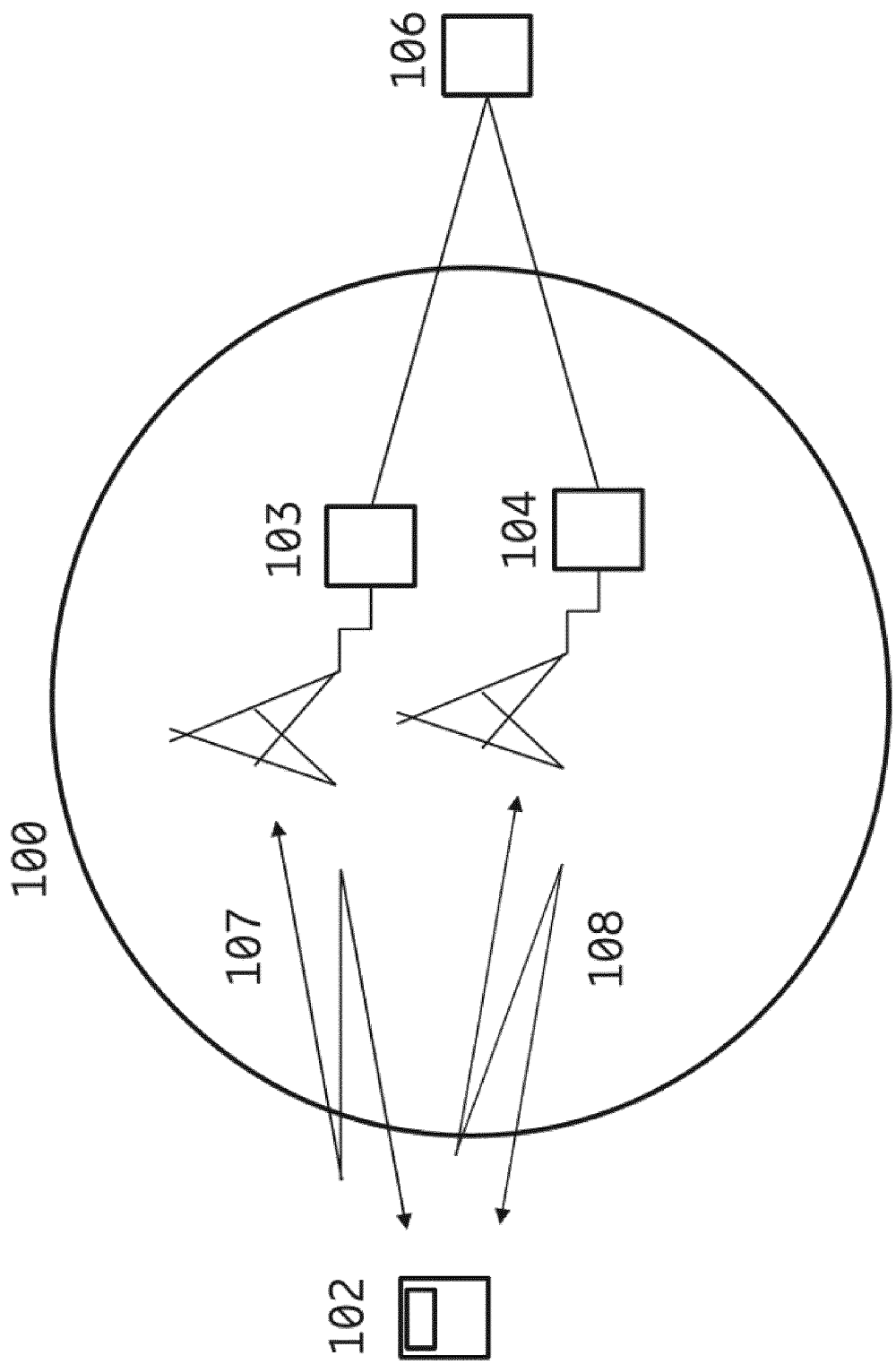
FIG. 1 is an example of a simplified wireless communication system.

Before describing in detail exemplary embodiments, it is noted that the embodiments reside primarily in combinations of apparatus components and processing steps related to two-step random access such as recovery and fallback after an unsuccessful two-step random access attempt. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

As used herein in one or more embodiments, "network" refers to network node.

The non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g., for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments include beam selection as one of the steps. In the context of some embodiments, a "beam" may be a reference signal that the WD detects and that has an associated identifier. For example, if embodiments are applied to the 3GPP NR standard, the reference signal described above may either be an SS Block (SSB), i.e., a Synchronization Signal and PBCH Block or a CSI-RS.

When it is mentioned that a selected beam maps to a 2-step random-access configuration, it means that the WD has performed measurements on a RS (that may be beamformed, like an SSB or CSI-RS resource), selected that beam according to at least a criterion, and that RS configuration may have a mapping (e.g., in the configuration provided to the WD) to a 2-step random-access configuration.

Figure 2:
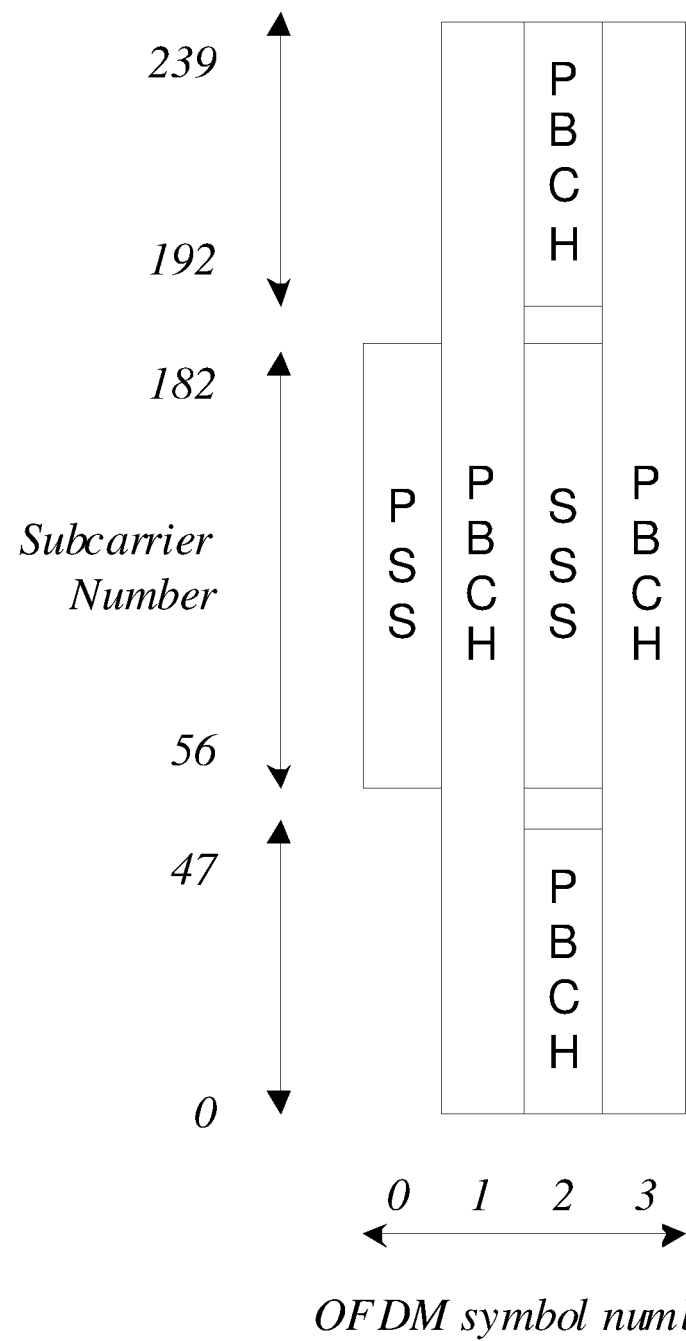
FIG. 2 illustrates channels and synchronization signals.
Figure 3:
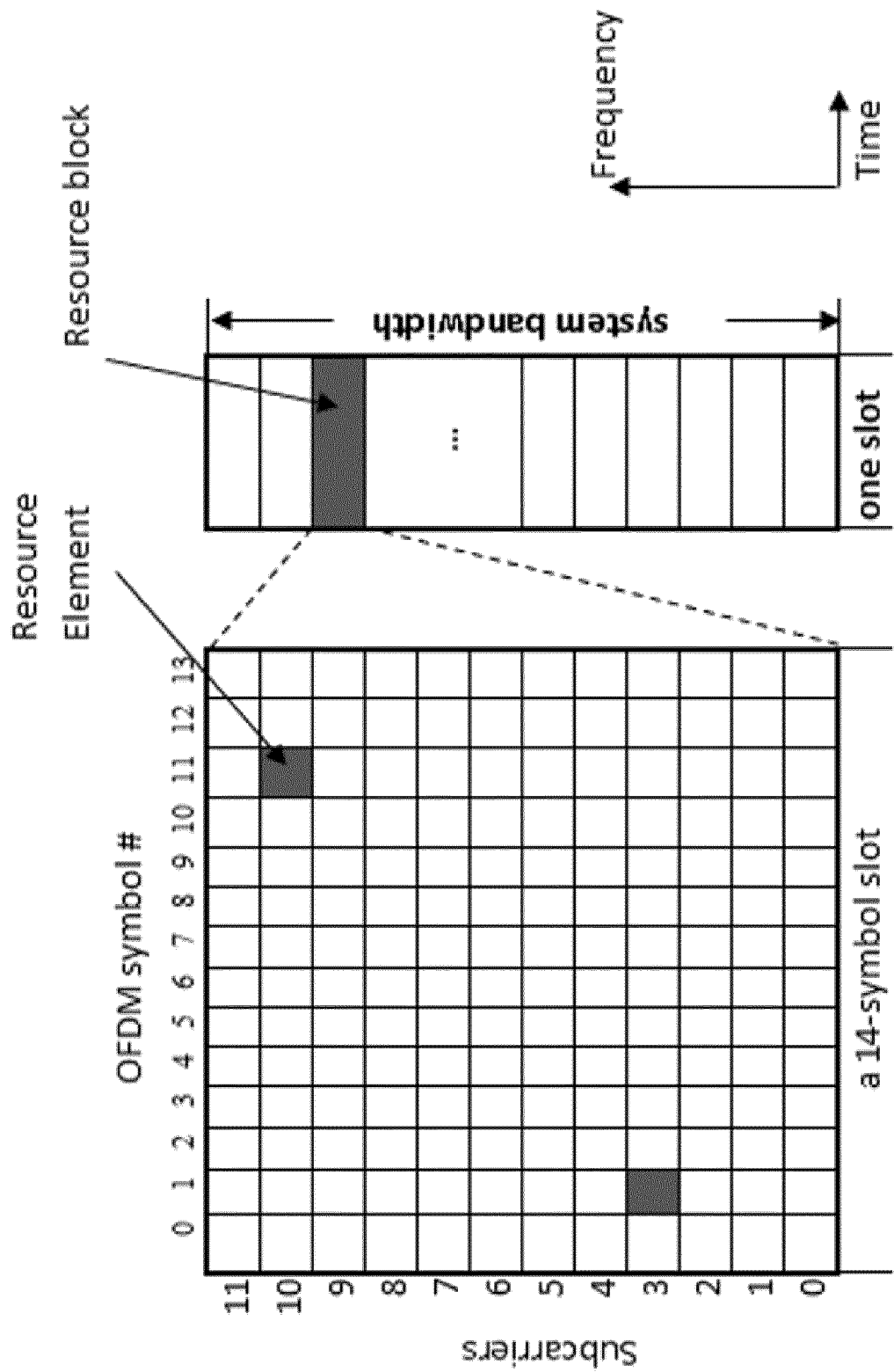
FIG. 3 is a time frequency grid.
Figure 4:
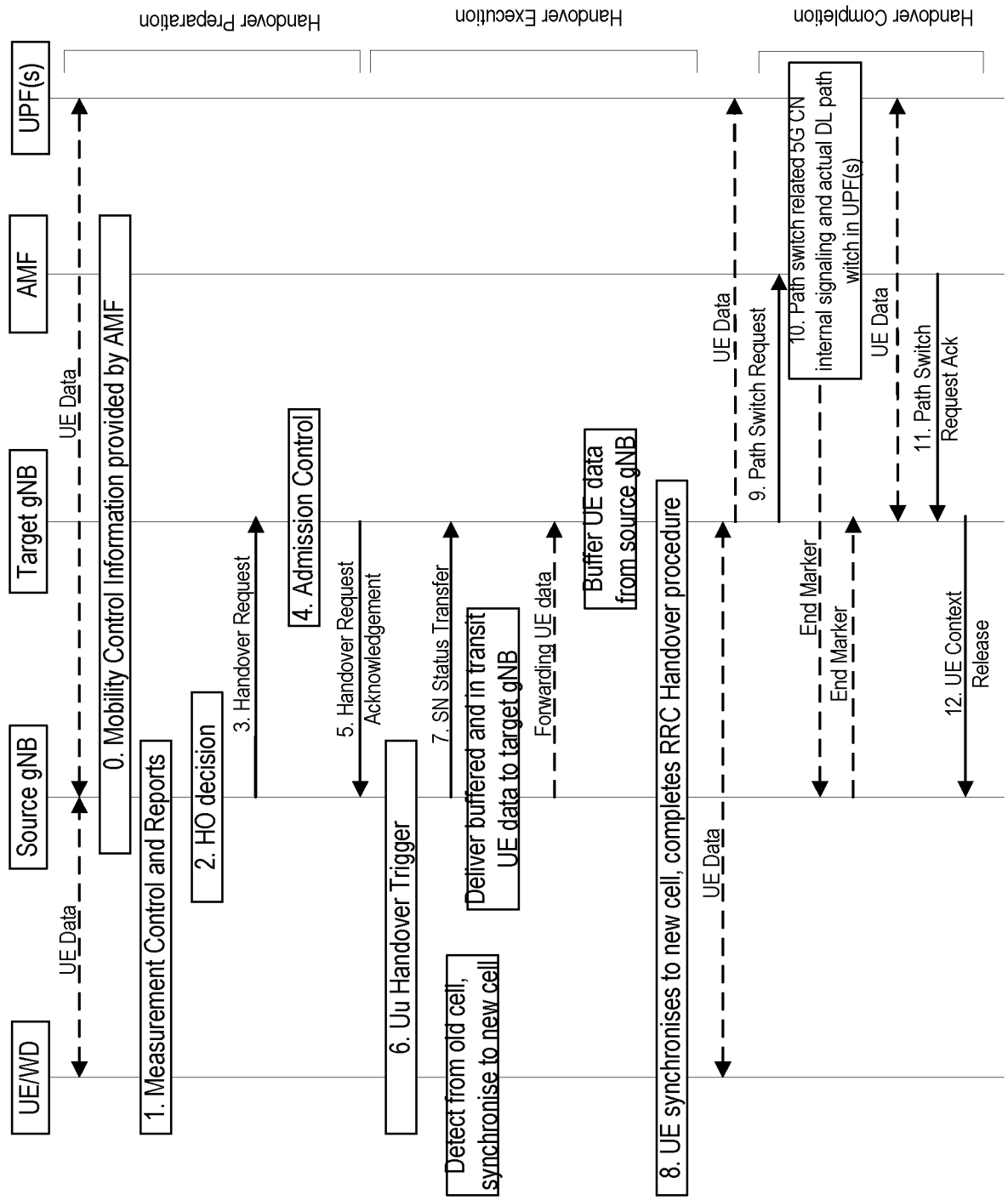
FIG. 4 summarizes signaling between a WD, a source node and a target node during handover procedure.
Figure 5:
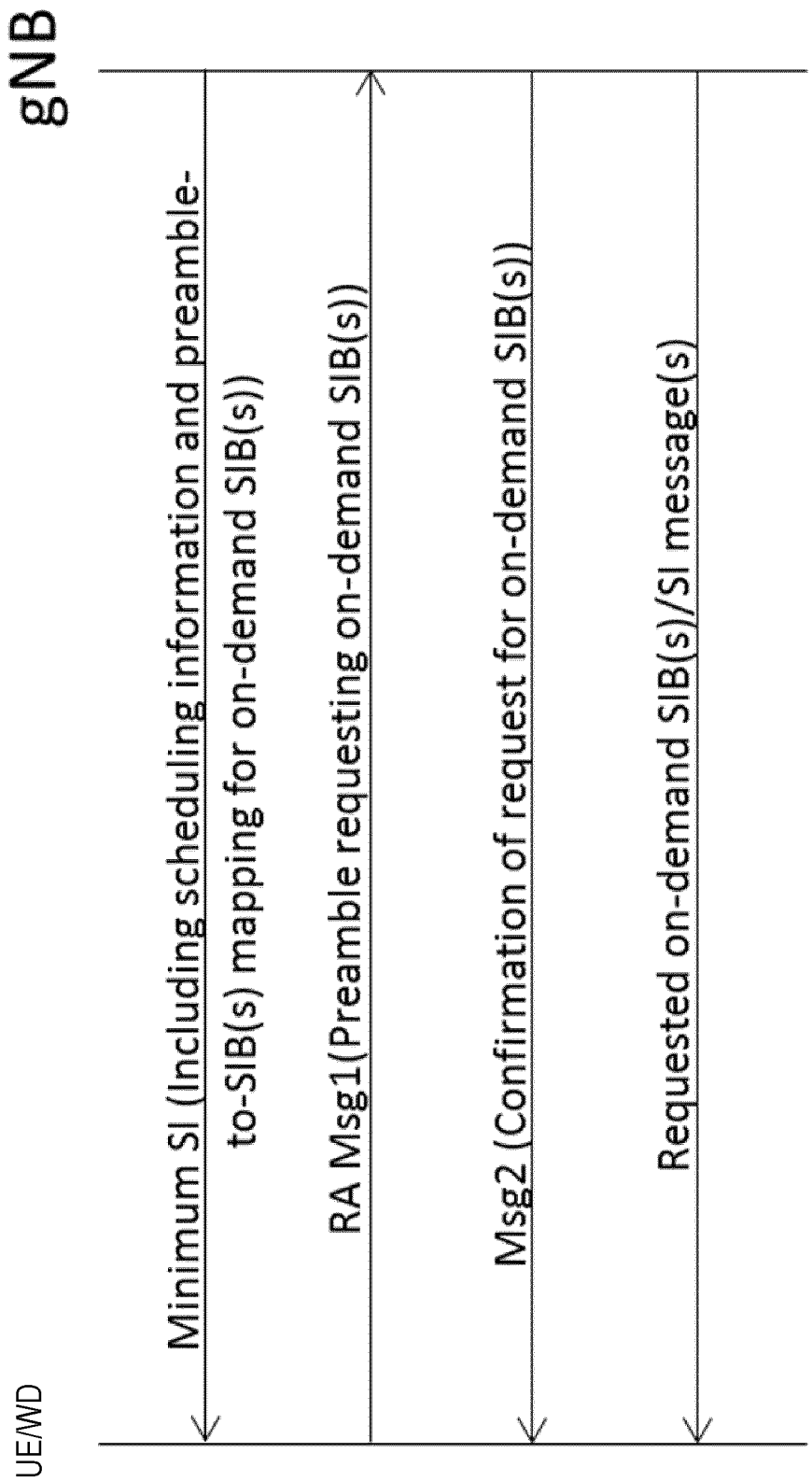
FIG. 5 summarizes signaling between a WD and a gNB.
Figure 6:
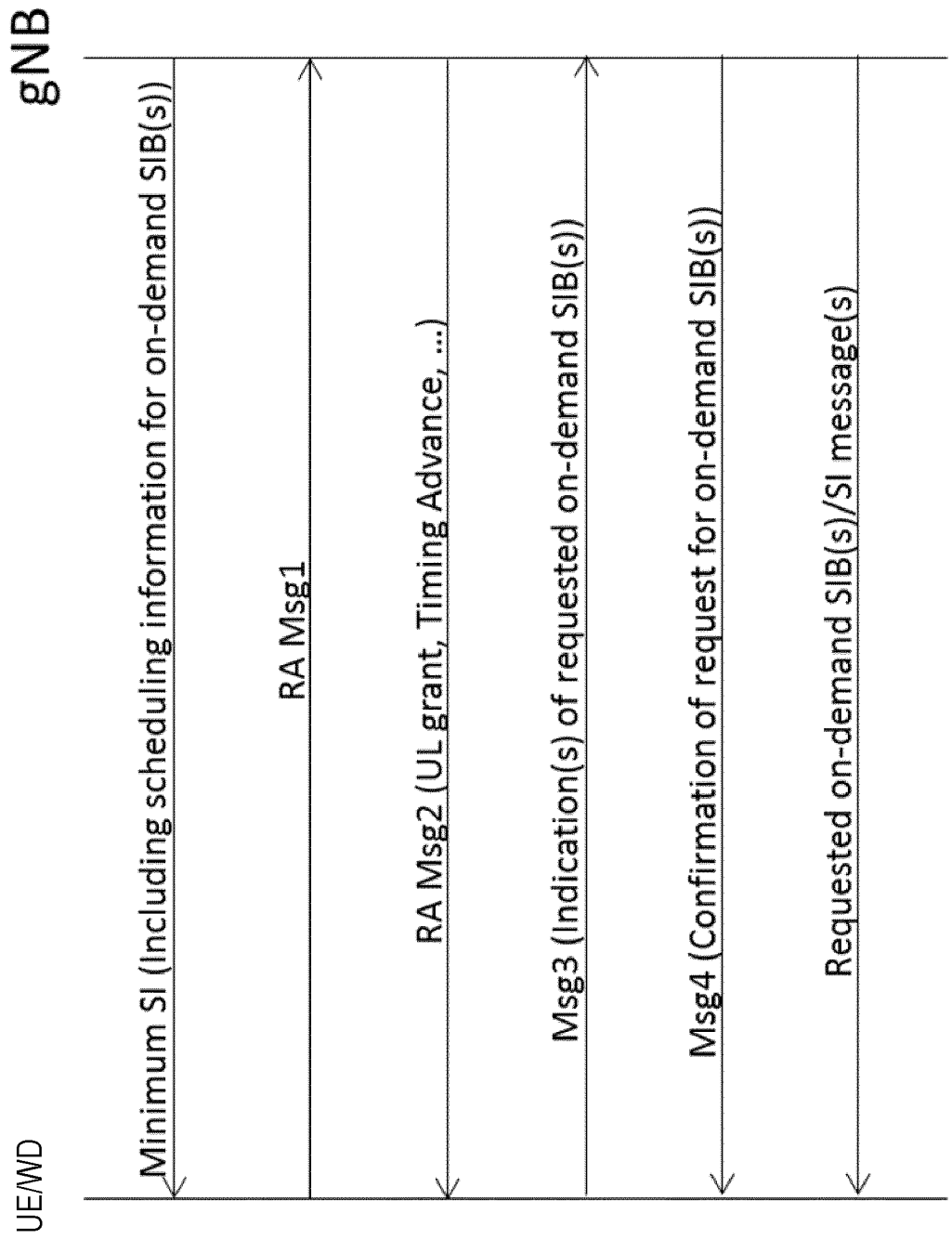
FIG. 6 summarizes additional signaling between the WD and the gNB.

In the case of an SSB, that consists of a primary and secondary synchronization signals (PSS, SSS), each occupying 1 symbol and 127 subcarriers, and PBCH spanning across 3 OFDM symbols and 240 subcarriers, but on one symbol leaving an unused part in the middle for SSS as shown in FIG. 2.

Figure 16:
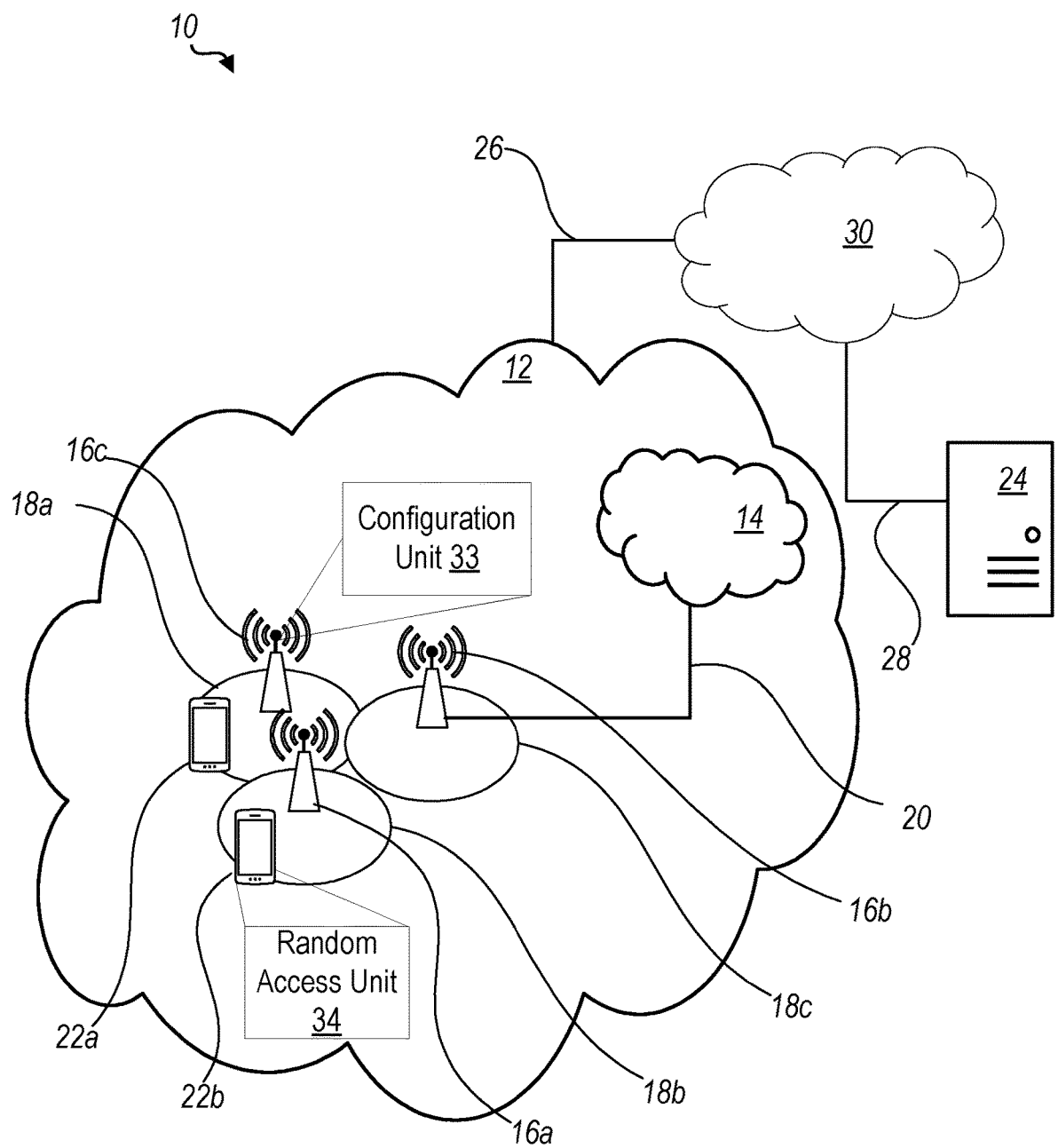
FIG. 16 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 16 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 16 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a configuration unit 33 which is configured to perform one or more network node 16 functions as described herein such as with respect to a random access procedure. A wireless device 22 is configured to include a random access unit 34 which is configured to perform one or more wireless device 22 functions as described herein such as with respect to two-step random access procedure.

Example implementations, in accordance with an embodiment, of the WD 22, network node 16 and host computer 24 discussed in the preceding paragraphs will now be described with reference to FIG. 17. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. The processing circuitry 68 may include configuration unit 33 that is configured to perform one or more network node 16 functions as described herein such as with respect to a random access procedure.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a random access unit 34 which is configured to perform one or more wireless device 22 functions as described herein such as with respect to a two-step random access procedure.

Figure 17:
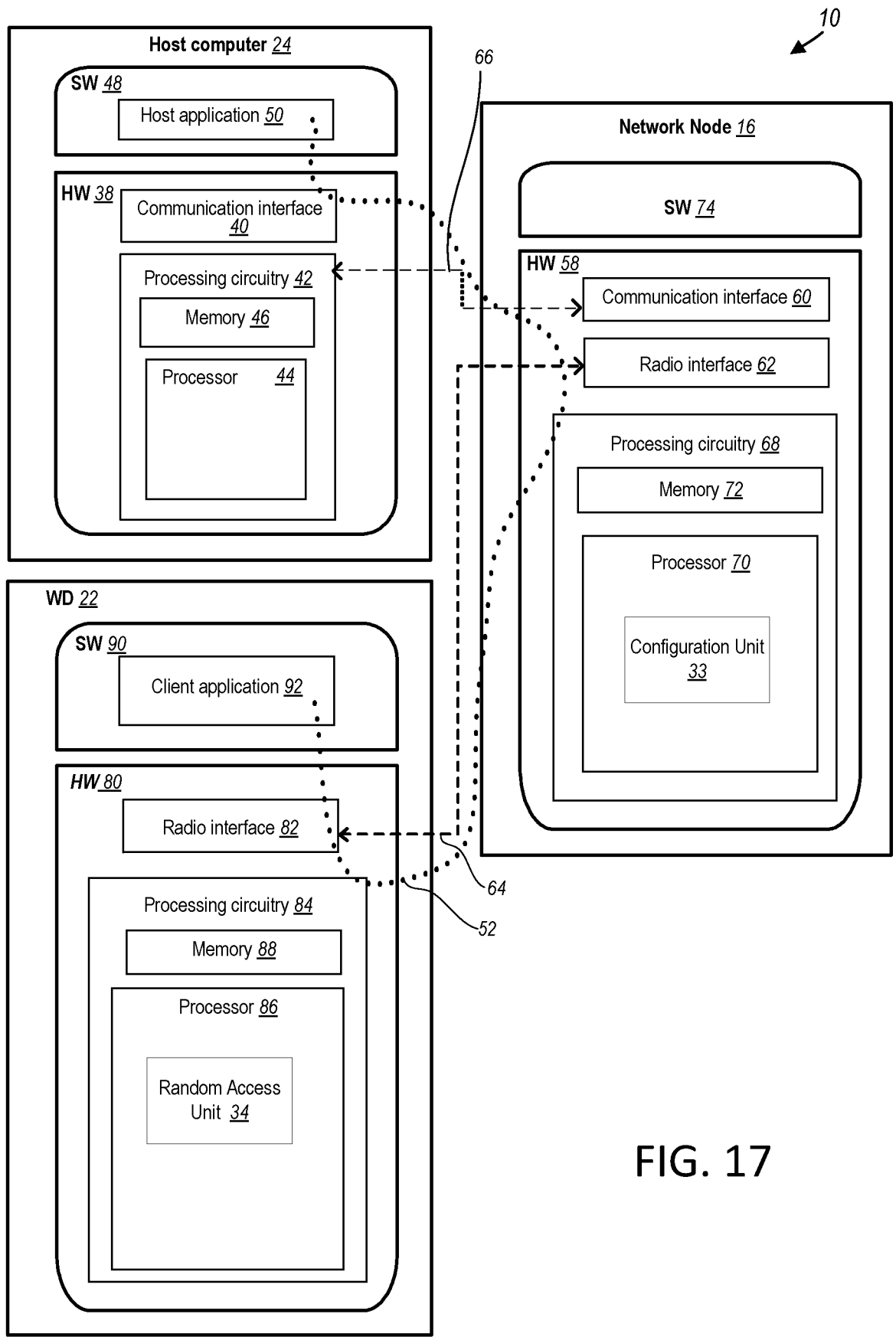
FIG. 17 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 17 and independently, the surrounding network topology may be that of FIG. 16.

In FIG. 17, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 16 and 17 show various "units" such as random access unit 34 and configuration unit 33 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 7:
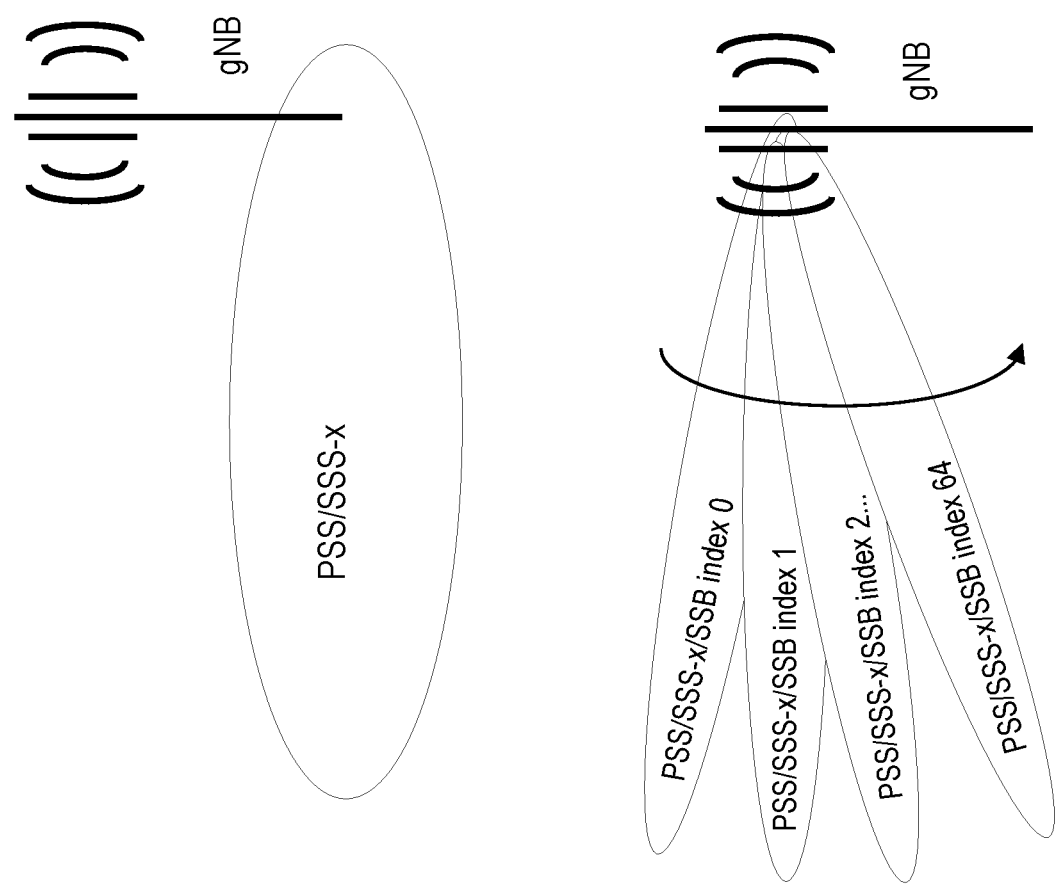
FIG. 7 illustrates indexed synchronization signal signaling.
Figure 8:
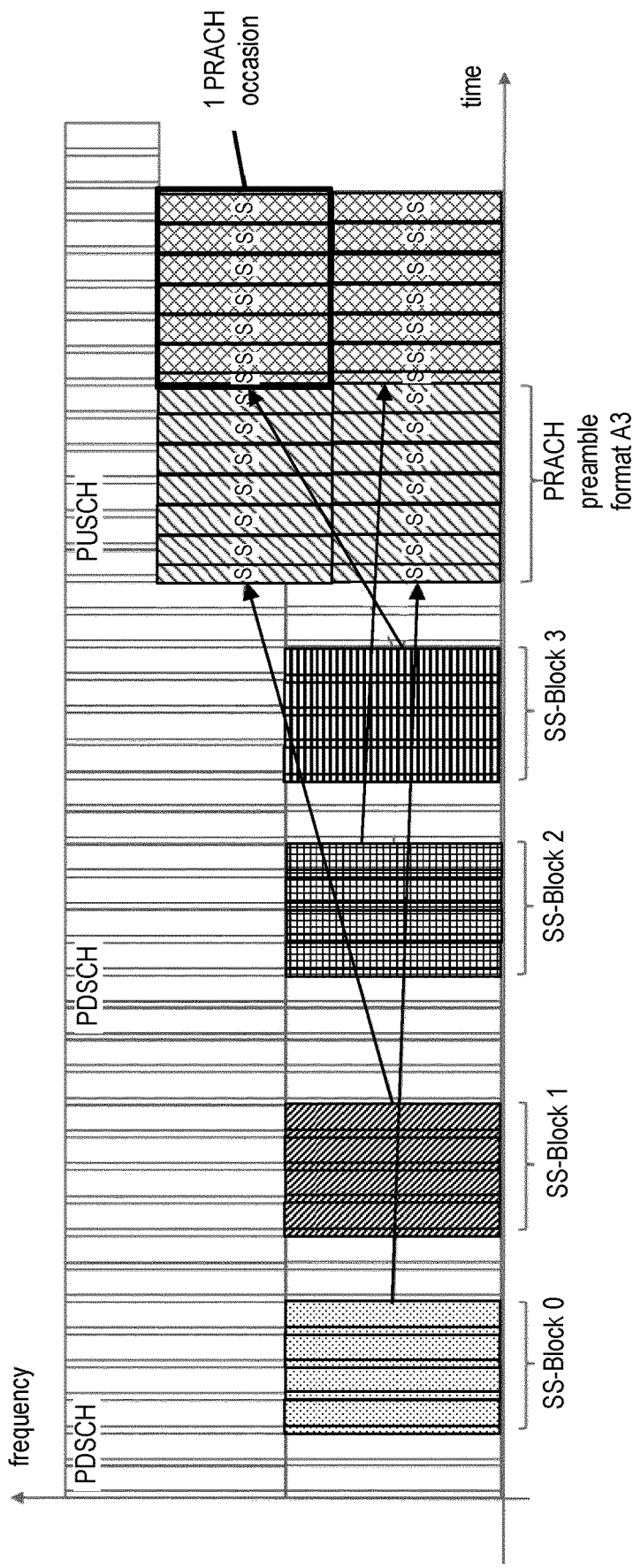
FIG. 8 illustrates a time frequency diagram of channels and synchronization signals.
Figure 9:
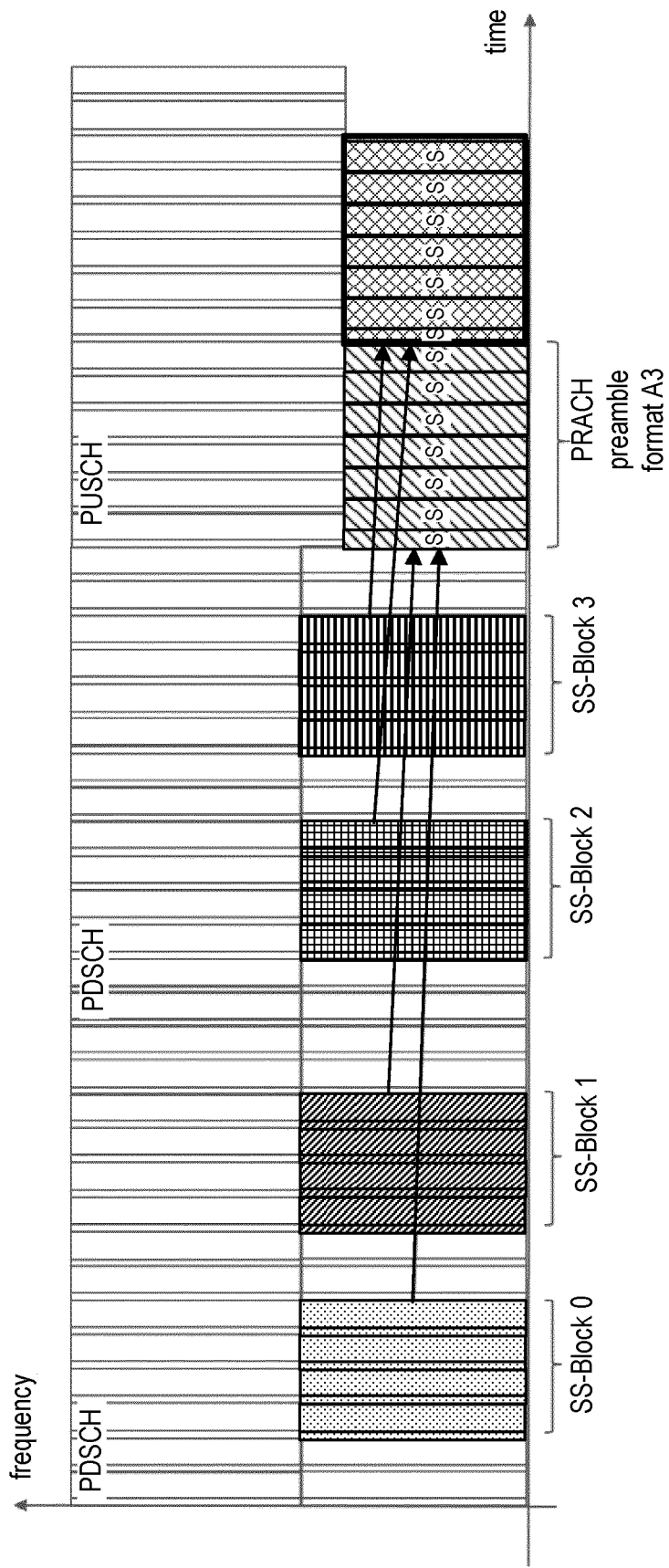
FIG. 9 illustrates an alternative time frequency diagram of channels and synchronization signals.
Figure 10:
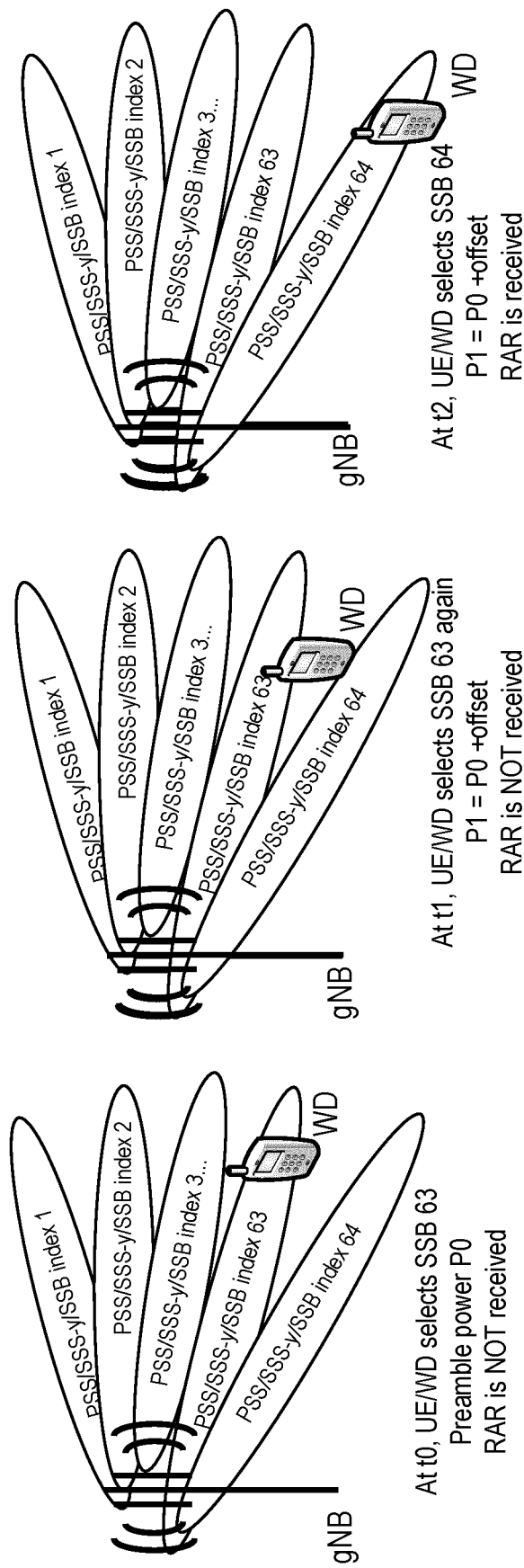
FIG. 10 illustrates successive attempts to receive RAR.
Figure 11:
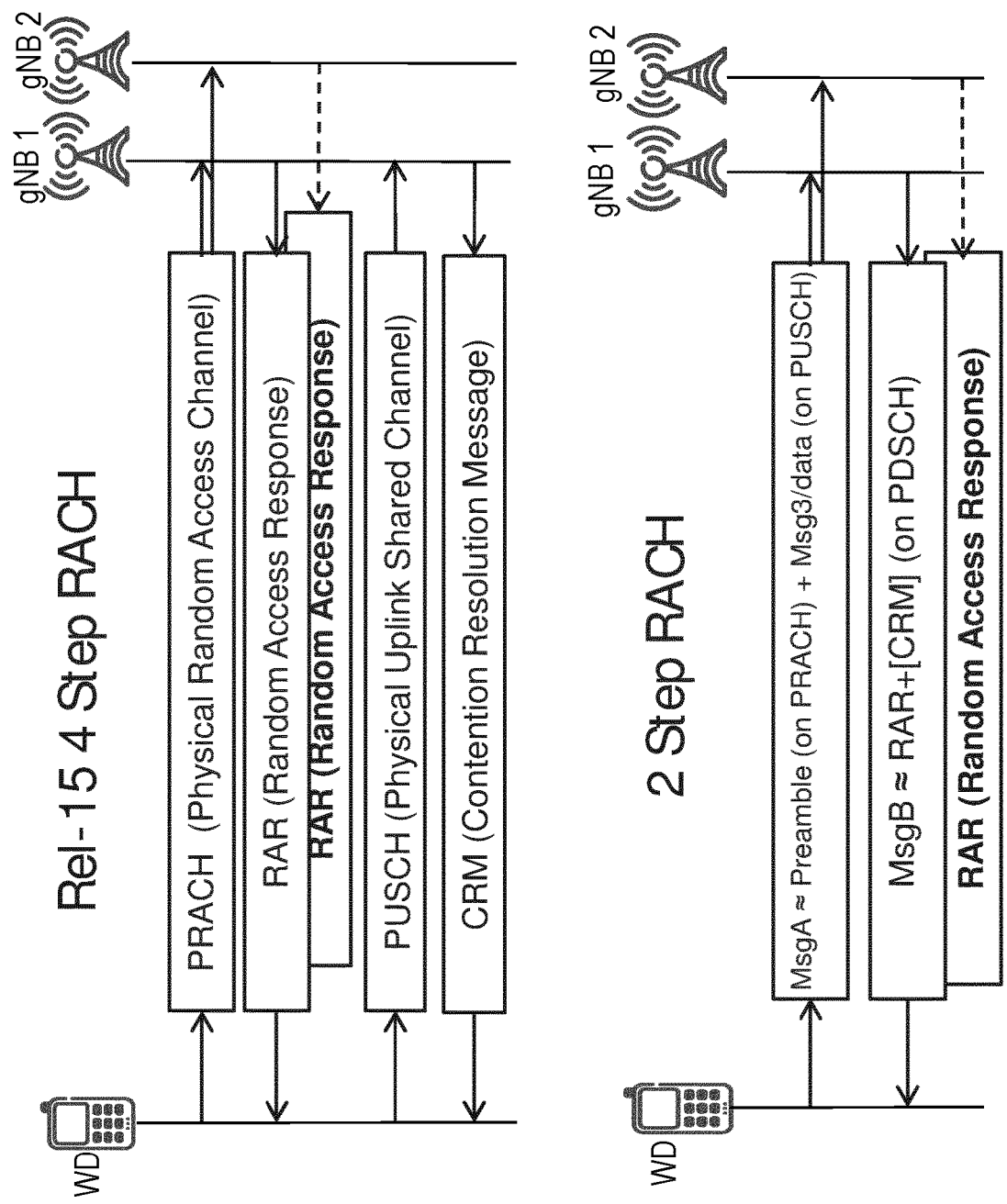
FIG. 11 is a comparison between 2 step RA and legacy RA.
Figure 12:
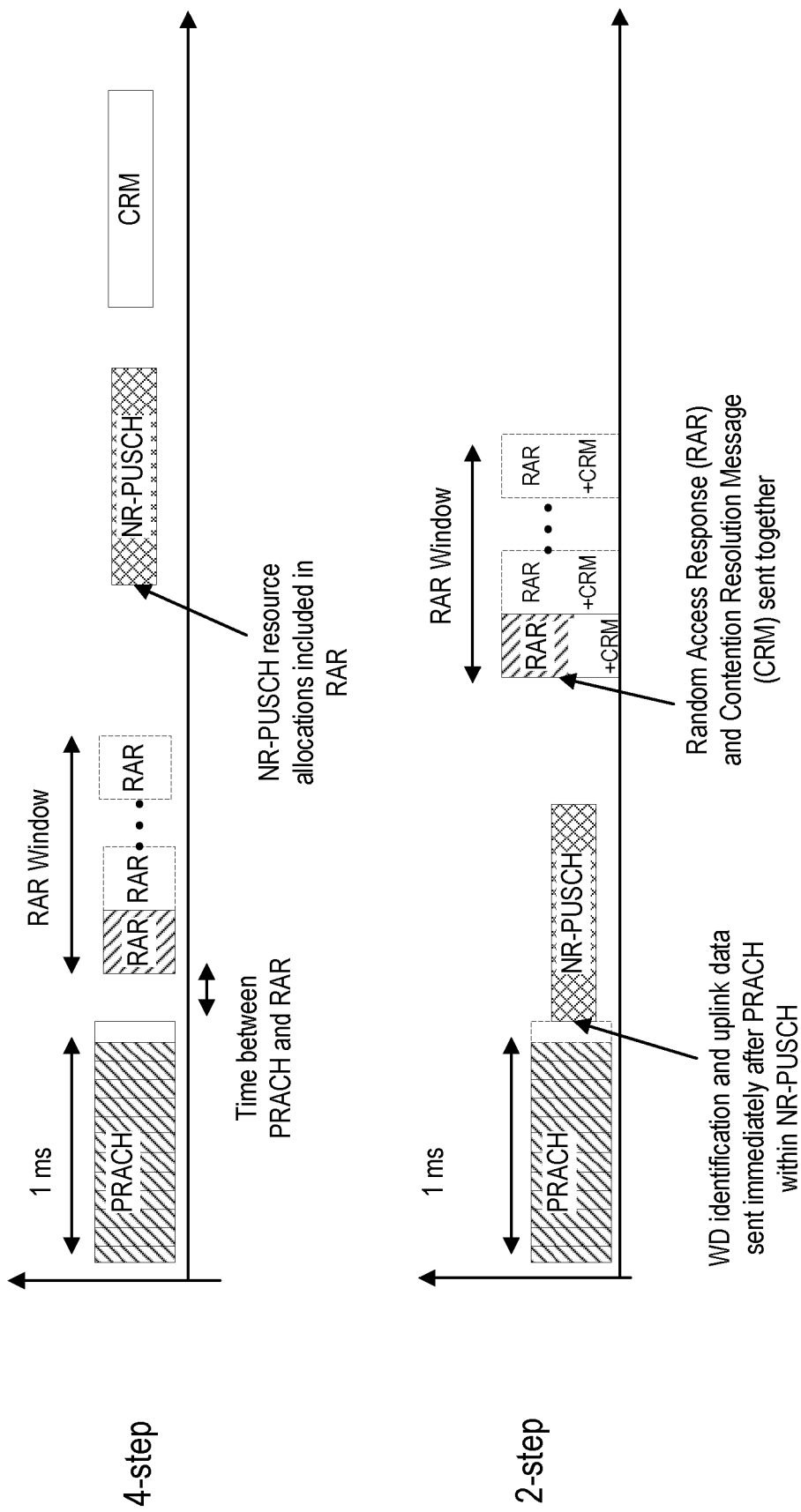
FIG. 12 is a comparison between 2 step RA and 4 step RA.
Figure 13:
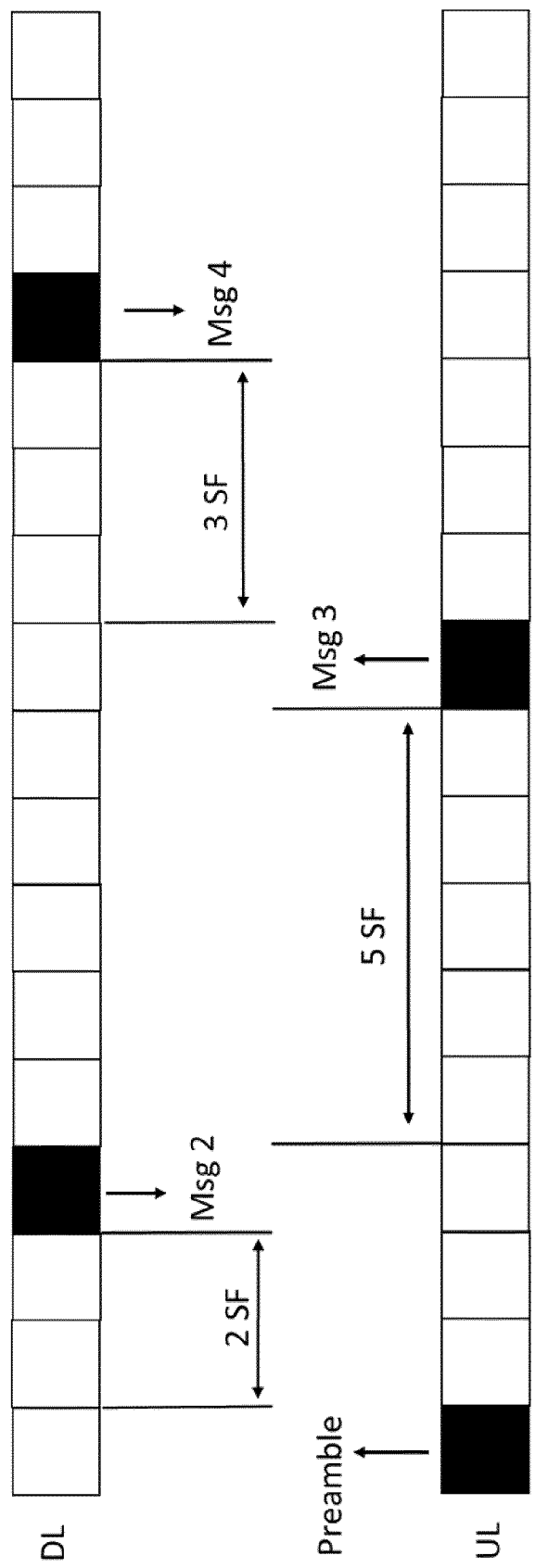
FIG. 13 is a timing diagram of random access message exchange.
Figure 14:
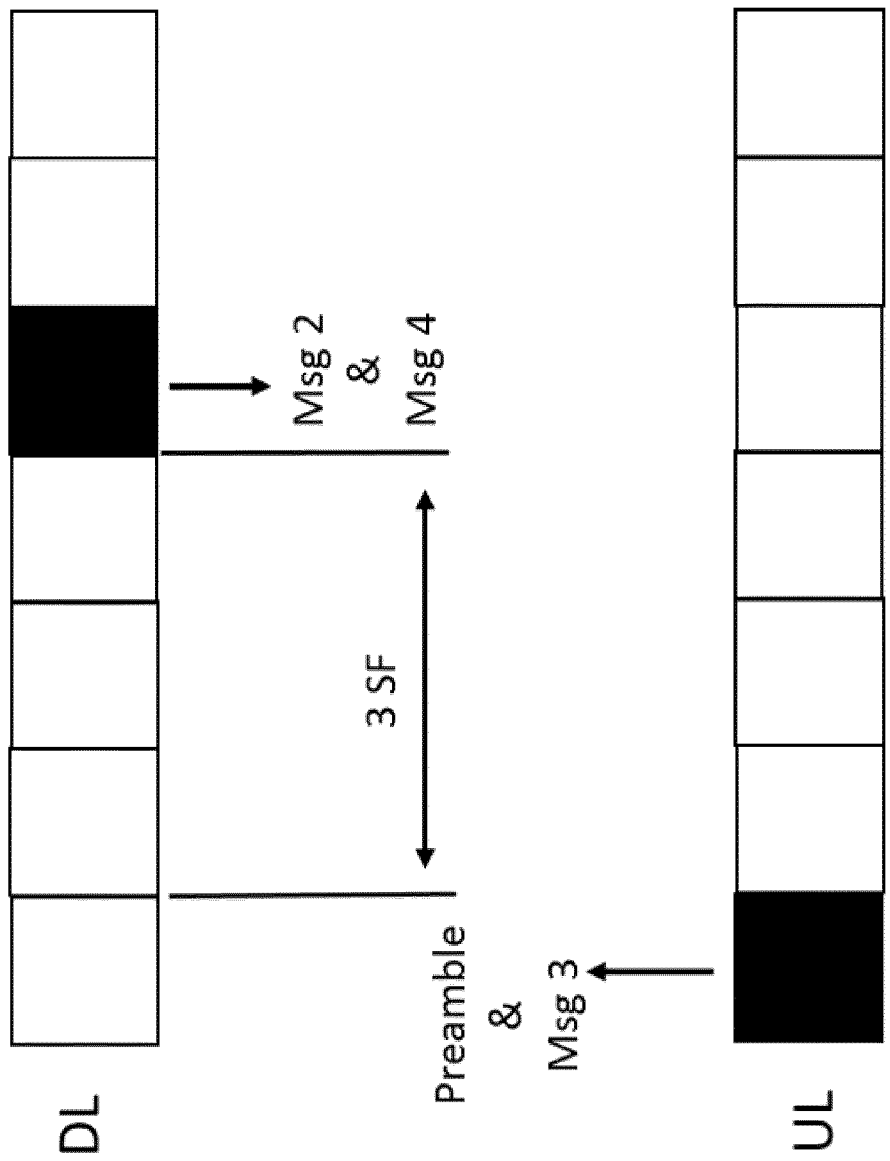
FIG. 14 is a timing diagram of random access message exchange.
Figure 15:
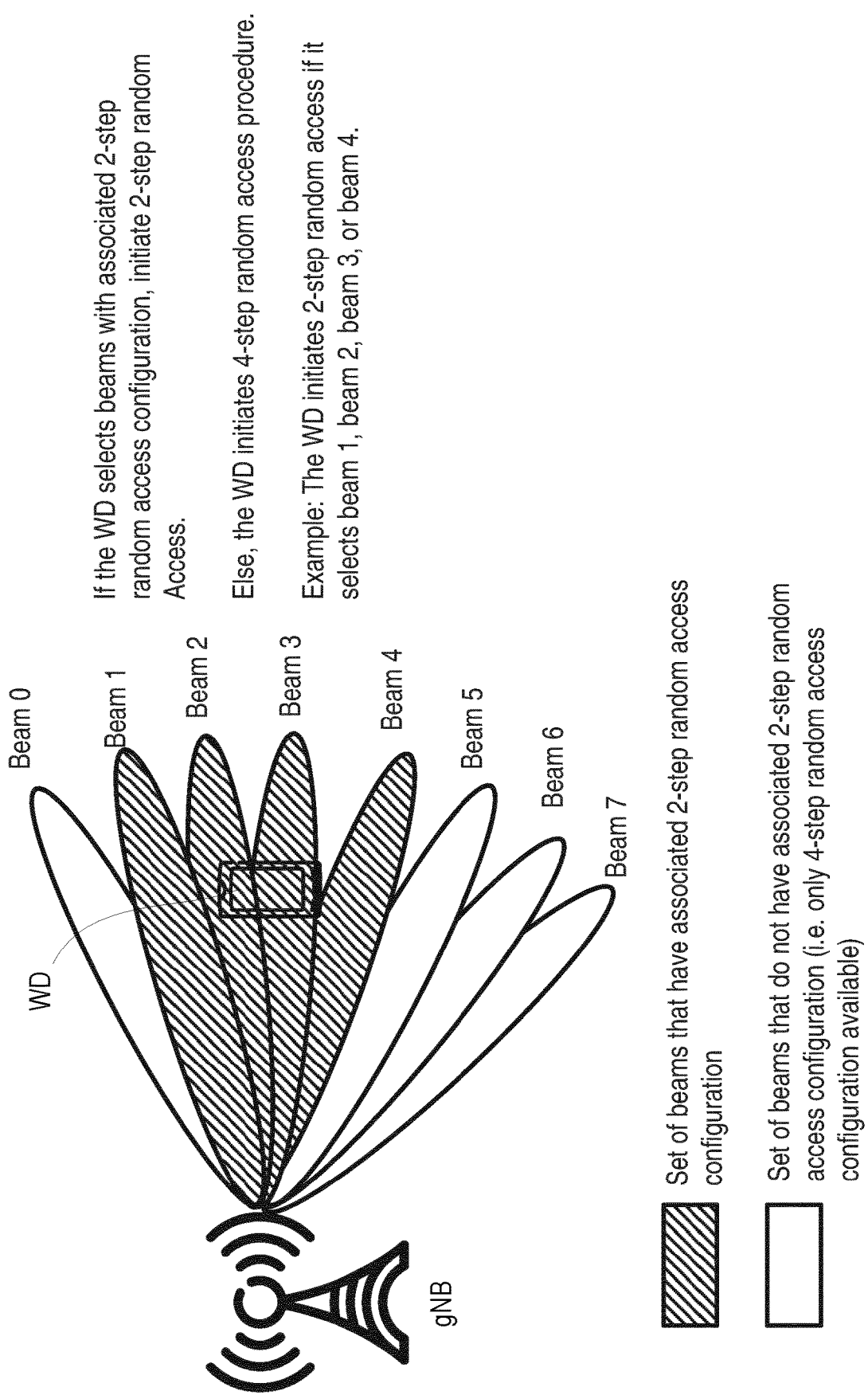
FIG. 15 is an example of an RA selection method.

FIG. 18 is a flowchart illustrating an exemplary method implemented in a communication system, such as, for example, the communication system of FIGS. 16 and 7, in accordance with one embodiment. The communication system may include a host computer 24, a network node 16 and a WD 22, which may be those described with reference to FIG. 16. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 19 is a flowchart illustrating an exemplary method implemented in a communication system, such as, for example, the communication system of FIG. 16, in accordance with one embodiment. The communication system may include a host computer 24, a network node 16 and a WD 22, which may be those described with reference to FIGS. 16 and 17. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 20:
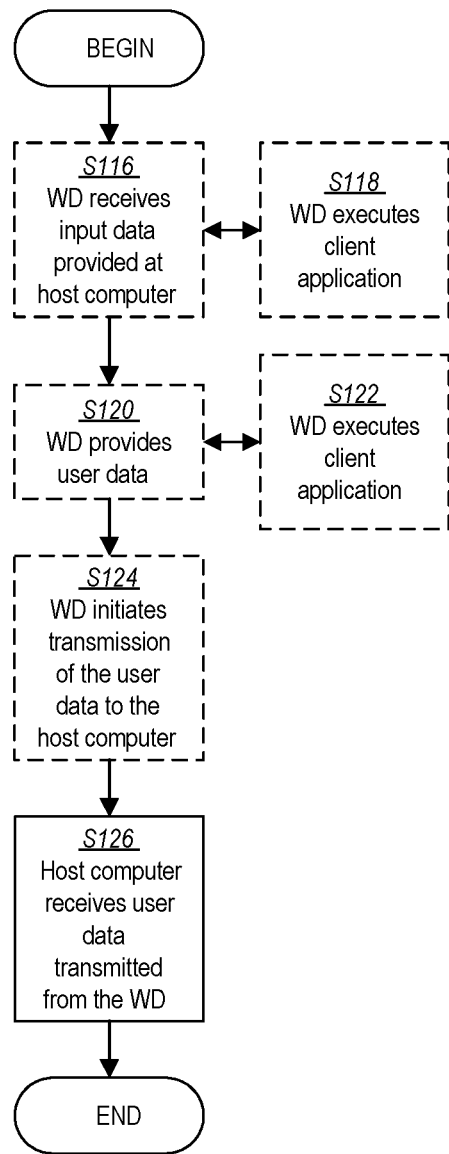
FIG. 20 is a flowchart illustrating exemplary methods implemented in a communication system including a host computer, a network node and a wireless device for receiving user data from the wireless device at a host computer according to some embodiments of the present disclosure.

FIG. 20 is a flowchart illustrating an exemplary method implemented in a communication system, such as, for example, the communication system of FIG. 16, in accordance with one embodiment. The communication system may include a host computer 24, a network node 16 and a WD 22, which may be those described with reference to FIGS. 16 and 17. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally, or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 21:
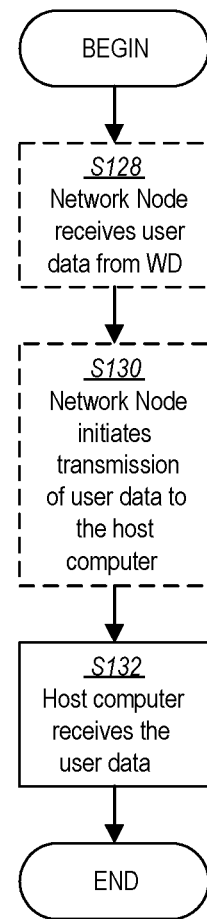
FIG. 21 is a flowchart illustrating exemplary methods implemented in a communication system including a host computer, a network node and a wireless device for receiving user data at a host computer according to some embodiments of the present disclosure.

FIG. 21 is a flowchart illustrating an exemplary method implemented in a communication system, such as, for example, the communication system of FIG. 16, in accordance with one embodiment. The communication system may include a host computer 24, a network node 16 and a WD 22, which may be those described with reference to FIGS. 16 and 17. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 22:
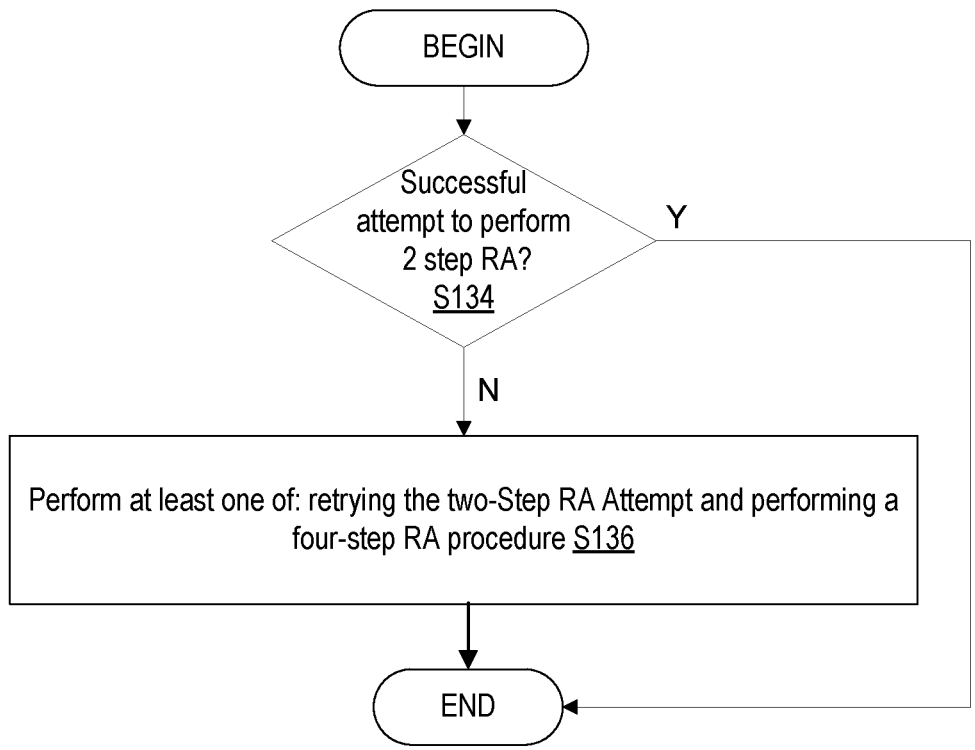
FIG. 22 is a flowchart of an exemplary process in a wireless device according to some embodiments of the present disclosure.

FIG. 22 is a flowchart of an exemplary process in a wireless device 22 according to some embodiments of the present disclosure. One or more blocks described herein may be performed by one or more elements of wireless device 22 such as by one or more of processing circuitry 84 (including the random access unit 34), processor 86, radio interface 82 and/or communication interface 60. Wireless device 22 such as via processing circuitry 84 and/or processor 86 and/or radio interface 82 is configured to detect whether an attempt to perform two-step random access is successful (Block S134). If so, the process continues. If the attempt to perform two-step random access is unsuccessful, then the WD 22 performs at least one of retrying the two-step random access attempt and performing a four-step random access procedure (Block S136).

Figure 23:
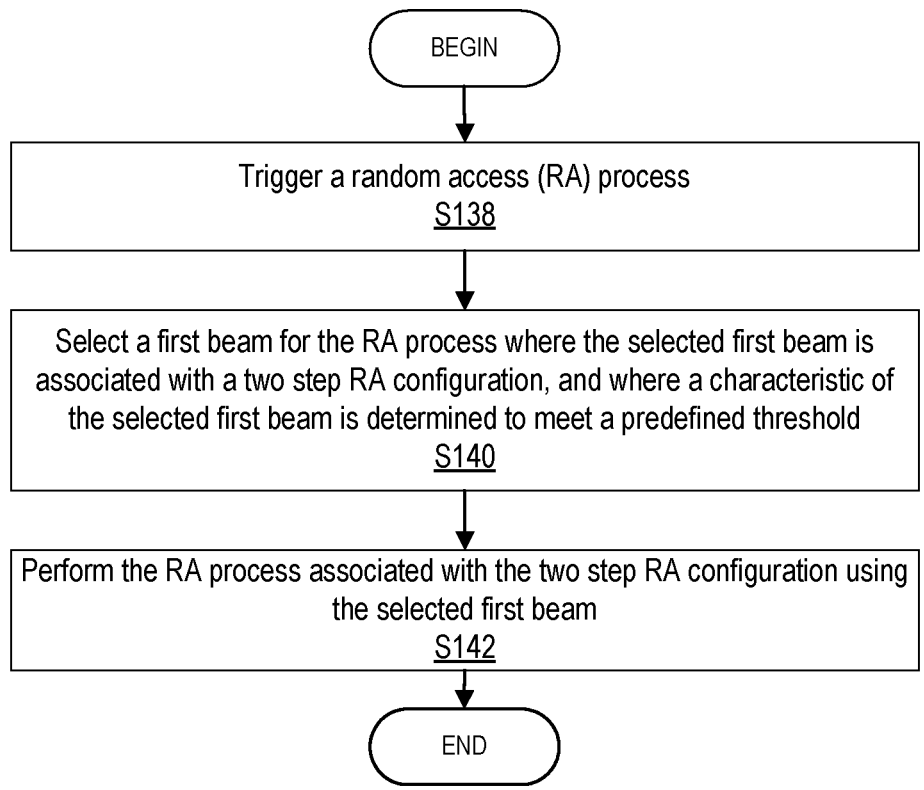
FIG. 23 is a flowchart of another exemplary process in a wireless device according to some embodiments of the present disclosure.

FIG. 23 is a flowchart of another exemplary process in a wireless device 22 according to some embodiments of the present disclosure. One or more blocks described herein may be performed by one or more elements of wireless device 22 such as by one or more of processing circuitry 84 (including the random access unit 34), processor 86, radio interface 82 and/or communication interface 60. Wireless device 22 such as via processing circuitry 84 and/or processor 86 and/or radio interface 82 is configured to trigger a random access (RA) process, as described herein (Block S138). Wireless device 22 such as via processing circuitry 84 and/or processor 86 and/or radio interface 82 is configured to select a first beam for the RA process where the selected first beam is associated with a two-step RA configuration, and a characteristic of the selected first beam is determined to meet a predefined threshold, as described herein (Block S140). Wireless device 22 such as via processing circuitry 84 and/or processor 86 and/or radio interface 82 is configured to perform the RA process associated with the two-step RA configuration using the selected first beam, as described herein (Block S142).

According to one or more embodiments, the processing circuitry 84 is further configured to: receive system information; and determine whether the selected first beam is associated with the two-step RA configuration based at least on the system information, the two-step RA configuration corresponding to a mapping of the selected first beam to a physical uplink shared channel, PUSCH, configuration. According to one or more embodiments, the selected first beam is selected from a plurality of beams where a subset of the plurality of beams is associated with the two-step RA configuration. According to one or more embodiments, the subset of the plurality of beams are one of a subset of synchronization signal blocks, SSBs, beams and a set of channel state information reference signal, CSI-RS, beams.

According to one or more embodiments, the subset of SSBs beams are associated with contention free RA resources. According to one or more embodiments, at least one other beam of the plurality of beams is not associated with the two-step RA configuration. According to one or more embodiments, at least one of the subset of beams are associated with contention based RA where the contention free RA is prioritized over the contention based RA. According to one or more embodiments, the characteristic of the selected first beam is a channel quality and the predefined threshold is a channel quality threshold.

According to one or more embodiments, the processing circuitry 84 is further configured to: determine a step of the two-step RA process has failed; and in response to determining a step of the two-step RA process has failed, perform one of: retransmit an uplink shared channel portion of a message A, msgA, as an uplink shared channel message in a four step RA process; and re-attempt the two-step RA process at least in part by performing beam reselection. According to one or more embodiments, the processing circuitry 84 is further configured to determine the step of the two-step RA process has failed based on one of: an absence of a response to the msgA; receiving a random access response, RAR, message that includes fallback information; and receiving a message B, msgB, containing first information indicating that the step of the two-step RA process has failed. According to one or more embodiments, the fallback information includes an indication that the step of the two-step RA process has failed.

According to one or more embodiments, the first information is contention resolution information. According to one or more embodiments, the retransmission is performed based on reselection of a beam from the plurality of beams where the reselection includes using contention-free RA resources configured for one of channel state information reference signal, CSI-RS, and synchronization signal block, SSB.

Figure 24:
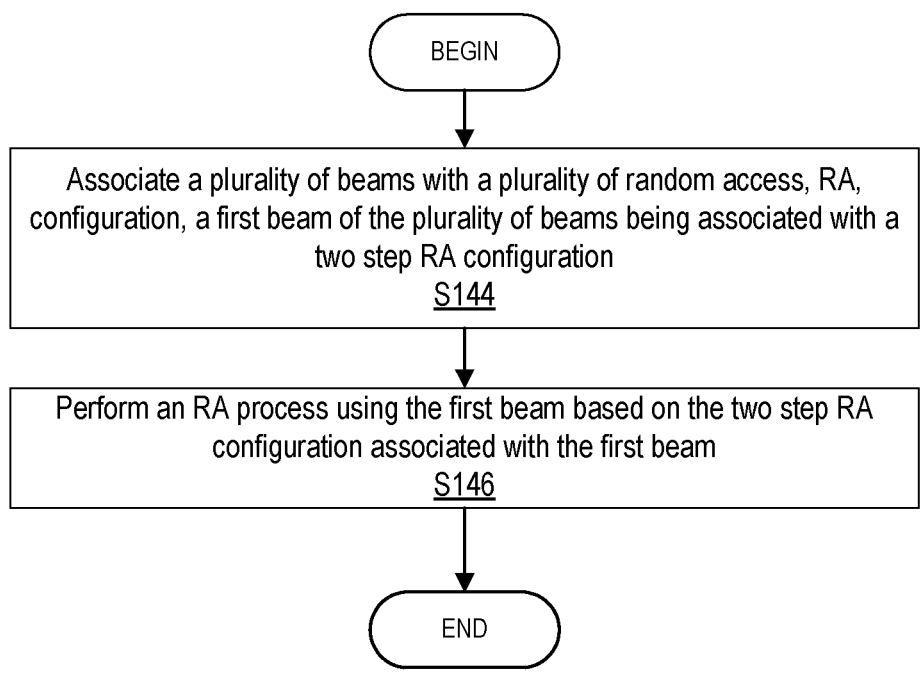
FIG. 24 is a flowchart of an exemplary process in a network node according to some embodiments of the present disclosure.

FIG. 24 is a flowchart of an exemplary process in a network node 16 according to some embodiments of the present disclosure. One or more Blocks and/or functions performed by network node 16 may be performed by one or more elements of network node 16 such as by configuration unit 33 in processing circuitry 68, processor 70, radio interface 62, etc. In one or more embodiments, network node 16 such as via one or more of processing circuitry 68, processor 70, configuration unit 33, communication interface 60 and radio interface 62 is configured to associate a plurality of beams with a plurality of random access, RA, configuration where a first beam of the plurality of beams is associated with a two-step RA configuration, as described herein (Block S144). In one or more embodiments, network node 16 such as via one or more of processing circuitry 68, processor 70, configuration unit 33, communication interface 60 and radio interface 62 is configured to perform an RA process using the first beam based on the two-step RA configuration associated with the first beam, as descried herein (Block S146).

According to one or more embodiments, the processing circuitry 68 is further configured to transmit system information where the system information indicates the plurality of RA configurations. According to one or more embodiments, a subset of the plurality of beams are associated with the two-step RA configuration. According to one or more embodiments, the subset of the plurality of beams are one of a subset of synchronization signal blocks, SSBs, beams and a set of channel state information reference signal, CSI-RS, beams According to one or more embodiments, the subset of SSBs beams are associated with contention free RA resources for contention free RA. According to one or more embodiments, at least one of the subset of beams are associated with contention based RA, the contention free RA is prioritized over the contention based RA. According to one or more embodiments, at least one other beam of the plurality of beams is not associated with the two-step RA configuration.

According to one or more embodiments, the processing circuitry 68 is further configured to one of: receive a transmitted uplink shared channel portion of a message A, msgA, as an uplink shared channel message in a four step RA process; and determine a beam reselection occurred, the beam selection being associated with a re-attempt to perform the two-step RA process. According to one or more embodiments, the processing circuitry 68 is further configured to: determine a two-step RA process has failed; and in response to the determination that the two-step RA process has failed, one of: transmit a random access response, RAR, message that includes fallback information; and transmit a message B, msgB, containing first information indicating that the step of the two-step RA process has failed. According to one or more embodiments, the fallback information includes an indication that the step of the two-step RA process has failed. According to one or more embodiments, the first information is contention resolution information.

Having described the general process flow of arrangements of the disclosure and having provided examples of hardware and software arrangements for implementing the processes and functions of the disclosure, the sections below provide details and examples of arrangements for recovery and fallback after an unsuccessful two-step random access attempt.

The possible time locations of SSBs within a half-frame are determined by sub-carrier spacing and the periodicity of the half-frames where SSBs are transmitted is configured by the network node 16. During a half-frame, different SSBs may be transmitted in different spatial directions (i.e., using different beams, spanning the coverage area of a cell). Within the frequency span of a carrier, multiple SSBs can be transmitted such as via one or more of processing circuitry 68, processor 70, radio interface 62, configuration unit 33, etc. The PCIs of SSBs transmitted in different frequency locations do not have to be unique, i.e., different SSBs in the frequency domain can have different PCIs. However, when an SSB is associated with an RMSI, the SSB corresponds to an individual cell, which has a unique NR Cell Global identifier (NCGI). Such an SSB is referred to as a Cell-Defining SSB (CD-SSB). A PCell may always be associated to a CD-SSB located on the synchronization raster.

The term "beam measurement" for beam selection may include radio conditions of the measured beam/beams (e.g., RSRP, RSRQ, or SINR). Layer 1 (layers herein refer to open systems interconnection (OSI) layers), may receive from higher layers a set of SS/PBCH block indexes (or CSI-RS) and provides to higher layers a corresponding set of RSRP, RSRQ and/or SINR measurements. These may be called L1 measurement per SSB, L1 measurement per CSI-RS or L1 measurement per beam.

These measurements may be performed, according to what embodiments describe as possibly being the ones described in the L1 specifications, as reproduced below (for simplicity, only RRSP definitions were provided for CSI-RS and SSB):

SS reference signal received power (SS-RSRP);
a) SS reference signal received power (SS-RSRP) is defined as the linear average over the power contributions of the resource elements that carry secondary synchronization signals. The measurement time resource(s) for SS-RSRP are confined within SS/PBCH Block Measurement Time Configuration (SMTC) window duration. If SS-RSRP is used for L1-RSRP as configured by reporting configurations as defined in one or more wireless communication standards such as 3GPP TS 38.214, the measurement time resources(s) restriction by SMTC window duration is not applicable.
b) For SS-RSRP determination demodulation reference signals for physical broadcast channel (PBCH) and, if indicated by higher layers, CSI reference signals in addition to secondary synchronization signals may be used. SS-RSRP using demodulation reference signal for PBCH or CSI reference signal may be measured by linear averaging over the power contributions of the resource elements that carry corresponding reference signals taking into account power scaling for the reference signals as defined in wireless communication standards such as 3GPP TS 38.213. If SS-RSRP is not used for L1-RSRP, the additional use of CSI reference signals for SS-RSRP determination is not applicable.
c) SS-RSRP may be measured only among the reference signals corresponding to SS/PBCH blocks with the same SS/PBCH block index and the same physical-layer cell identity.
d) If SS-RSRP is not used for L1-RSRP and higher-layers indicate certain SS/PBCH blocks for performing SS-RSRP measurements, then SS-RSRP is measured only from the indicated set of SS/PBCH block(s).
e) For frequency range 1, the reference point for the SS-RSRP may be the antenna connector of the WD 22. For frequency range 2, SS-RSRP may be measured based on the combined signal from antenna elements corresponding to a given receiver branch. For frequency range 1 and 2, if receiver diversity is in use by the WD 22, the reported SS-RSRP value may not be lower than the corresponding SS-RSRP of any of the individual receiver branches of WD 22.
f) NOTE 1: The number of resource elements within the measurement period that are used by the WD 22 to determine SS-RSRP is left up to the WD implementation with the limitation that corresponding measurement accuracy requirements may be fulfilled.

g) NOTE 2: The power per resource element is determined from the energy received such as via one or more of processing circuitry 84, processor 86, radio interface 82, random access unit 34, etc., during the useful part of the symbol, excluding the cyclic prefix (CP).

Channel State Information (CSI) reference signal received power (CSI-RSRP);
  a) CSI reference signal received power (CSI-RSRP), is defined as the linear average over the power contributions of the resource elements of the antenna port(s) that carry CSI reference signals configured for RSRP measurements within the considered measurement frequency bandwidth in the configured CSI-RS occasions.
  b) For CSI-RSRP determination CSI reference signals transmitted on antenna port 3000 according to one or more wireless communication standards such as 3GPP TS 38.211 may be used. If CSI-RSRP is used for L1-RSRP, CSI reference signals transmitted on antenna ports 3000, 3001 can be used for CSI-RSRP determination.
  c) For intra-frequency CSI-RSRP measurements, if the measurement gap is not configured, the WD 22 is not expected to measure the CSI-RS resource(s) outside of the active downlink bandwidth part.
  d) For frequency range 1, the reference point for the CSI-RSRP may be the antenna connector of the WD 22. For frequency range 2, CSI-RSRP may be measured based on the combined signal from antenna elements corresponding to a given receiver branch. For frequency range 1 and 2, if receiver diversity is in use by the WD 22 such as via one or more of processing circuitry 84, processor 86, radio interface 82, random access unit 34, etc., the reported CSI-RSRP value may not be lower than the corresponding CSI-RSRP of any of the individual receiver branches.
  e) NOTE 1: The number of resource elements within the considered measurement frequency bandwidth and within the measurement period that are used by the WD 22 to determine CSI-RSRP is left up to the WD implementation with the limitation that corresponding measurement accuracy requirements should be fulfilled.

Some embodiments include a method at a wireless device (an example of which is a User Equipment) for performing random access, involving unsuccessful random access procedure attempt(s), followed by fallback actions or other reactions to the detected lack of success. Some aspects include the steps the WD 22 performs upon detection of random access failure in conjunction with a 2-step RA attempt. Before reaching that point, the WD 22 performs a number of initial steps involved in preparing for and initiating a random access procedure. The following are these initial steps performed by a WD 22 such as via one or more of processing circuitry 84, processor 86, radio interface 82, random access unit 34, etc.:

Obtaining random-access configuration(s) for a cell, for example, for a serving cell that the WD 22 is camping on (in RRC_IDLE or RRC_INACTIVE state) or for a target cell (e.g., in conjunction with handover or SCG change/addition), comprising 2-step random access (RA) configuration per beam or groups of beams in the cell (where a group of beams may constitute a subset of the beams in the cell). In other words, at least one beam may have an associated 2-step RA configuration (but not necessarily all beams for a target cell may be associated with the 2-step RA configuration) or stated alternatively, at least one beam will not have an associated 2-step RA configuration. In this context, a beam refers to an SSB beam or a CSI-RS beam. Both these signal types can be the beam reference (i.e., acting as "template") and may have associated random access configuration(s).
  a) The configurations described above may be provided during the configuration of a handover, Dual Connectivity procedures (e.g., SCG addition, SCG change), Carrier Aggregation procedures (e.g., SCell setup, Scell addition, Scell activation, etc.).
  b) The configurations described above may be provided for a Beam Failure Recovery procedure where only a subset of beams of a target cell is provided to the WD 22 as beam candidate list, currently defined in RRC as the field candidateBeamRSList. In that sense, only beams in that list may be configured with 2-step RA if the network only wants to support 2-step RA for CBRA used for beam failure recovery (BFR).
  c) The configurations described above may be provided in system information provided by the network node 16, where the WD 22 obtains the SI when the WD camps on the cell and may possibly access the cell, such as via one or more of processing circuitry 84, processor 86, radio interface 82, random access unit 34, etc.
  d) Configurations such as one or more 2-step RA configurations may be mapped such as by network node 16 per beam directly or indirectly. For example, there may be a relation between a selected beam and a PRACH configuration, then a relation between PRACH configuration and a 2-step RA configuration.
  e) Configurations such as one or more 2-step RA configurations may be provided such as by network node 16 per RS type, i.e., there may be a 2-step RA configuration associated with each of a set or subset of SSBs and/or a 2-step RA configuration associated with each of a set or subset of CSI-RSs.
  f) The way that the (possibly beam dependent) 2-step RA configuration is encoded in RRC (ASN.1) such as via one or more of processing circuitry 68, processor 70, radio interface 62, configuration unit 33, etc., may differ and in different solutions the WD 22 obtains the 2-step RA configuration (e.g., mapping to PUSCH resources) in different information elements (Ies).
    i) In one alternative, the WD 22 such as via one or more of processing circuitry 84, processor 86, radio interface 82, random access unit 34, etc., obtains 2-step RA configuration as part of the IE RACH-ConfigCommon.
    ii) In one alternative, the WD 22 such as via one or more of processing circuitry 84, processor 86, radio interface 82, random access unit 34, etc., obtains 2-step RA configuration as part of the IE RACH-ConfigDedica ted.
    iii) In one alternative, the WD 22 such as via one or more of processing circuitry 84, processor 86, radio interface 82, random access unit 34, etc., obtains 2-step RA configuration as part of the IE RACH-ConfigGeneric.
    iv) In one alternative, the WD 22 such as via one or more of processing circuitry 84, processor 86, radio interface 82, random access unit 34, etc., obtains 2-step RA configuration in different les, where different parameters are provided in each of them, e.g., as part of the IE RACH-ConfigGeneric and RACH-ConfigCommon, and possibly including a new IE to make a clear distinction of what is a 2-step RA configuration or 4-step RA configuration.

v) In one alternative, the WD 22 obtains 2-step RA configuration in a new IE, different from the ones above.

One aspect of the 2-step RA configuration is how the selected beam (e.g., SSB-x) maps to a PRACH resource and a PUSCH resource for the transmission of MsgA (i.e., PRACH preamble+MsgAPUSCH). In the 4-step RACH configuration in the RRC specifications a PRACH configuration index (prach-ConfigurationIndex) defines what time and frequency domain resources are used for PRACH transmissions. In one alternative, a PUSCH resource configuration may also exist and be encoded by an index in RRC that points to a hard-coded table (e.g., in the L1 specification). Triggering random access (e.g., upon request from upper layers) such as at the WD 22.

a) Triggering random access may be accomplished in different ways. For example, when RRC submits a message to lower layers and reaches the MAC layer towards a target cell the WD 22 is not synchronized with, such as in the case the WD 22 receives a handover and should send a handover complete message in the target cell.

b) Random access may be triggered by any other procedure relying on random access, e.g., the detection of Beam Failure Recovery where the WD 22 such as via one or more of processing circuitry 84, processor 86, radio interface 82, random access unit 34, etc., detects beam failure and should select a beam among a list of candidate beams, where each of these may have a 2-step RA configuration.

c) Another situation that may trigger random access is when uplink (UL) data appears in the WD 22 (e.g., created by an application in the WD 22). This will trigger random access if the WD 22 is in RRC_IDLE or RRC_INACTIVE state and the WD 22 should transit to RRC_CONNECTED state before the WD 22 can transmit the pending UL data. Pending UL data in a WD 22 in RRC_CONNECTED state may also trigger random access, if the WD 22 lacks a valid timing advance and should acquire a valid timing advance before the WD 22 can transmit the pending UL data.

d) Yet another situation where random access is triggered is if the WD 22 is paged and should transit to RRC_CONNECTED state to respond to the page.

e) Yet another situation when random access is triggered is if the WD 22 receives a PDCCH order to perform random access to acquire a valid timing advance. This may occur if the network node 16 receives DL data for a WD 22 in RRC_CONNECTED state which lacks a valid timing advance. The network node 16 may then order the WD 22 to acquire a valid timing advance before the DL data is transmitted to the WD 22, so that the WD 22 can transmit HARQ feedback in the UL.

Performing Beam Selection a) Beam selection may be, for example, an SSB selection, e.g., based on radio conditions, where the WD 22 such as via one or more of processing circuitry 84, processor 86, radio interface 82, random access unit 34, etc., selects the SSB with highest RSRP among the detected ones for the service cell or target cell. The cell in which the WD 22 performs SSB selection may be the serving cell during transition from RRC_IDLE or RRC_INACTIVE state to RRC_CONNECTED state or when a WD 22 in RRC_CONNECTED state re-acquires a valid timing advance, or the cell may be a target cell, or potential target cell, in conjunction with handover. In conjunction with handover, the beam selection such as via one or more of processing circuitry 84, processor 86, radio interface 82, random access unit 34, etc., may consist of selection of CSI-RS beam in the target cell.

b) Beam selection may be equivalent to what is called in MAC specifications "Random Access Resource selection", where the selected beam (e.g., selected SSB) maps to a resource to transmit the preamble (and in the case of 2-step RA, may also map to resources for transmission of $MsgA_{PUSCH}$ on PUSCH).

Determining whether the selected beam (e.g., selected SSB) has an associated 2-step RACH configuration.

c) That step may be implemented by the WD 22 such as via one or more of processing circuitry 84, processor 86, radio interface 82, random access unit 34, etc., checking the presence of a random-access configuration for the selected SSB or CSI-RS, i.e., the presence of a 2-step random-access configuration indicates that there is a mapping between the selected beam (e.g., SSB) and a 2-step random-access configuration.

d) The 2-step RA configuration in this context may include a mapping between the selected beam and a PUSCH configuration (i.e., indication of PUSCH transmission resources for transmission of $MsgA_{PUSCH}$).

e) The 2-step RA configuration in this context may include a mapping between the PRACH configuration associated with the selected beam and a PUSCH configuration (for transmission of $MsgA_{PUSCH}$). Compared to the case above, this is an indirect mapping via the PRACH mapping.

f) The 2-step RA configuration in this context may include a mapping between the PRACH configuration associated with the selected beam and a PUSCH configuration (for transmission of $MsgA_{PUSCH}$) that includes a logical channel (LCH) mapping for where the $MsgA_{PUSCH}$ reliability, e.g., MCS, PUSCH duration etc., is met for URLLC data mapped to this LCH.

Figure 25:
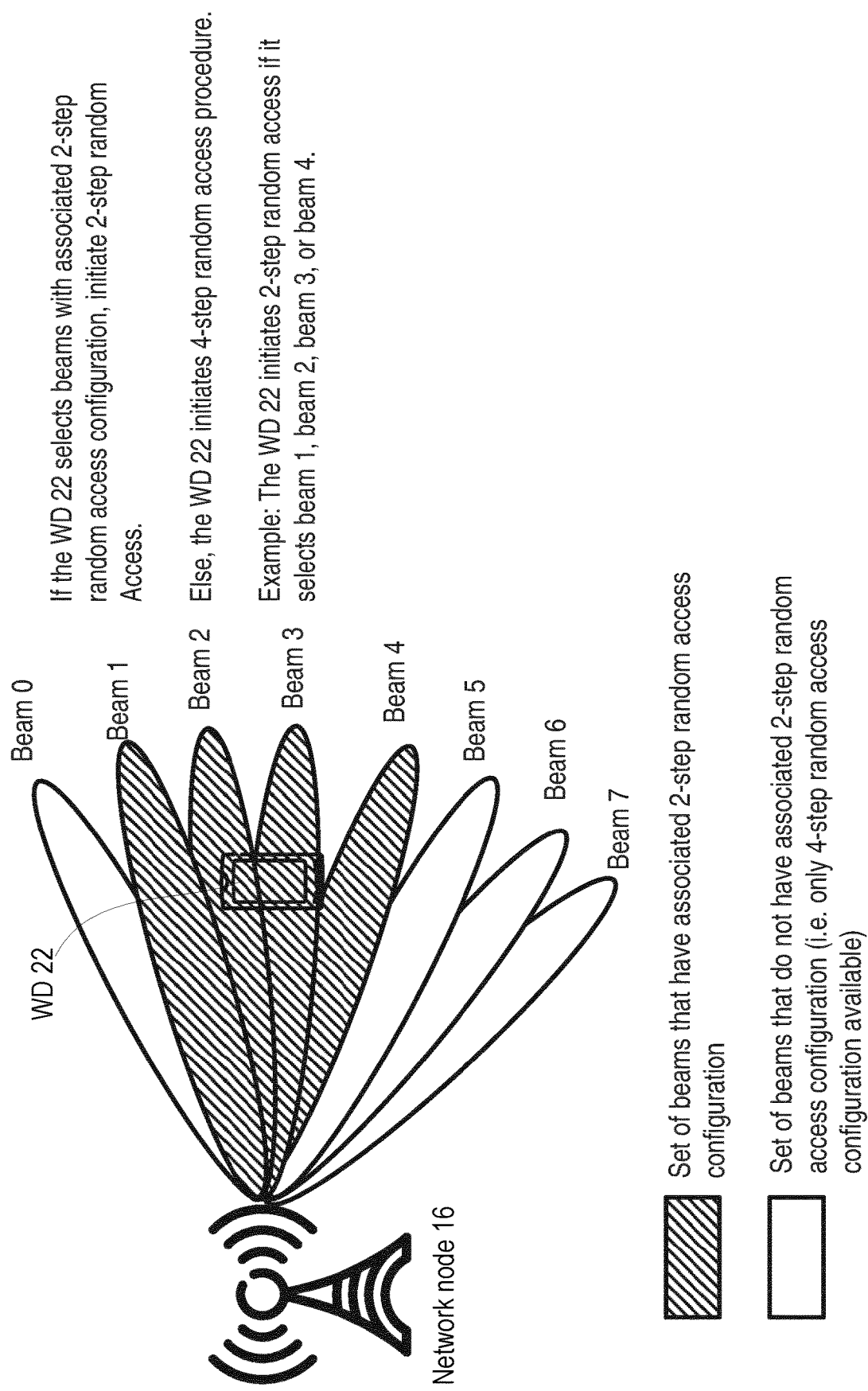
FIG. 25 is an example of RA method selection.

If the selected beam (e.g., selected SSB) has an associated 2-step RACH configuration, the WD 22 such as via one or more of processing circuitry 84, processor 86, radio interface 82, random access unit 34, etc., initiates 2-step RA procedure using that mapped configuration. FIG. 25 is a diagram of RA configurations mapping and/or associated with one or more beams. The configuration in this context may include a mapping between the selected beam and a physical uplink shared channel (PUSCH) configuration (for transmission of MsgAPUSCH).

g) The condition above may be a necessary condition in some embodiments, but the method, depending on the embodiment, may also comprise further conditions to be tested before the WD 22 initiates 2-step RA procedure for the selected beam such as that the radio channel quality conditions (e.g., RSRP, RSRQ and/or SINR) for the selected beam (e.g., selected SSB or CSI-RS) is above at least one threshold as determined by the WD 22 such as via one or more of processing circuitry 84, processor 86, radio interface 82, random access unit 34, etc. As an example, the WD 22 may initiate 2-step RA if resources are configured and the channel quality is above a configured or standardized threshold, but instead initiates 4-step RA if the channel quality is below the threshold.

Else, if the selected beam (e.g., selected SSB or CSI-RS) does not have an associated 2-step RACH configuration, the WD 22 such as via one or more of processing circuitry 84, processor 86, radio interface 82, random access unit 34, etc., may choose an alternative way of accessing the network. Such alternative ways, and the actions involved, are elaborated herein. For instance, the WD 22 such as via one or more of processing circuitry 84, processor 86, radio interface 82, random access unit 34, etc., may initiate 4-step RA procedure using a 4-step RA configuration that maps to the same beam.

At this point, the WD 22 such as via one or more of processing circuitry 84, processor 86, radio interface 82, random access unit 34, etc., may detect that the attempt to conclude the initiated random access process was unsuccessful and this is where the WD 22 such as via one or more of processing circuitry 84, processor 86, radio interface 82, random access unit 34, etc., performs steps of the method (which include the detection of an unsuccessful random access attempt and the actions triggered by this detection):

Detecting that an initiated 2-step random access procedure was unsuccessful. This may include:
    a) Reception such as via one or more of processing circuitry 84, processor 86, radio interface 82, random access unit 34, etc., of an RAR message, or an RAR-like message, in response to a MsgA transmission. That is an indication that the robust preamble transmission was successful, but not the less robust $MsgA_{PUSCH}$ transmission on the PUSCH i.e. the $MsgA_{PUSCH}$ transmission was unsuccessful.
    b) Absence of a response at the WD 22 in response to a MsgA transmission (e.g., after expiration of a timer or response window). That is an indication that not even the robust preamble transmission was successful.
    c) Receiving such as via one or more of processing circuitry 84, processor 86, radio interface 82, random access unit 34, etc., a MsgB containing contention resolution information, e.g., a WD Contention Resolution Identity MAC CE, indicating that the MsgB is intended for another WD 22 (i.e., contention resolution failure).
    d) Any other unsuccessful 2-step RA detection mechanism.

After the failure detection step, the method can follow different paths including different steps, depending on the type of unsuccessful 2-step RA detection. Moreover, for each of those method paths, there are different alternative sets of steps, corresponding to different embodiments including alternative steps. These alternative paths are discussed below.

Method Path A: WD 22 Actions Upon Reception of a RAR Message, or a RAR-Like Message, in Response to a MsgA Transmission Note: These steps may be applied to any other type of failure detection case which implies that the network node 16, e.g., radio base station, such as a gNB, was able to receive the RACH preamble but not the PUSCH transmission (or was not able to process the content of the PUSCH transmission, e.g., due to processing resource shortage).

Among possible WD 22 actions with this detection of an unsuccessful attempt are as follows:

Upon detecting an unsuccessful attempt to complete 2-step RA, where the detection of an unsuccessful attempt consists of reception of a RAR message or a RAR-like message (e.g., like a fallback RAR indicated by the network) after MsgA transmission, the WD 22 such as via one or more of processing circuitry 84, processor 86, radio interface 82, random access unit 34, etc., uses the received UL grant in the RAR or RAR-like message to transmit Msg3 (i.e., the WD 22 falls back and continues with 4-step RA) considering the same previously selected beam the WD 22 has used to map to 2-step RA resources in the first attempt (i.e. the same SSB or the same CSI-RS) and transmits in the same direction as previously (e.g. with similar beamforming properties). In this fallback to 4-step RA, the following conditions may apply:

If that same selected beam (where the unsuccessful 2-step RA occurred) is a CSI-RS beam (e.g., uses CSI-RS as QCL source) and has CFRA resources configured for that CSI-RS and if existing conditions for CFRA are fulfilled (e.g., validity timers, radio channel quality conditions, etc.):
      i) The WD 22 such as via one or more of processing circuitry 84, processor 86, radio interface 82, random access unit 34, etc., continues with CFRA in accordance with a configuration associated with that CSI-RS, i.e., after transmitting Msg3 (i.e., essentially a retransmission of the MsgA PUSCH transmission), the WD 22 does not expect a contention resolution message, i.e., at that point the WD 22 considers the random access procedure successful (and performs consequent actions, e.g., stop timers, etc.).
      ii) Note concerning what is meant by contention free random access (CFRA). The same selected resource for the first transmission has an associated 2-step RA resource and an associated 4-step RA resource (e.g., to be used in case of fallback). The 4-step RA configuration may either be CBRA or CFRA. This example shows the CFRA case where the WD 22 such as via one or more of processing circuitry 84, processor 86, radio interface 82, random access unit 34, etc., sends MsgA, receives the fallback RAR or RARlike message, (i.e., the PUSCH part of MsgA) but does not expect a contention resolution message in response (since CFRA was configured for 4-step RA for that resource).
      iii) One possible configuration, for the sake of improving the chances of at least having a good fallback performance is that the network node 16 such as via one or more of processing circuitry 68, processor 70, radio interface 62, configuration unit 33, etc., allocates a dedicated CFRA preamble (regardless of whether the network node 16 also allocated dedicated PUSCH resources for $MsgA_{PUSCH}$ transmission in the 2-step RA configuration). Hence, if upon transmitting a first MsgA the WD 22 such as via one or more of processing circuitry 84, processor 86, radio interface 82, random access unit 34, etc., receives the fallback RAR or RAR-like message, this is an indication that preamble detection succeeded, but not $MsgA_{PUSCH}$ reception. Then, the WD 22 such as via one or more of processing circuitry 84, processor 86, radio interface 82, random access unit 34, etc., sends Msg3 (i.e. retransmits $MsgA_{PUSCH}$) using the UL grant in the RAR or RAR-like message but does not expect a contention resolution message in response.
    Else if that same selected beam (where the unsuccessful 2-step RA occurred) is an SSB beam (e.g., uses SSB as quasi collocated (QCL) source) and has CFRA resources configured for that SSB and if conditions for CFRA are fulfilled (e.g., validity timers, radio channel quality conditions, etc.):
      a) The WD 22 such as via one or more of processing circuitry 84, processor 86, radio interface 82, random access unit 34, etc., continues with CFRA in accordance with a configuration associated with that SSB, i.e., after Msg3 transmission (i.e., $MsgA_{PUSCH}$ retransmission) using the UL grant in the RAR or RAR-like message, the WD 22 does not expect a contention resolution message in response.

b) Note: Clarification of what is meant by CFRA is as follows. The same selected resource for the first transmission has an associated 2-step RA resource and an associated 4-step RA resource (e.g., to be used in case of fallback). That 4-step RA configuration may either be CBRA or CFRA. This example shows the CFRA case where the WD 22 such as via one or more of processing circuitry 84, processor 86, radio interface 82, random access unit 34, etc., sends MsgA, receives the fallback RAR or RAR-like message, retransmits Msg3 (i.e., the PUSCH part of MsgA) but does not expect a contention resolution message in response (since CFRA was configured for 4-step RA for that resource).

c) One possible configuration, for the sake of improving the chances of at least having a good fallback performance is that the network node 16 allocates a dedicated CFRA preamble (regardless of whether the network node 16 also allocated a dedicated PUSCH resources for $MsgA_{PUSCH}$ transmission in the 2-step RA configuration or not). Hence, if upon transmitting a first MsgA the WD 22 such as via one or more of processing circuitry 84, processor 86, radio interface 82, random access unit 34, etc., receives the fallback RAR or RAR-like message, this is an indication that preamble detection succeeded, but not $MsgA_{PUSCH}$ reception. Then, the WD 22 such as via one or more of processing circuitry 84, processor 86, radio interface 82, random access unit 34, etc., sends Msg3 (i.e., retransmits $MsgA_{PUSCH}$) using the UL grant in the RAR or RAR-like message but does not expect a contention resolution message in response.

Else if that same selected beam (where the unsuccessful 2-step RA occurred) is an SSB beam (e.g., uses SSB as QCL source) and has CBRA resources configured for that SSB and if conditions for CBRA are fulfilled (e.g., validity timers, radio channel quality conditions, etc.):

a) The WD 22 such as via one or more of processing circuitry 84, processor 86, radio interface 82, random access unit 34, etc., continues with CBRA in accordance with a configuration associated with that SSB resource, i.e., after Msg3 transmission (i.e., $MsgA_{PUSCH}$ retransmission) using the UL grant in the RAR or RAR-like message, the WD 22 expects a contention resolution message in response and acts accordingly.

b) Note: to clarify what is meant by CBRA. The same selected resource for the first transmission has an associated 2-step RA resource and an associated 4-step RA resource (e.g., to be used in case of fallback). And, that 4-step RA configuration may either be CBRA or CFRA. This example shows the CBRA case where the WD 22 such as via one or more of processing circuitry 84, processor 86, radio interface 82, random access unit 34, etc., sends MsgA, receives the fallback RAR or RAR-like message, retransmits Msg3 (i.e., the PUSCH part of MsgA) and expects a contention resolution message in response (since CBRA was configured for 4-step RA for that resource). Herein, the PUSCH resource in the 2-step RA could have been dedicated or common, but the 4-step parts are CBRA (i.e., the WD 22 may receive a contention resolution message in response to Msg3).

Figure 26:
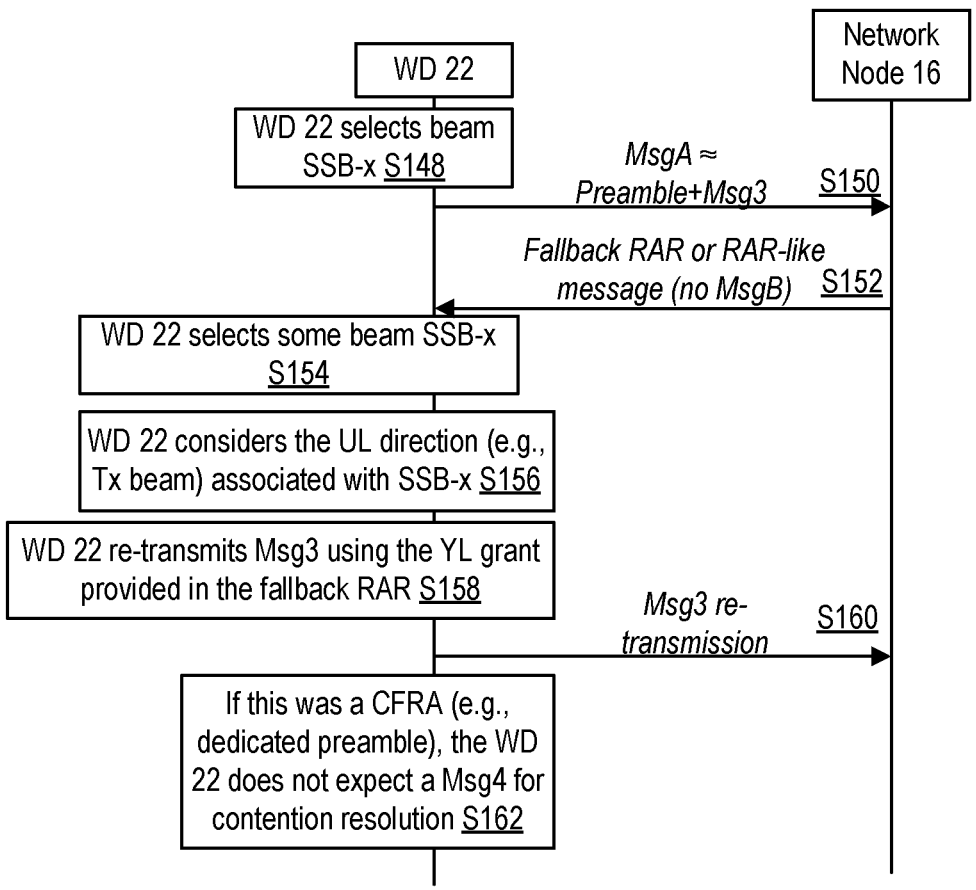
FIG. 26 is a flow diagram of signal exchange providing fall back from a two-step random access attempt.

FIG. 26 is a diagram of an example of WD 22 actions with the detection of an unsuccessful attempt as described above. WD 22 selects beam SSb-x (Block S148). MsgA (e.g., preamble+Msg3) is transmitted to network node 16 (Block S150). Fallback RAR or RAR-like message (no MsgB) is received from network node 16 (Block S152). WD 22 select some beam SSB-x (Block S154). WD 22 considers the UL direction (e.g., Tx beam) associated with SSB-x (Block S156). WD 22 re-transmits Msg3 using the UL grant provided in the fallback RAR (Block S158). Msg3 retransmission is performed by the WD 22 (S160). If this was a CFRA (e.g., dedicated preamble), the WD 22 does not expect a Msg4 for contention resolution (Block S162).

Figure 27:
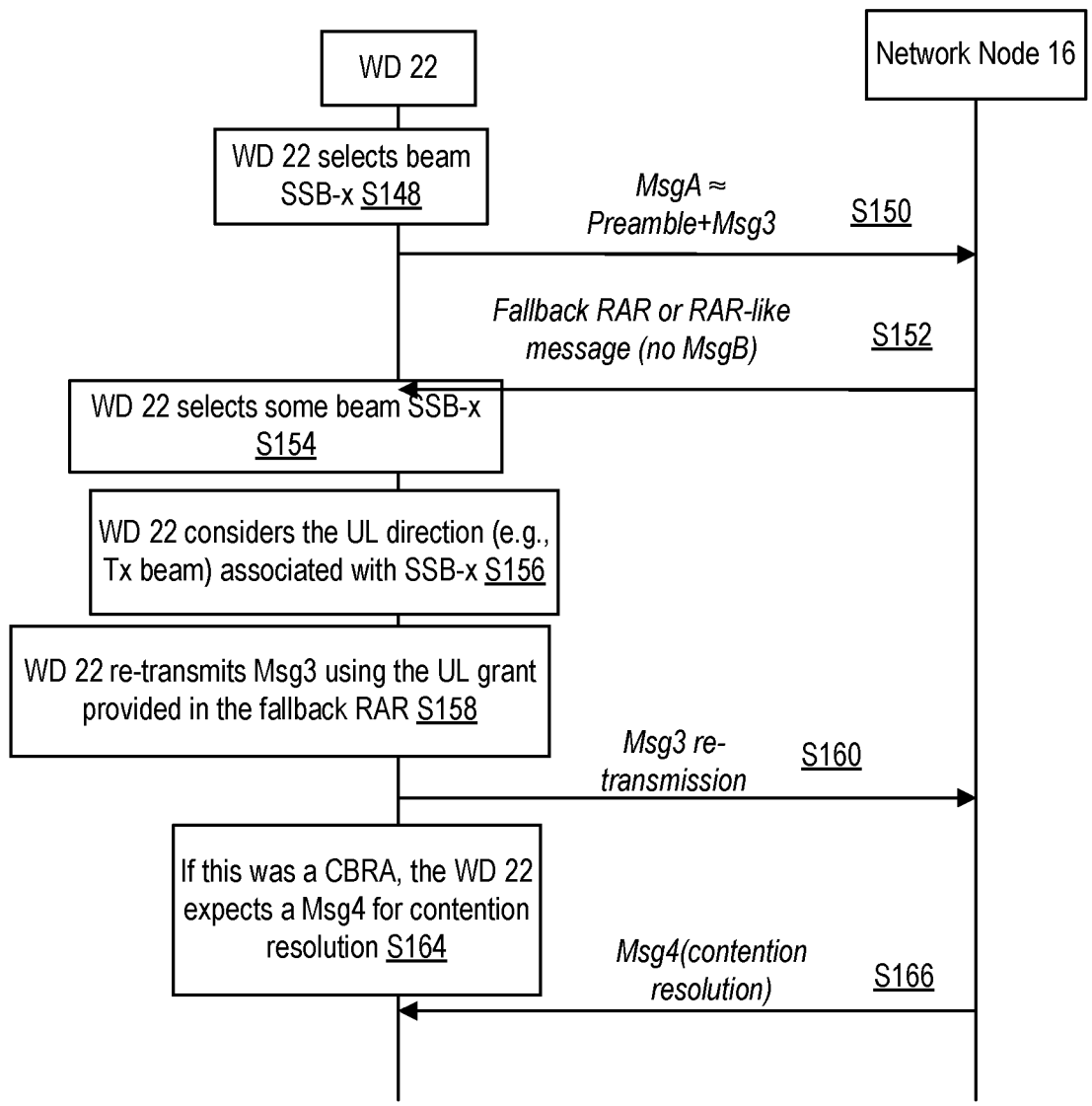
FIG. 27 is an alternative flow diagram of signal exchange providing fall back from a two-step random access attempt.
Figure 28:
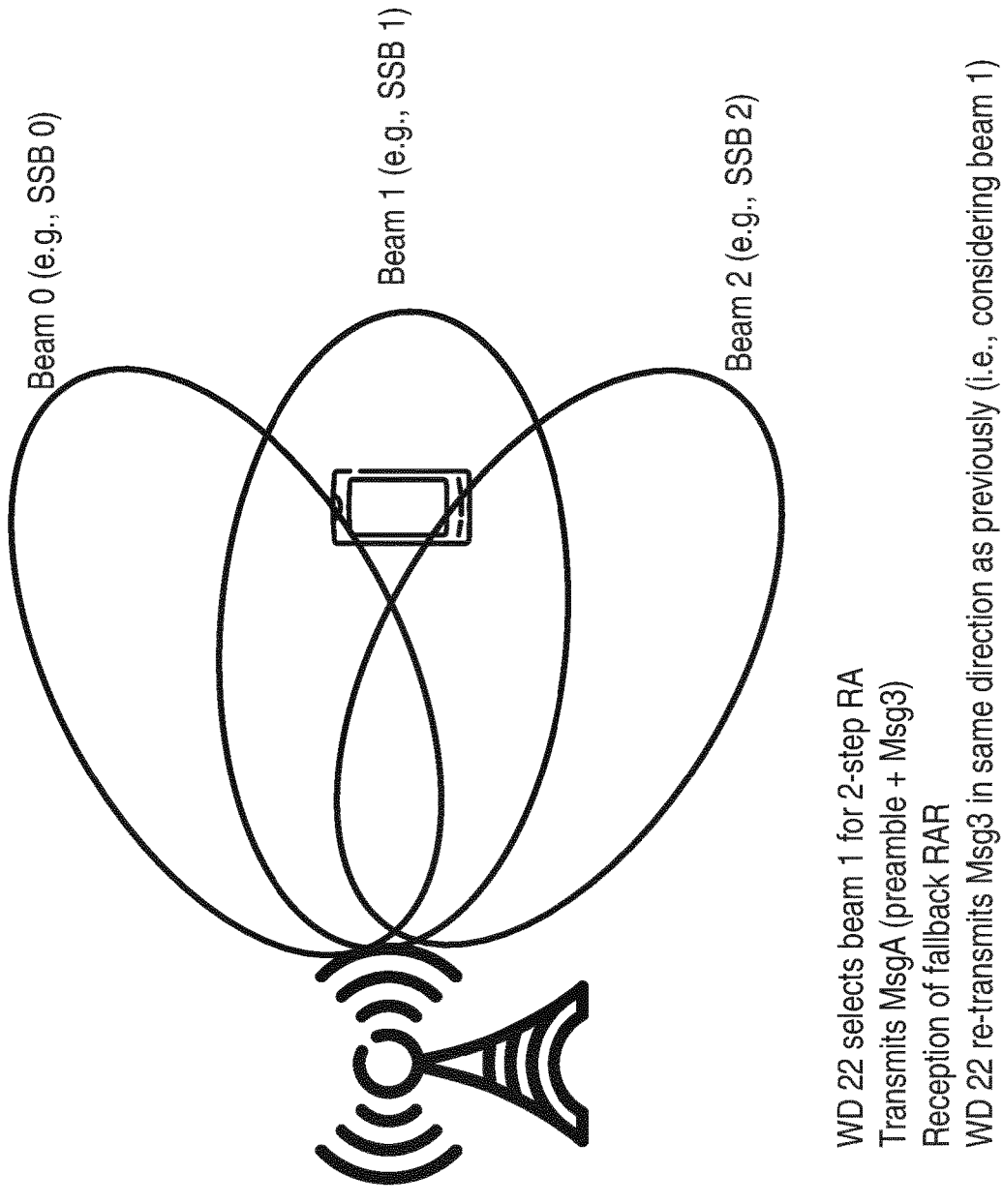
FIG. 28 illustrates beam selection and reception of fallback RAR.

FIG. 27 is a diagram of another example process where some Blocks have already been described with respect to FIG. 26. If the WD 22 has selected SSB-x for 2-step RA and receives in response an RAR or RAR-like message, the WD 22 such as via one or more of processing circuitry 84, processor 86, radio interface 82, random access unit 34, etc., continues with 4-step RA using the configuration associated with the same SSB-x (i.e., considering the same SSB-x (beam) as the selected SSB-x (beam)). Or, if the WD 22 has selected CSI-RS-y for 2-step RA and receives in response a RAR or RAR-like message, the WD 22 such as via one or more of processing circuitry 84, processor 86, radio interface 82, random access unit 34, etc., continues with 4-step RA using the configuration associated with the same CSI-RS-y (i.e., considering the same CSI-RS-y (beam) as the selected CSI-RS-y (beam)), as illustrated in FIG. 28. In particular, if this was a CBRA, the WD 22 expects a Msg4 for contention resolution (Block S164). Msg4 (contention resolution) is received at WD 22 (Block S166).

Another alternative, also called fallback with beam re-selection is described as follows:

Upon detecting an unsuccessful attempt to complete 2-step RA, where the detection of an unsuccessful attempt consists of reception of an RAR message or an RAR-like message (e.g., like a fallback RAR indicated by the network node 16) after MsgA transmission, the WD 22 such as via one or more of processing circuitry 84, processor 86, radio interface 82, random access unit 34, etc., uses the received UL grant in the RAR or RAR-like message to transmit Msg3 (i.e., the WD 22 falls back and continues with 4-step RA) considering a different selected beam than the one the WD 22 has used to map to 2-step RA resources in the first attempt (i.e., a different SSB or a different CSI-RS) and transmits in the direction of the newly selected beam. This may be called a fallback to 4-step RA with beam re-selection. The following conditions may apply:

a) The network node 16, such as a radio base station, e.g., gNB, may support digital receive beamforming, in order to optimally receive the transmission with the new UL TX beam forming.

b) If that new beam is a CSI-RS beam (e.g., uses CSI-RS as QCL source) and has CFRA resources configured for that CSI-RS and if existing conditions for CFRA are fulfilled (e.g., validity timers, radio channel quality conditions, etc.):

i) The WD 22 such as via one or more of processing circuitry 84, processor 86, radio interface 82, random access unit 34, etc., continues with CFRA in accordance with a configuration associated with that CSI-RS, i.e., after Msg3 transmission (i.e., $MsgA_{PUSCH}$ re-transmission), the WD 22 does not expect a contention resolution message in response, i.e., the WD 22 considers the random access procedure successful (and performs actions accordingly, e.g., stop timers, etc.).

c) Else if that new beam is an SSB beam (e.g., uses SSB as QCL source) and has CFRA resources configured for that SSB and if existing conditions for CFRA are fulfilled (e.g., validity timers, radio channel quality conditions, etc.):
  i) The WD 22 such as via one or more of processing circuitry 84, processor 86, radio interface 82, random access unit 34, etc., continues with CFRA in accordance with a configuration associated with that SSB, i.e., after Msg3 transmission (i.e., $MsgA_{PUSCH}$ retransmission), the WD 22 does not expect a contention resolution message in response, i.e., the WD 22 considers the random access procedure successful (and performs actions accordingly, e.g., stop timers, etc.).

d) Else if that new selected beam is an SSB beam (e.g., uses SSB as QCL source) and has CBRA resources configured for that SSB and if existing conditions for CBRA are fulfilled (e.g., validity timers, radio channel quality conditions, etc.):
  i) The WD 22 such as via one or more of processing circuitry 84, processor 86, radio interface 82, random access unit 34, etc., continues with CBRA in accordance with a configuration associated with that SSB, i.e., after Msg3 transmission (i.e., $MsgA_{PUSCH}$ retransmission), the WD 22 expects a contention resolution message in response and acts accordingly.

Figure 29:
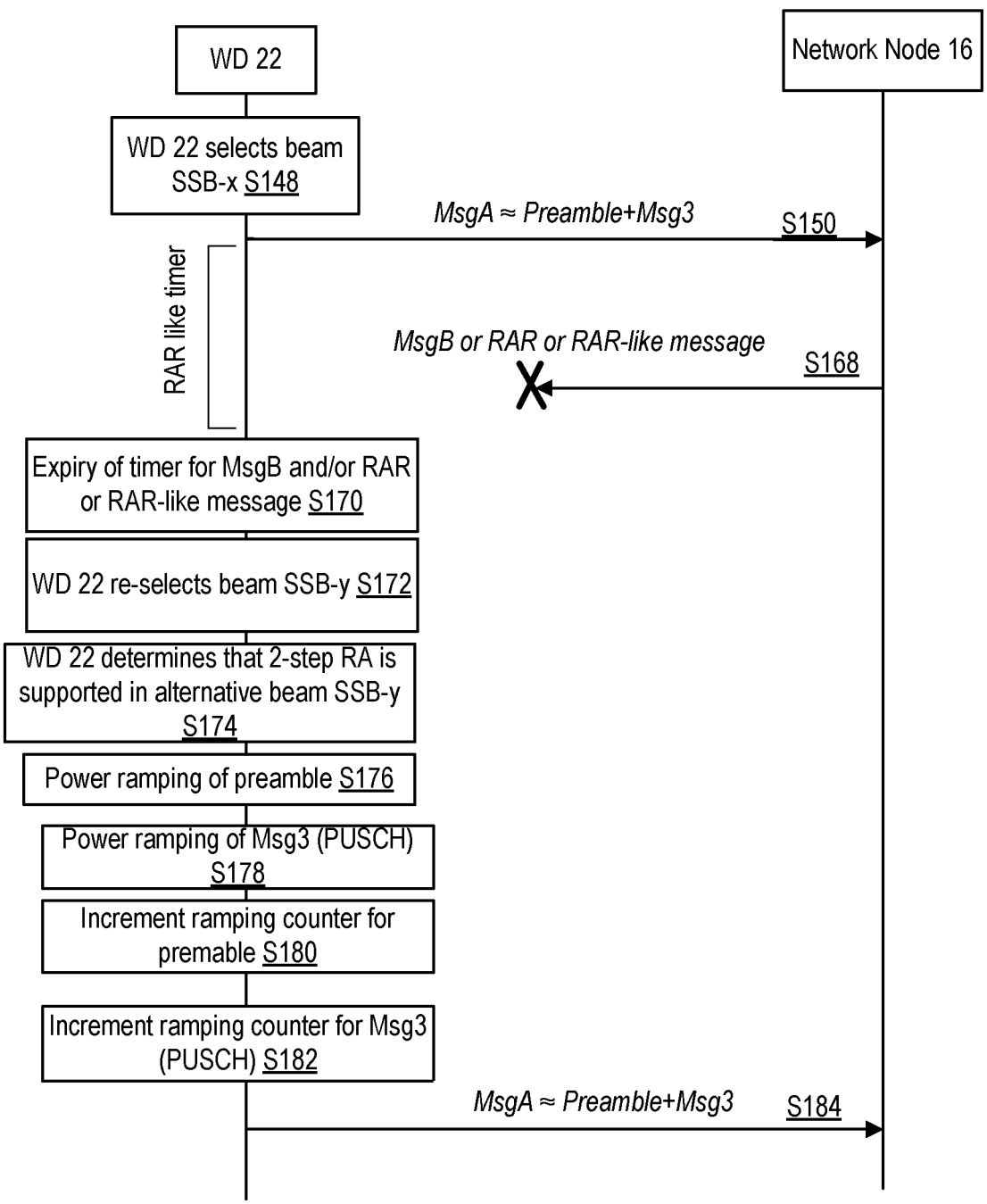
FIG. 29 is an example of WD actions when, upon lack of reception of RAR or RAR-like message, the WD retries 2-step RA in a new beam.

Method Path B: Actions Upon Expiry of a Timer or a Time Window for Reception of MsgB and/or a RAR Message or a RAR-Like Message, i.e., Actions Upon Determination of Lack of Response to the MsgA Transmission FIG. 29 is an example signaling diagram of the method path B, according to one or more embodiments of the disclosure. Some Blocks have already been described with respect to FIG. 26. MsgB or RAR or RAR-like message is not received by WD 22 (Block S168). Expiry of timer for Msgb and/or RAR or RAR-like message occurs (Block S170). WD 22 re-selects beam SSB-y (Block S172). WD 22 determines that 2-step RA is supported in alternative beam SSB-y (Block S174). Power ramping of preamble is performed by WD 22 (Block S176). Power ramping of Msg3 (PUSCH) is performed by WD 22 (Block S178). Increment ramping counter for preamble by WD 22 (Block S180). Increment ramping counter for Msg3 by WD 22 (Block S182). MsgA (e.g., Preamble+Msg3) is transmitted to network node 16 (Block S184).

Note: These steps may be applied to any other type of failure detection case which implies that the network node 16 such as radio base station, gNB, etc., was not able to receive the preamble (or was not able to process it, e.g. due to processing resource shortage or too many simultaneously received preambles).

Among possible WD actions with this detection of an unsuccessful 2-step RA attempt are as follows:

Upon detecting an unsuccessful attempt to complete 2-step RA, where the detection is based on determination of absence of response to the MsgA transmission, e.g., based on expiration of a timer or time window for reception of a MsgB and/or a RAR message or a RAR-like message, the WD 22 has not received the information of MsgB and has not received the information included in a RAR message. In some embodiments, the WD 22 such as via one or more of processing circuitry 84, processor 86, radio interface 82, random access unit 34, etc., when faced with this situation, performs at least one of the following sub-alternatives:

a) 4-step RA in a new attempt in the same beam. The WD 22 such as via one or more of processing circuitry 84, processor 86, radio interface 82, random access unit 34, etc., selects/re-selects the same beam as previously (e.g., if conditions are fulfilled at least for 4-step RA, e.g., that the radio channel quality is above a threshold, and performs preamble transmission power ramping (increases the transmission power according to configuration) and re-transmits a preamble, but only for 4-step RA. In other words, in this re-attempt the WD 22 does not transmit MsgA (i.e., it does not transmit the Msg3-like content on PUSCH resources and expects a RAR message in response to the preamble).
  i) In this alternative the WD 22 such as via one or more of processing circuitry 84, processor 86, radio interface 82, random access unit 34, etc., will only make one attempt for 2-step RA in the same beam, and if that fails, the WD 22 will not try to do 2-step RA again in the same beam. So even if the reattempt with 4-step RA fails (e.g., the RAR message is not received), the WD 22 may re-select another beam. But if the WD 22 remains with the same beam, the WD 22 will only continue with 4-step RA re-attempts until success or final failure detection (maximum number of attempts reached).

b) 4-step RA with preamble transmit power ramping in a new attempt in another beam. The WD 22 such as via one or more of processing circuitry 84, processor 86, radio interface 82, random access unit 34, etc., determines if conditions are fulfilled at least for 4-step RA (e.g., that the radio channel quality is above a threshold) in another beam, and if so, the WD 22 such as via one or more of processing circuitry 84, processor 86, radio interface 82, random access unit 34, etc., selects/re-selects this other beam (which could be assumed to be the second best beam from a radio channel quality perspective). Then, the WD 22 such as via one or more of processing circuitry 84, processor 86, radio interface 82, random access unit 34, etc., performs preamble transmission power ramping (increases the transmission power according to a configuration which may be based on the perceived DL path loss in this new beam) and re-transmits a preamble, but only for 4-step RA. In other words, in this re-attempt, the WD 22 does not transmit MsgA (i.e., the WD 22 does not transmit the Msg3-like content on PUSCH resources and expects a RAR message in response to the preamble).
  i) In this alternative the WD 22 such as via one or more of processing circuitry 84, processor 86, radio interface 82, random access unit 34, etc., will only do one attempt for 2-step RA. That is, if that fails, the WD 22 will not try to do 2-step RA again. So even if the re-attempt with 4-step RA fails (e.g., the RAR message is not received), the WD 22 may re-select to another beam, but the WD 22 such as via one or more of processing circuitry 84, processor 86, radio interface 82, random access unit 34, etc., will only continue with 4-step RA re-attempts until success or final failure detection (maximum number of attempts reached).

c) 4-step RA without preamble transmit power ramping in a new attempt in another beam. The WD 22 such as via one or more of processing circuitry 84, processor 86, radio interface 82, random access unit 34, etc., determines if conditions are fulfilled at least for 4-step RA (e.g., that the radio channel quality is above a threshold) in another beam, and if so, the WD 22 selects/re-selects this other beam (e.g., which may be assumed to be the second best beam from a radio channel quality perspective). The WD 22 such as via one or more of processing circuitry 84, processor 86, radio interface 82, random access unit 34, etc., then re-transmits a preamble without transmit power ramping in the new beam. Note that the preamble transmit power still can be different than in the first attempt, since the preamble transmit power is set in relation to the perceived DL path loss in the new beam. Despite selecting/re-selecting a new beam, the WD 22 only attempts 4-step RA. In other words, in this re-attempt, the WD 22 does not transmit PUSCH part of MsgA (i.e., the WD 22 does not transmit the Msg3-like content on PUSCH resources and expects a RAR message in response to the preamble).

i) In this alternative the WD 22 such as via one or more of processing circuitry 84, processor 86, radio interface 82, random access unit 34, etc., will only do one attempt for 2-step RA. That is, if that fails, the WD 22 will not try to do 2-step RA again. So even if the re-attempt with 4-step RA fails (e.g., the RAR message is not received), the WD 22 such as via one or more of processing circuitry 84, processor 86, radio interface 82, random access unit 34, etc., may re-select to another beam, but the WD 22 will only continue with 4-step RA re-attempts until success or final failure detection (maximum number of attempts reached).

d) 2-step RA re-attempt without beam re-selection, with preamble transmit power ramping but without PUSCH transmit power ramping. The WD 22 such as via one or more of processing circuitry 84, processor 86, radio interface 82, random access unit 34, etc., stays with the same beam as previously (provided that the conditions for 2-step RA are still fulfilled (or optionally at least fulfilled for 4-step RA), e.g., that the radio channel quality is above a threshold) and performs preamble transmission power ramping (i.e., increases the transmission power according to configuration) and re-tries a 2-step RA procedure by transmitting a preamble (with increased transmit power) on PRACH resources and the remainder of MsgA (MsgA$_{PUSCH}$) on PUSCH resources without increasing the transmit power, i.e., no power ramping is applied for the transmission on PUSCH resources.

i) This case may be considered a re-attempt to perform 2-step RA which may be controlled by a timer that is started at first attempt to perform 2-step RA, and stopped upon successful 2-step RA. And, upon expiry, the WD 22 is not allowed to continue trying to perform 2-step RA, i.e., upon the timer expiry while the WD 22 is still performing random access (e.g. resource selection) the WD 22 such as via one or more of processing circuitry 84, processor 86, radio interface 82, random access unit 34, etc., either falls back to 4-step RA or declares RA failure. Whether to declare RA failure or fall back to 4-step RA may be controlled by configuration and/or by a separate timer (or counter) limiting the time for, or number of, 4-step RA attempts.

ii) This case may be considered a re-attempt to perform 2-step RA which may be controlled by a counter that is incremented at each attempt to perform 2-step RA. And, upon reaching its maximum value (configurable), the WD 22 is not allowed to continue trying to perform 2-step RA, i.e., 2-step RA is considered failed. If a separate counter is used for 4-step RA attempts and if this counter is still below its maximum value, the WD 22 may continue with 4-step RA with or without power ramping with or without beam selection/re-selection.

iii) This case may be considered a re-attempt to perform 2-step RA which may be controlled by a counter and a timer, according to behavior defined above. That is, whichever happens first out of timer expiry and the counter reaching its maximum value may trigger the WD 22 to stop trying to perform 2-step RA.

e) 2-step RA re-attempt without beam re-selection with MsgA power ramping, i.e., both preamble transmit power ramping and PUSCH transmit power ramping. The WD 22 such as via one or more of processing circuitry 84, processor 86, radio interface 82, random access unit 34, etc., stays/remains with the same beam as previously (provided that the conditions for 2-step RA are still fulfilled (or optionally at least fulfilled for 4-step RA), e.g., that the radio channel quality is above a threshold) and performs MsgA transmission power ramping (i.e., increases the transmission power according to configuration) and re-tries a 2-step RA procedure by transmitting a preamble (with increased transmit power) on PRACH resources and the remainder of MsgA on PUSCH resources with increased transmit power. Note that this will be based on the perceived DL path loss in the new beam, i.e., transmit power ramping is applied both for the preamble transmission and the PUSCH transmission. The transmit power ramping may involve the same power increase step for both the preamble transmission and the PUSCH transmission or different power increase steps for the preamble transmission and the PUSCH transmission.

i) This case may be considered a re-attempt to perform 2-step RA which may be controlled by a timer that is started at first attempt to perform 2-step RA and stopped upon successful 2-step RA. And, upon expiry of the timer, the WD 22 is not allowed to continue trying to perform 2-step RA. In other words, upon the timer expiry while the WD 22 is still performing random access (e.g., resource selection) the WD 22 such as via one or more of processing circuitry 84, processor 86, radio interface 82, random access unit 34, etc., either falls back to 4-step RA or declares RA failure. Whether to declare RA failure or fall back to 4-step RA may be controlled by configuration and/or by a separate timer (or counter) limiting the time for, or number of, 4-step RA attempts.

ii) This case may be considered a re-attempt to perform 2-step RA which may be controlled by a counter that is incremented at each attempt to perform 2-step RA. And, upon reaching its maximum value (configurable), the WD 22 is not allowed to continue trying to perform 2-step RA, i.e., 2-step RA is considered failed. If a separate counter is used for 4-step RA attempts and if this counter for 4-step RA is still below its maximum value, the WD 22 such as via one or more of processing circuitry 84, processor 86, radio interface 82, random access unit 34, etc., may continue with 4-step RA with or without power ramping with or without beam selection/re-selection.

iii) This case may be considered a re-attempt to perform 2-step RA which may be controlled by a counter and a timer, according to behavior defined above. That is, whichever happens first out of timer expiry and the counter reaching its maximum value may trigger the WD 22 to stop trying to perform 2-step RA.

f) 2-step RA re-attempt with beam re-selection and preamble transmit power ramping. The WD 22 such as via one or more of processing circuitry 84, processor 86, radio interface 82, random access unit 34, etc., selects/re-selects another beam (if conditions in that beam are fulfilled for 2-step RA, e.g., that 2-step RA configuration is available) and that the radio channel quality is above a threshold (or optionally that conditions are fulfilled at least for 4-step RA) and performs preamble transmission power ramping (i.e., increases the transmission power according to configuration, which may be based on the perceived DL path loss in this new beam) and re-tries a 2-step RA procedure by transmitting a preamble (with ramped transmit power) on PRACH resources and the remainder Msg3 (without transmit power ramping) on PUSCH resources. In other words, in this example, no power ramping is applied for the transmission on PUSCH resources.

i) This case may be considered a re-attempt to perform 2-step RA which may be controlled by a timer that is started at first attempt to perform 2-step RA and stopped upon successful 2-step RA. And, upon expiry, the WD 22 is not allowed to continue trying to perform 2-step RA, i.e., upon the timer expiry while the WD 22 is still performing random access (e.g., resource selection) the WD 22 such as via one or more of processing circuitry 84, processor 86, radio interface 82, random access unit 34, etc., either falls back to 4-step RA or declares RA failure. Whether to declare RA failure or fall back to 4-step RA may be controlled by configuration and/or by a separate timer (or counter) limiting the time for, or number of, 4-step RA attempts.

ii) This case may be considered a re-attempt to perform 2-step RA which may be controlled by a counter that is incremented at each attempt to perform 2-step RA. Upon reaching its maximum value (which is configurable), the WD 22 is not allowed to continue trying to perform 2-step RA. In other words, 2-step RA is considered to have failed. If a separate counter is used for 4-step RA attempts and if this counter for 4-step RA is still below its maximum value, the WD 22 such as via one or more of processing circuitry 84, processor 86, radio interface 82, random access unit 34, etc., may continue with 4-step RA with or without power ramping with or without beam selection/re-selection.

iii) This case may be considered a re-attempt to perform 2-step RA which may be controlled by a counter and a timer, according to behavior defined above. That is, whichever happens first out of timer expiry and the counter reaching its maximum value may trigger the WD 22 to stop trying to perform 2-step RA.

g) 2-step RA re-attempt with beam re-selection with MsgA transmit power ramping. The WD 22 such as via one or more of processing circuitry 84, processor 86, radio interface 82, random access unit 34, etc., selects/re-selects another beam if conditions in that beam are fulfilled for 2-step RA, e.g., that 2-step RA configuration is available, and that the radio channel quality is above a threshold (or optionally that conditions are fulfilled at least for 4-step RA) and performs preamble transmission power ramping (i.e., increases the transmission power according to a configuration, which may be based on the perceived DL path loss in this new beam). The WD 22 such as via one or more of processing circuitry 84, processor 86, radio interface 82, random access unit 34, etc., re-tries a 2-step RA procedure by transmitting a preamble (with increased transmit power) on PRACH resources and the remainder of MsgA on PUSCH resources (with increased transmit power, which may be based on the perceived DL path loss in the new beam). In other words, transmit power ramping is applied both for the preamble transmission and the PUSCH transmission. The transmit power ramping may involve the same power increase step for both the preamble transmission and the PUSCH transmission or different power increase steps for the preamble transmission and the PUSCH transmission. The transmit power ramping may involve the same power increase step for both the preamble transmission and the PUSCH transmission or different power increase steps for the preamble transmission and the PUSCH transmission.

i) This case may be considered a re-attempt to perform 2-step RA which may be controlled by a timer that is started at first attempt to perform 2-step RA and stopped upon successful 2-step RA. And, upon expiry, the WD 22 is not allowed to continue trying to perform 2-step RA, i.e., upon the timer expiry while the WD 22 is still performing random access (e.g., resource selection), the WD 22 such as via one or more of processing circuitry 84, processor 86, radio interface 82, random access unit 34, etc., either falls back to 4-step RA or declares RA failure. Whether to declare RA failure or fall back to 4-step RA may be controlled by configuration and/or by a separate timer (or counter) limiting the time for, or number of, 4-step RA attempts.

ii) This case may be considered a re-attempt to perform 2-step RA which may be controlled by a counter that is incremented at each attempt to perform 2-step RA. And, upon reaching its maximum value (which is configurable), the WD 22 is not allowed to continue trying to perform 2-step RA, i.e., 2-step RA is considered failed. If a separate counter is used for 4-step RA attempts and if this counter for 4-step RA is still below its maximum value, the WD 22 may continue with 4-step RA with or without power ramping with or without beam selection/re-selection.

iii) This case may be considered a re-attempt to perform 2-step RA which may be controlled by a counter and a timer, according to behavior defined above. That is, whichever happens first out of timer expiry and the counter reaching its maximum value may trigger the WD 22 to stop trying to perform 2-step RA.

h) 2-step RA re-attempt with beam re-selection without MsgA transmit power ramping. The WD 22 such as via one or more of processing circuitry 84, processor 86, radio interface 82, random access unit 34, etc., selects/re-selects another beam if conditions in that beam are fulfilled for 2-step RA, e.g., that 2-step RA configuration is available and that the radio channel quality is above a threshold (or optionally that conditions are fulfilled at least for 4-step RA). The WD 22 such as via one or more of processing circuitry 84, processor 86, radio interface 82, random access unit 34, etc., then re-transmits a preamble on PRACH resources without transmit power ramping in the new beam (note that the preamble transmit power still can be different than in the first attempt, since the preamble transmit power is set in relation to the perceived DL path loss in the new beam) and also re-transmits the remainder of MsgA on PUSCH resources without transmit power ramping (note that the PUSCH transmit power still can be different than in the first attempt, since the PUSCH transmit power is set in relation to the perceived DL path loss in the new beam). In other words, no power ramping is applied for any of the transmissions of the MsgA parts.

i) This case may be considered a re-attempt to perform 2-step RA which may be controlled by a timer that is started at first attempt to perform 2-step RA and stopped upon successful 2-step RA. And, upon expiry, the WD 22 is not allowed to continue trying to perform 2-step RA, i.e., upon the timer expiry while the WD 22 is still performing random access (e.g., resource selection), the WD 22 such as via one or more of processing circuitry 84, processor 86, radio interface 82, random access unit 34, etc., either falls back to 4-step RA or declares RA failure. Whether to declare RA failure or fall back to 4-step RA may be controlled by configuration and/or by a separate timer (or counter) limiting the time for, or number of, 4-step RA attempts.

ii) This case may be considered a re-attempt to perform 2-step RA which may be controlled by a counter that is incremented at each attempt to perform 2-step RA. And, upon reaching its maximum value (which is configurable), the WD 22 is not allowed to continue trying to perform 2-step RA, i.e., 2-step RA is considered failed. If a separate counter is used for 4-step RA attempts and if this counter is still below its maximum value, the WD 22 such as via one or more of processing circuitry 84, processor 86, radio interface 82, random access unit 34, etc., may continue with 4-step RA with or without power ramping with or without beam selection/re-selection.

This case may be considered a re-attempt to perform 2-step RA which may be controlled by a counter and a timer, according to behavior defined above. That is, whichever happens first out of timer expiry and the counter reaching its maximum value may trigger the WD 22 to stop trying to perform 2-step RA.

The signaling flow of FIG. 27 illustrates the method path B alternative where beam selection/re-selection and MsgA transmit power ramping are performed. The other method path B alternatives with re-attempted 2-step RA may be derived from this one by skipping any of the step(s).

Method Path C. Actions Upon Reception of a MsgB Containing Contention Resolution Information, e.g., a WD Contention Resolution Identity MAC CE, Indicating that the MsgB is Intended for Another WD 22 (i.e., Contention Resolution Failure)

This type of failure detection implies that a preamble collision occurred and that the WD 22 did not manage to successfully transmit MsgA to the network node 16 such as radio base station or gNB, while another WD 22 using the same preamble managed to successfully do so. The reason may be that the WD 22 used too low transmit power or there may be other reason. All the alternatives of method path B are applicable for this type of failure detection too (i.e., for method path C), with preference for alternatives where 2-step RA is re-attempted.

Strategies for Multi-Step Application of the Method (i.e., when the RA Attempt Fails Multiple Consecutive Times)

The procedures described above for the different alternatives for the different method paths may be repeated if the WD 22 fails RA multiple consecutive times. For every consecutive failure, the method path is governed by the type of failure detection. However, even if the same type of failure detection occurs, e.g., absence of MsgB and/or RAR message or RAR-like message, and the same method path thus applies, the WD 22 may choose the same or a different alternative (of the alternatives applicable for that method path) to use within that method path for every new failure detection.

Furthermore, when multiple beams (e.g., RA configurations associated with multiple SSBs and/or CSI-RSs) are tried, the WD 22 such as via one or more of processing circuitry 84, processor 86, radio interface 82, random access unit 34, etc., can apply different (configured or implementation-dependent) multi-step strategies for selecting beams and how RA methods are applied:

With one strategy (1), the WD 22 such as via one or more of processing circuitry 84, processor 86, radio interface 82, random access unit 34, etc., tries 2-step RA in a first beam and if that fails, the WD re-selects another beam and re-tries 2-step RA in that beam, etc. When all beams fulfilling the conditions for 2-step RA have been tried, the WD 22 such as via one or more of processing circuitry 84, processor 86, radio interface 82, random access unit 34, etc., returns to (i.e., re-selects) the first beam (or the beam with the best radio channel quality) and tries 4-step RA. If that fails, the WD 22 may re-select to another beam and tris 4-step RA, etc.

With another strategy (2), the WD 22 such as via one or more of processing circuitry 84, processor 86, radio interface 82, random access unit 34, etc., tries 2-step RA in a first beam and if the 2-step RA fails, the WD 22 tries 4-step RA in the same beam. If that also fails, the WD 22 such as via one or more of processing circuitry 84, processor 86, radio interface 82, random access unit 34, etc., re-selects a new beam and first tries 2-step RA and then (if beneficial) 4-step RA in the new beam, etc. That is, the WD 22 tries both 2-step RA and 4-step RA in each beam before re-selecting a new beam.

The two strategies above can be seen as two basic strategies. Mixtures, hybrids, variations and extensions of these basic strategies are possible. Some examples include:

The WD 22 such as via one or more of processing circuitry 84, processor 86, radio interface 82, random access unit 34, etc., tries 2-step RA multiple times, with or without transmit power ramping for the PRACH and/or PUSCH transmission, before re-selecting a new beam. (This is an extension/variation of basic strategy 1.)

The WD 22 such as via one or more of processing circuitry 84, processor 86, radio interface 82, random access unit 34, etc., tries 2-step RA one or more times (with or without transmit power ramping for the PRACH and/or PUSCH transmission) and then tries 4-step RA one or more times (with or without transmit power ramping) before re-selecting a new beam. (This is an extension/variation of basic strategy 2).

The WD 22 such as via one or more of processing circuitry 84, processor 86, radio interface 82, random access unit 34, etc., tries 2-step RA one or more times (with or without transmit power ramping for the PRACH and/or PUSCH transmission) in two or more beams (but not necessarily all beams fulfilling the conditions of 2-step RA, e.g., N beams, then returns to the first beam (or the beam with best radio channel quality) and tries 4-step RA one or more times in each beam in an equal number of beams, i.e., the N beams. The WD 22 such as via one or more of processing circuitry 84, processor 86, radio interface 82, random access unit 34, etc., then goes back to trying 2-step RA, but this time continues with the $(N+1)^{th}$ best beam (which fulfills the conditions for 2-step RA). That is, the WD 22 such as via one or more of processing circuitry 84, processor 86, radio interface 82, random access unit 34, etc., may consistently try 2-step RA in a set of beams before trying 4-step RA in a set of beams and then try 2-step RA in another set of beams and then 4-step RA in another set of beams, etc. (This is a hybrid and extension/variation of both basic strategies).

The WD 22 such as via one or more of processing circuitry 84, processor 86, radio interface 82, random access unit 34, etc., tries 2-step RA once in each of a first set of beams (e.g., all beams fulfilling the conditions for 2-step RA), then tries 4-step RA in a second set of beams. If failure still persists, the WD 22 such as via one or more of processing circuitry 84, processor 86, radio interface 82, random access unit 34, etc., retries 2-step RA in the first set of beams, but this time with ramped transmit power (for the PRACH transmission, the PUSCH transmission or both). If this still fails, the WD 22 such as via one or more of processing circuitry 84, processor 86, radio interface 82, random access unit 34, etc., may retry 4-step RA in the second set of beams. Note that the first set of beams and the second set of beams may contain the same beam. A reason for making the sets different may be that 2-step RA is not supported in all beams and that the second set of beams can be composed of beams with better radio channel quality, because they do not have to have associated 2-step RA configurations. (This is a hybrid and extension/variation of both basic strategies.)

Obviously, the above examples of hybrids/extensions/variations may be further varied, e.g., by varying the number of times a certain RA method is re-tried between consecutive beams, or by mixing/changing strategies between consecutive beams, etc. For instance, the WD 22 such as via one or more of processing circuitry 84, processor 86, radio interface 82, random access unit 34, etc., may follow a schedule like the following: Beam 1: try 2-step RA, beam 2: try 2-step RA followed by 4-step RA, beam 3: try only 4-step RA. Then, declare final failure or return to the first beam (beam 1) or re-select the beam with the best radio channel quality and try only 4-step RA. Intermediate steps with power ramping can be inserted. In another example, the WD 22 may follow basic strategy 1, but when no more beams fulfill the conditions for 2-step RA, there may still be one or more untried beam(s) fulfilling the conditions of 4-step RA and the WD 22 may try 4-step RA in this/those beam(s) before re-selecting the first beam to try 4-step RA in accordance with basic strategy 1. In yet another example, the WD 22 follows basic strategy 1, but does not try all beams that fulfill the conditions for 2-step RA. Instead, the WD 22 follows basic strategy 1 for a first set of beams and then, if failure persists, proceeds to perform basic strategy 1 for a second set of beams (where the beams of the first set assumedly and preferably have better radio channel quality than the beams of the second set), etc. The division into different sets may be based on radio channel quality thresholds or the number of beams in each set may be configured.

In any of these above described cases (i.e., method paths and alternatives), when it is described that the WD 22 such as via one or more of processing circuitry 84, processor 86, radio interface 82, random access unit 34, etc., selects or re-selects a beam, the method comprises the action where the WD 22 prioritizes CSI-RS based and contention-free RA, if available for the selected beam during the fallback to 4-step RA, i.e., prioritizes CSI-RS based and CFRA over at least one other RA configuration.

In all these above described cases the power ramping counter is increased each time the WD 22 fails to receive the RAR so that when a maximum number of attempts is reached, the WD 22 such as via one or more of processing circuitry 84, processor 86, radio interface 82, random access unit 34, etc., triggers random access failure. That may be modeled as a MAC level failure, since RA is a MAC level procedure and, that may trigger the MAC layer to notify upper layers so that upper layers may trigger other procedures, e.g., radio link re-establishment.

In the cases where the WD 22 is allowed to perform 2-step RA re-attempts there may be defined a maximum number of allowed attempts before the WD 22 falls back to 4-step RA only, i.e., when that number is reached the WD 22 may only perform 4-step RA regardless if the conditions for 2-step RA are fulfilled (e.g., availability of resources and radio conditions, like RSRP, RSRQ, SINR, etc.).

In any of these above described cases (i.e., method paths and alternatives), the PUSCH transmission of MsgA (i.e., the part of MsgA that is transmitted on the PUSCH and which exactly or approximately corresponds to Msg3) may be an RRC message like an RRCRequest, RRCResumeRequest, RRCResumeRequest1, RRCReestablishmentRequest, RRCReconfigurationComplete, etc.

The method also comprises the WD 22, in conjunction with beam selection/re-selection prioritizing beams with associated 2-step RA configuration, e.g., upon absence of MsgB and/or a RAR message or a RAR-like message in response to MsgA where the detection may be based on expiry of a timer or time window supervising the reception of MsgB and/or a RAR message or a RAR-like message. In that case, the WD 22 such as via one or more of processing circuitry 84, processor 86, radio interface 82, random access unit 34, etc., may search for these beams and if these fulfill the conditions for 2-step RA the WD 22 re-initiates 2-step RA.

The method also comprises the WD 22 being configured to perform any of these above described different sub-alternatives.

The method also comprises the WD 22 such as via one or more of processing circuitry 84, processor 86, radio interface 82, random access unit 34, etc., receiving the RAR-like message including one or more indication(s) on whether the WD 22 should retry 2-step RA or go to 4-step RA (either as a continuation of the already started RA procedure or as a re-started RA procedure), or which of the above-described strategies for multi-step application of the method the WD 22 should use.

See Appendix C for examples of possible changes to the 3GPP standards to implement the arrangements described herein.

Figure 30:
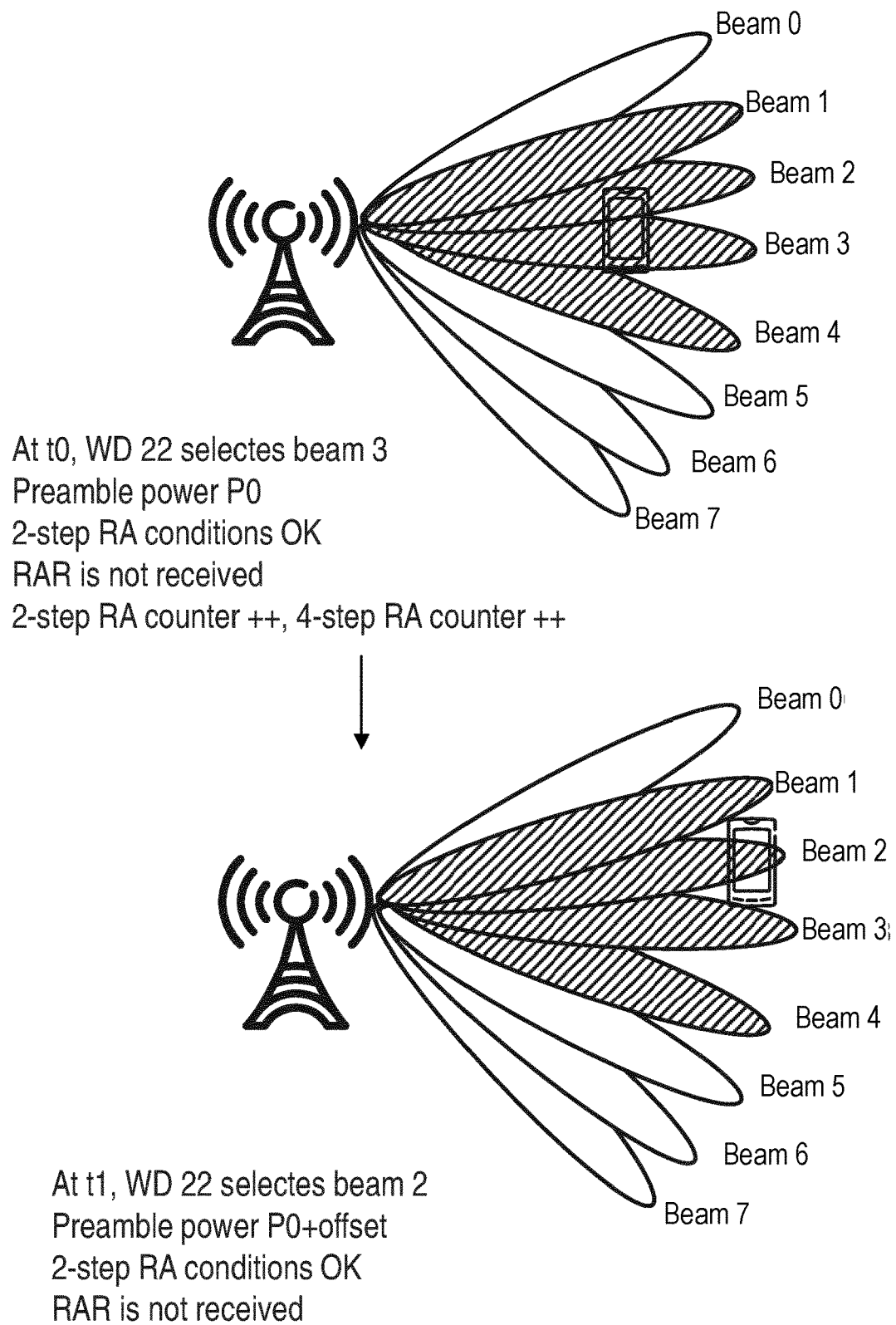
FIG. 30 illustrates beam selection followed by non-reception of RAR.

FIG. 30 is an example of WD actions when, upon lack of reception of RAR or RAR-like message, the WD 22 such as via one or more of processing circuitry 84, processor 86, radio interface 82, random access unit 34, etc., retries 2-step RA in a new beam. As can be seen, the WD 22 keeps/maintains two counters, one for 2-step RA and another one (similar to the legacy counter) for the 4-step RA. In another alternative, a single counter is defined for both 2-step RA and 4-step RA. In either case, different rules may be associated with the counters, such as the number of times the WD 22 is allowed, or required, to retry 2-step RA (when available and conditions fulfilled) before the WD 22 falls back to 4-step RA.

One aspect of the disclosure includes WD actions upon random access resource selection, i.e., upon triggering random access and selecting a beam (e.g., an SSB or a CSI-RS resource), performing 2-step RA configuration (if the selected beam has available configuration for 2-steps RA and fulfill conditions for performing 2-step RA) and then detecting an unsuccessful attempt to perform 2-step RA (e.g., by reception of a RAR-like message, like a fallback RAR, or by the expiry of a MsgB/RAR timer or a timer for a RAR-like message), which may either be a prepared fallback to 4-step RA (e.g., if the network responds to MsgA with a RAR-like message) or an unprepared fallback (e.g., if the WD 22 does not receive any response at all to MsgA). Upon that detection of an unsuccessful 2-step RA attempt, the WD 22 such as via one or more of processing circuitry 84, processor 86, radio interface 82, random access unit 34, etc., performs at least one of:

retrying RA using 2-step RA, including none, one or more of:
a) power ramping of the preamble PRACH transmission;
b) power ramping of the MsgA PUSCH (i.e., $MsgA_{PUSCH}$) transmission; and
c) beam re-selection.

Retrying RA using 4-step RA, including none, one or more of:
a) power ramping of the preamble PRACH transmission;
b) beam re-selection; and
c) choice between CFRA and CBRA.

Some embodiments also include multi-step strategies, where the WD 22 mixes choice of RA method (2-step or 4-step), beam re-selection and transmit power ramping in different orders according to different strategies.

According to one aspect, a WD 22 is configured to fall back from a two-step random access procedure. The WD 22 has processing circuitry 84 configured to, after an unsuccessful attempt to perform two-step random access, perform at least one of the following: retrying the two-step random access attempt, and performing a four-step random access procedure.

According to this aspect, in some embodiments, the retrying of the two-step random access attempt includes power ramping of a preamble physical random access channel, PRACH transmission. In some embodiments, the performing of a four-step random access procedure includes beam re-selection and selecting between contention free random access or contention based random access.

Some Example

Embodiment A1. A wireless device 22 (WD 22) configured to communicate with a network node 16, the WD 22 configured to, and/or comprising a radio interface 82 and/or processing circuitry 84 configured to:
after an unsuccessful attempt to perform two-step random access, perform at least one of:
retrying the two-step random access attempt; and
performing a four-step random access procedure.

Embodiment A2. The WD 22 of Embodiment A1, wherein the retrying of the two-step random access attempt includes power ramping of a preamble physical random access channel, PRACH transmission.

Embodiment A3. The WD 22 of Embodiment A1, wherein the performing of a four-step random access procedure includes beam re-selection and selecting between contention free random access or contention based random access.

Embodiment B1. A method implemented in a wireless device 22 (WD 22), the method comprising:
after an unsuccessful attempt to perform two-step random access, perform at least one of:
retrying the two-step random access attempt; and
performing a four-step random access procedure.

Embodiment B2. The method of Embodiment B1, wherein the of retrying the two-step random access attempt includes power ramping of a preamble physical random access channel, PRACH transmission.

Embodiment B3. The method of Embodiment B1, wherein the performing of a four-step random access procedure includes beam re-selection and selecting between contention free random access or contention based random access.

Appendix A 5.1.1 Random Access Procedure Initialization

The Random Access procedure described in this subclause is initiated by a PDCCH order, by the MAC entity itself, or by RRC for the events in accordance with 3GPP TS 38.300. There is only one Random Access procedure ongoing at any point in time in a MAC entity. The Random Access procedure on an SCell shall only be initiated by a PDCCH order with ra-PreambleIndex different from 0b000000.

NOTE 1: If a new Random Access procedure is triggered while another is already ongoing in the MAC entity, it is up to WD implementation whether to continue with the ongoing procedure or start with the new procedure (e.g., for SI request).

RRC Configures the Following Parameters for the Random Access Procedure:
prach-ConfigurationIndex: the available set of PRACH occasions for the transmission of the Random Access Preamble;
preambleReceivedTargetPower: initial Random Access Preamble power;
rsrp-ThresholdSSB: an RSRP threshold for the selection of the SSB. If the Random Access procedure is initiated for beam failure recovery, rsrp-ThresholdSSB used for the selection of the SSB within candidateBeamRSList refers to rsrp-ThresholdSSB in BeamFailureRecoveryConfig IE;
rsrp-ThresholdCSI-RS: an RSRP threshold for the selection of CSI-RS. If the Random Access procedure is initiated for beam failure recovery, rsrp-ThresholdCSI-RS is equal to rsrp-ThresholdSSB in BeamFailureRecoveryConfig IE;
rsrp-ThresholdSSB-SUL: an RSRP threshold for the selection between the NUL carrier and the SUL carrier;

candidateBeamRSList: a list of reference signals (CSI-RS and/or SSB) identifying the candidate beams for recovery and the associated Random Access parameters;

recoverySearchSpaceId: the search space identity for monitoring the response of the beam failure recovery request;

powerRampingStep: the power-ramping factor;

powerRampingStepHighPriority: the power-ramping factor in case of prioritized Random Access procedure;

scalingFactorBI: a scaling factor for prioritized Random Access procedure;

ra-PreambleIndex: Random Access Preamble;

ra-ssb-OccasionMaskIndex: defines PRACH occasion(s) associated with an SSB in which the MAC entity may transmit a Random Access Preamble (see subclause 7.4);

ra-OccasionList: defines PRACH occasion(s) associated with a CSI-RS in which the MAC entity may transmit a Random Access Preamble;

ra-PreambleStartIndex: the starting index of Random Access Preamble(s) for on-demand SI request;

preambleTransMax: the maximum number of Random Access Preamble transmission;

ssb-perRACH-OccasionAndCB-PreamblesPerSSB: defines the number of SSBs mapped to each PRACH occasion and the number of contention-based Random Access Preambles mapped to each SSB;

if groupBconfigured is configured, then Random Access Preambles group B is configured.

Amongst the contention-based Random Access Preambles associated with an SSB (as defined in 3GPP TS 38.213), the first numberOfRA-Preambles-GroupA Random Access Preambles belong to Random Access Preambles group A. The remaining Random Access Preambles associated with the SSB belong to Random Access Preambles group B (if configured).

NOTE 2: If Random Access Preambles group B is supported by the cell Random Access Preambles group B is included for each SSB.

if Random Access Preambles group B is configured:
        ra-Msg3SizeGroupA: the threshold to determine the groups of Random Access Preambles;
        msg3-DeltaPreamble: $\Delta_{PREAMBLE\_Msg3}$ in 3GPP TS 38.213;
        messagePowerOffsetGroupB: the power offset for preamble selection;
        numberOfRA-PreamblesGroupA: defines the number of Random Access Preambles in Random Access Preamble group A for each SSB.

the set of Random Access Preambles and/or PRACH occasions for SI request, if any;

the set of Random Access Preambles and/or PRACH occasions for beam failure recovery request, if any;

the set of Random Access Preambles and/or PRACH occasions for reconfiguration with sync, if any;

ra-Response Window: the time window to monitor RA response(s) (SpCell only);

ra-ContentionResolutionTimer: the Contention Resolution Timer (SpCell only). In addition, the following information for related Serving Cell is assumed to be available for WDs:

if Random Access Preambles group B is configured:
    if the Serving Cell for the Random Access procedure is configured with supplementary uplink as specified in 3GPP TS 38.331, and SUL carrier is selected for performing Random Access Procedure:
        $P_{CMAX,f,c}$ of the SUL carrier as specified in 3GPP TS 38.101-1, 3GPP TS 38.101-2, and 3GPP TS 38.101-3.
    else:
        $P_{CMAX,f,c}$ of the NUL carrier as specified in 3GPP TS 38.101-1, 3GPP TS 38.101-2, and 3GPP TS 38.101-3.

The following WD variables are used for the Random Access procedure:
    PREAMBLE_INDEX;
    PREAMBLE_TRANSMISSION_COUNTER;
    PREAMBLE_POWER_RAMPING_COUNTER;
    PREAMBLE_POWER_RAMPING STEP;
    PREAMBLE_RECEIVED_TARGET_POWER;
    PREAMBLE_BACKOFF;
    PCMAX;
    SCALING_FACTOR_BI;
    TEMPORARY_C-RNTI.

When the Random Access procedure is initiated on a Serving Cell, the MAC entity shall:
1> flush the Msg3 buffer;
1> set the PREAMBLE_TRANSMISSION_COUNTER to 1;
1> set the PREAMBLE_POWER_RAMPING_ COUNTER to 1;
1> set the PREAMBLE BACKOFF to 0 ms;
1> if the carrier to use for the Random Access procedure is explicitly signalled:
    2> select the signalled carrier for performing Random Access procedure;
    2> set the PCMAX to $P_{CMAX,f,c}$ of the signalled carrier.
1> else if the carrier to use for the Random Access procedure is not explicitly signalled; and
1> if the Serving Cell for the Random Access procedure is configured with supplementary uplink as specified in 3GPP TS 38.331; and
1> if the RSRP of the downlink pathloss reference is less than rsrp-ThresholdSSB-SUL:
    2> select the SUL carrier for performing Random Access procedure;
    2> set the PCMAX to $P_{CMAX,f,c}$ of the SUL carrier.
1> else:
    2> select the NUL carrier for performing Random Access procedure;
    2> set the PCMAX to $P_{CMAX,f,c}$ of the NUL carrier.
1> perform the BWP operation as specified in subclause 5.15;
1> set PREAMBLE_POWER_RAMPING_STEP to powerRampingStep;
1> set SCALING_FACTOR_BI to 1;
1> if the Random Access procedure was initiated for beam failure recovery (as specified in subclause 5.17); and
1> if beamFailureRecoveryConfig is configured for the active UL BWP of the selected carrier:
    2> start the beamFailureRecoveryTimer, if configured;
    2> apply the parameters powerRampingStep, preambleReceivedTargetPower, and preambleTransMax configured in the beamFailureRecoveryConfig;
    2> ifpowerRampingStepHighPriority is configured in the beamFailureRecoveryConfig:
        3> set PREAMBLE_POWER_RAMPING_STEP to the powerRampingStepHighPriority.

2> else:
   3> set PREAMBLE_POWER_RAMPING_STEP to powerRampingStep.
2> if scalingFactorBI is configured in the beamFailureRecoveryConfig:
   3> set SCALING_FACTOR_BI to the scalingFactorBI.
1> else if the Random Access procedure was initiated for handover; and
1> if rach-ConfigDedicated is configured for the selected carrier:
   2> ifpowerRampingStepHighPriority is configured in the rach-ConfigDedicated:
     3> set PREAMBLE_POWER_RAMPING_STEP to the powerRampingStepHighPriority.
   2> if scalingFactorBI is configured in the rach-ConfigDedicated:
     3> set SCALING_FACTOR_BI to the scalingFactorBI.
1> perform the Random Access Resource selection procedure (see subclause 5.1.2).

5.1.2 Random Access Resource Selection

The MAC entity shall:
1> if the Random Access procedure was initiated for beam failure recovery (as specified in subclause 5.17); and
1> if the beamFailureRecoveryTimer (in subclause 5.17) is either running or not configured; and
1> if the contention-free Random Access Resources for beam failure recovery request associated with any of the SSBs and/or CSI-RSs have been explicitly provided by RRC; and
1> if at least one of the SSBs with SS-RSRP above rsrp-ThresholdSSB amongst the SSBs in candidateBeamRSList or the CSI-RSs with CSI-RSRP above rsrp-ThresholdCSI-RS amongst the CSI-RSs in candidateBeamRSList is available:
   2> select an SSB with SS-RSRP above rsrp-ThresholdSSB amongst the SSBs in candidateBeamRSList or a CSI-RS with CSI-RSRP above rsrp-ThresholdCSI-RS amongst the CSI-RSs in candidateBeamRSList;
   2> if CSI-RS is selected, and there is no ra-PreambleIndex associated with the selected CSI-RS:
     3> set the PREAMBLE INDEX to a ra-PreambleIndex corresponding to the SSB in candidateBeamRSList which is quasi-colocated with the selected CSI-RS as specified in 3GPP TS 38.214.
   2> else:
3> set the PREAMBLE INDEX to a ra-PreambleIndex corresponding to the selected SSB or CSI-RS from the set of Random Access Preambles for beam failure recovery request.
1> else if the ra-PreambleIndex has been explicitly provided by PDCCH; and
1> if the ra-PreambleIndex is not 0b000000:
   2> set the PREAMBLE INDEX to the signalled ra-PreambleIndex;
   2> select the SSB signalled by PDCCH.
1> else if the contention-free Random Access Resources associated with SSBs have been explicitly provided in rach-ConfigDedicated and at least one SSB with SS-RSRP above rsrp-ThresholdSSB amongst the associated SSBs is available:
   2> select an SSB with SS-RSRP above rsrp-ThresholdSSB amongst the associated SSBs;
   2> set the PREAMBLE INDEX to a ra-PreambleIndex corresponding to the selected SSB.
1> else if the contention-free Random Access Resources associated with CSI-RSs have been explicitly provided in rach-ConfigDedicated and at least one CSI-RS with CSI-RSRP above rsrp-ThresholdCSI-RS amongst the associated CSI-RSs is available:
   2> select a CSI-RS with CSI-RSRP above rsrp-ThresholdCSI-RS amongst the associated CSI-RSs;
   2> set the PREAMBLE INDEX to a ra-PreambleIndex corresponding to the selected CSI-RS.
1> else if the Random Access procedure was initiated for SI request (as specified in 3GPP TS 38.331); and
1> if the Random Access Resources for SI request have been explicitly provided by RRC:
   2> if at least one of the SSBs with SS-RSRP above rsrp-ThresholdSSB is available:
     3> select an SSB with SS-RSRP above rsrp-ThresholdSSB.
   2> else:
     3> select any SSB.
   2> select a Random Access Preamble corresponding to the selected SSB, from the Random Access Preamble(s) determined according to ra-PreambleStartIndex as specified in 3GPP TS 38.331;
   2> set the PREAMBLE INDEX to selected Random Access Preamble.
1> else (i.e. for the contention-based Random Access preamble selection):
   2> if at least one of the SSBs with SS-RSRP above rsrp-ThresholdSSB is available:
     3> select an SSB with SS-RSRP above rsrp-ThresholdSSB.
   2> else:
     3> select any SSB.
   2> if Msg3 has not yet been transmitted:
     3> if Random Access Preambles group B is configured:
        4> if the potential Msg3 size (UL data available for transmission plus MAC header and, where required, MAC CEs) is greater than ra-Msg3SizeGroupA and the pathloss is less than PCMAX (of the Serving Cell performing the Random Access Procedure)−preambleReceivedTargetPower−msg3-DeltaPreamble−messagePowerOffsetGroupB; or
        4> if the Random Access procedure was initiated for the CCCH logical channel and the CCCH SDU size plus MAC subheader is greater than ra-Msg3SizeGroupA:
           5> select the Random Access Preambles group B.
        4> else:
           5> select the Random Access Preambles group A.
     3> else:
        4> select the Random Access Preambles group A.
   2> else (i.e., Msg3 is being retransmitted):
     3> select the same group of Random Access Preambles as was used for the Random Access Preamble transmission attempt corresponding to the first transmission of Msg3.
   2> select a Random Access Preamble randomly with equal probability from the Random Access Preambles associated with the selected SSB and the selected Random Access Preambles group.

2> set the PREAMBLE INDEX to the selected Random Access Preamble.
1> if the Random Access procedure was initiated for SI request (as specified in 3GPP TS 38.331); and
1> if ra-AssociationPeriodIndex and si-RequestPeriod are configured:
  2> determine the next available PRACH occasion from the PRACH occasions corresponding to the selected SSB in the association period given by ra-AssociationPeriodIndex in the si-RequestPeriod permitted by the restrictions given by the ra-ssb-OccasionMaskIndex if configured (the MAC entity shall select a PRACH occasion randomly with equal probability amongst the consecutive PRACH occasions according to subclause 8.1 of 3GPP TS 38.213 corresponding to the selected SSB).
1> else if an SSB is selected above:
  2> determine the next available PRACH occasion from the PRACH occasions corresponding to the selected SSB permitted by the restrictions given by the ra-ssb-OccasionMaskIndex if configured or indicated by PDCCH (the MAC entity shall select a PRACH occasion randomly with equal probability amongst the consecutive PRACH occasions according to subclause 8.1 of 3GPP TS 38.213, corresponding to the selected SSB; the MAC entity may take into account the possible occurrence of measurement gaps when determining the next available PRACH occasion corresponding to the selected SSB).
1> else if a CSI-RS is selected above:
  2> if there is no contention-free Random Access Resource associated with the selected CSI-RS:
    3> determine the next available PRACH occasion from the PRACH occasions, permitted by the restrictions given by the ra-ssb-OccasionMaskIndex if configured, corresponding to the SSB in candidateBeamRSList which is quasi-colocated with the selected CSI-RS as specified in 3GPP TS 38.214 (the MAC entity shall select a PRACH occasion randomly with equal probability amongst the consecutive PRACH occasions according to subclause 8.1 of 3GPP TS 38.213, corresponding to the SSB which is quasi-colocated with the selected CSI-RS; the MAC entity may take into account the possible occurrence of measurement gaps when determining the next available PRACH occasion corresponding to the SSB which is quasi-colocated with the selected CSI-RS).
  2> else:
    3> determine the next available PRACH occasion from the PRACH occasions in ra-OccasionList corresponding to the selected CSI-RS (the MAC entity shall select a PRACH occasion randomly with equal probability amongst the PRACH occasions occurring simultaneously but on different subcarriers, corresponding to the selected CSI-RS; the MAC entity may take into account the possible occurrence of measurement gaps when determining the next available PRACH occasion corresponding to the selected CSI-RS).
1> perform the Random Access Preamble transmission procedure (see subclause 5.1.3).
NOTE: When the WD determines if there is an SSB with SS-RSRP above rsrp-ThresholdSSB or a CSI-RS with CSI-RSRP above rsrp-ThresholdCSI-RS, the WD uses the latest unfiltered L1-RSRP measurement.

Appendix B 5.1.2 Random Access Resource Selection
The MAC entity shall:
1> if the Random Access procedure was initiated for beam failure recovery (as specified in subclause 5.17); and
1> if the beamFailureRecoveryTimer (in subclause 5.17) is either running or not configured; and
1> if the contention-free Random Access Resources for beam failure recovery request associated with any of the SSBs and/or CSI-RSs have been explicitly provided by RRC; and
. . .
1> else if the contention-free Random Access Resources associated with SSBs have been explicitly provided in rach-ConfigDedicated and at least one SSB with SS-RSRP above rsrp-ThresholdSSB amongst the associated SSBs is available:
. . .
1> else if the contention-free Random Access Resources associated with CSI-RSs have been explicitly provided in rach-ConfigDedicated and at least one CSI-RS with CSI-RSRP above rsrp-ThresholdCSI-RS amongst the associated CSI-RSs is available:
1> else (i.e., for the contention-based Random Access preamble selection):
. . .
1> else if an SSB is selected above:
  2> determine the next available PRACH occasion from the PRACH occasions corresponding to the selected SSB permitted by the restrictions given by the ra-ssb-OccasionMaskIndex if configured or indicated by PDCCH (the MAC entity shall select a PRACH occasion randomly with equal probability amongst the consecutive PRACH occasions according to subclause 8.1 of 3GPP TS 38.213, corresponding to the selected SSB; the MAC entity may take into account the possible occurrence of measurement gaps when determining the next available PRACH occasion corresponding to the selected SSB).
1> else if a CSI-RS is selected above:
  2> if there is no contention-free Random Access Resource associated with the selected CSI-RS:
    3> determine the next available PRACH occasion from the PRACH occasions, permitted by the restrictions given by the ra-ssb-OccasionMaskIndex if configured, corresponding to the SSB in candidateBeamRSList which is quasi-colocated with the selected CSI-RS as specified in 3GPP TS 38.214 (the MAC entity shall select a PRACH occasion randomly with equal probability amongst the consecutive PRACH occasions according to subclause 8.1 of 3GPP TS 38.213, corresponding to the SSB which is quasi-colocated with the selected CSI-RS; the MAC entity may take into account the possible occurrence of measurement gaps when determining the next available PRACH occasion corresponding to the SSB which is quasi-colocated with the selected CSI-RS).
  2> else:
    3> determine the next available PRACH occasion from the PRACH occasions in ra-OccasionList corresponding to the selected CSI-RS (the MAC entity shall select a PRACH occasion randomly with equal probability amongst the PRACH occasions occurring simultaneously but on different subcarriers, corresponding to the selected CSI-RS; the MAC entity may take into account the possible occurrence of measurement gaps when determining the next available PRACH occasion corresponding to the selected CSI-RS).

1> perform the Random Access Preamble transmission procedure (see subclause 5.1.3).

NOTE: When the WD determines if there is an SSB with SS-RSRP above rsrp-ThresholdSSB or a CSI-RS with CSI-RSRP above rsrp-ThresholdCSI-RS, the WD uses the latest unfiltered L1-RSRP measurement.

Then, in an excerpt from section 5.1.4 of 3GPP TS 28.321, we show the actions upon RAR timer expiration after preamble transmission.

5.1.4 Random Access Response Reception

Once the Random Access Preamble is transmitted and regardless of the possible occurrence of a measurement gap, the MAC entity shall:

...

1> else if a downlink assignment has been received on the PDCCH for the RA-RNTI and the received TB is successfully decoded:
  2> if the Random Access Response contains a MAC subPDU with Backoff Indicator:
    3> set the PREAMBLE BACKOFF to value of the BI field of the MAC subPDU using Table 7.2-1, multiplied with SCALING_FACTOR_BI.
  2> else:
    3> set the PREAMBLE BACKOFF to 0 ms.
  2> if the Random Access Response contains a MAC subPDU with Random Access Preamble identifier corresponding to the transmitted PREAMBLE INDEX (see subclause 5.1.3):
    3> consider this Random Access Response reception successful.
  2> if the Random Access Response reception is considered successful:
    3> if the Random Access Response includes a MAC subPDU with RAPID only:
      4> consider this Random Access procedure successfully completed;
      4> indicate the reception of an acknowledgement for SI request to upper layers.
    3> else:
      4> apply the following actions for the Serving Cell where the Random Access Preamble was transmitted:
        5> process the received Timing Advance Command (see subclause 5.2);
        5> indicate the preambleReceivedTargetPower and the amount of power ramping applied to the latest Random Access Preamble transmission to lower layers (i.e. (PREAMBLE_POWER_RAMPING_COUNTER−1)×PREAMBLE_POWER_RAMPING_STEP);
        5> if the Serving Cell for the Random Access procedure is SRS-only SCell:
          6> ignore the received UL grant.
        5> else:
          6> process the received UL grant value and indicate it to the lower layers.
      4> if the Random Access Preamble was not selected by the MAC entity among the contention-based Random Access Preamble(s):
        5> consider the Random Access procedure successfully completed.
      4> else:
        5> set the TEMPORARY C-RNTI to the value received in the Random Access Response;
        5> if this is the first successfully received Random Access Response within this Random Access procedure:
          6> if the transmission is not being made for the CCCH logical channel:
            7> indicate to the Multiplexing and assembly entity to include a C-RNTI MAC CE in the subsequent uplink transmission.
          6> obtain the MAC PDU to transmit from the Multiplexing and assembly entity and store it in the Msg3 buffer.

NOTE: If within a Random Access procedure, an uplink grant provided in the Random Access Response for the same group of contention-based Random Access Preambles has a different size than the first uplink grant allocated during that Random Access procedure, the WD behavior is not defined.

1> if ra-Response Window configured in BeamFailureRecoveryConfig expires and if a PDCCH transmission on the search space indicated by recoverySearchSpaceId addressed to the C-RNTI has not been received on the Serving Cell where the preamble was transmitted; or 1> if ra-Response Window configured in RACH-ConfigCommon expires, and if the Random Access Response containing Random Access Preamble identifiers that matches the transmitted PREAMBLE INDEX has not been received:
  2> consider the Random Access Response reception not successful;
  2> increment PREAMBLE_TRANSMISSION_COUNTER by 1;
  2> if PREAMBLE_TRANSMISSION_COUNTER= preambleTransMax+1:
    3> if the Random Access Preamble is transmitted on the SpCell:
      4> indicate a Random Access problem to upper layers;
      4> if this Random Access procedure was triggered for SI request:
        5> consider the Random Access procedure unsuccessfully completed.
    3> else if the Random Access Preamble is transmitted on a SCell:
      4> consider the Random Access procedure unsuccessfully completed.
  2> if the Random Access procedure is not completed:
    3> select a random backoff time according to a uniform distribution between 0 and the PREAMBLE BACKOFF;
    3> if the criteria (as defined in subclause 5.1.2) to select contention-free Random Access Resources is met during the backoff time:
      4> perform the Random Access Resource selection procedure (see subclause 5.1.2);
    3> else:
      4> perform the Random Access Resource selection procedure (see subclause 5.1.2) after the backoff time.

Appendix C 5.3.4 Random Access
Random access preamble sequences, of two different lengths are supported. Long sequence length 839 is applied with subcarrier spacings of 1.25 and 5 kHz and short sequence length 139 is applied with sub-carrier spacings 15, 30, 60 and 120 kHz. Long sequences support unrestricted sets and restricted sets of Type A and Type B, while short sequences support unrestricted sets only.
Multiple PRACH preamble formats are defined with one or more PRACH OFDM symbols, and different cyclic prefix and guard time. The PRACH preamble configuration to use is provided to the WD in the system information.
The WD calculates the PRACH transmit power for the retransmission of the preamble based on the most recent estimate pathloss and power ramping counter.
The system information provides information for the WD to determine the association between the SSB and the RACH resources. The RSRP threshold for SSB selection for RACH resource association is configurable by network.
In the case of 2-step random-access, the WD selects a beam (e.g., an SSB or CSI-RS) and determines if there is an association between the SSB (or CSI-RS, in case of mobility) and the 2-step random access configuration (e.g., PUSCH resources associated to the SSB). An additional RSRP threshold for SSB (or CSI-RS) selection for 2-step random access association is configurable by network and only when both conditions are fulfilled the WD performs 2-step RA (otherwise the WD performs 4-step RA).
If upon triggering 2-step RA in a selected beam the WD receives a RAR-like message (indicating the successful preamble reception but unsuccessful decoding of msg3), the WD re-selects the same beam and continues with 4-step RA (i.e., WD uses the provided UL grant in the RAR-like message to re-transmit msg3).
If upon triggering 2-step RA in a selected beam the WD does not receive a RAR-like message within the RAR time window (i.e., until the RAR timer expiry) it is up to WD implementation to either select another beam or perform power ramping (within the same beam). If the WD re-selects another beam the WD is allowed to perform 2-step RA if conditions are fulfilled (e.g., radio conditions, availability of a 2-step RA configuration and 2-step RA timer is running). Else, the WD fallback to 4-step RA.
. . .
9.2.3.2 Handover
. . .
The network configures the WD wither with 2-step or 4-step RA, in common RACH configuration, where 2-step RA may be configured per beam (as in the case of CFRA). The common RACH configuration for beams in the target cell is only associated to the SSB(s). The network can have dedicated RACH configurations associated to the SSB(s) and/or have dedicated RACH configurations associated to CSI-RS(s) within a cell. The target gNB can only include one of the following RACH configurations in the Handover Command to enable the WD to access the target cell:
  i) Common RACH configuration, possibly including 2-step RA configuration per beam;
  ii) Common RACH configuration (possibly including 2-step RA configuration per beam)+Dedicated RACH configuration associated with SSB;
  iii) Common RACH configuration (possibly including 2-step RA configuration per beam)+Dedicated RACH configuration associated with CSI-RS.

The dedicated RACH configuration allocates RACH resource(s) together with a quality threshold to use them. When dedicated RACH resources are provided, they are prioritized by the WD and the WD shall not switch to contention-based RACH resources as long as the quality threshold of those dedicated resources is met. The order to access the dedicated RACH resources is up to WD implementation. And, when common RACH resources for 2-step RA are provided, they are prioritized by the WD and the WD shall not switch to contention-based RACH resources as long as the quality threshold of those dedicated resources is met. The order to access the dedicated RACH resources is up to WD implementation.
When 2-step random access resources are provided, they are prioritized by the WD otherwise, if 4-step CFRA is provided that is prioritized, otherwise 4-step CBRA is initiated.
During handover the WD may fallback from 2-step RA to 4-step RA while timer T304 is running (and while the 2-step RA timer is running), otherwise only 4-step RA is allowed.
The following changes could be applied to the NR specifications 3GPP TS 38.321 (note that these are examples and that there are also other ways of modifying the specification to realize/support some embodiments):
5.1.1 Random Access Procedure Initialization
The Random Access procedure described in this subclause is initiated by a PDCCH order, by the MAC entity itself, or by RRC for the events in accordance with 3GPP TS 38.300. There is only one Random Access procedure ongoing at any point in time in a MAC entity. The Random Access procedure on an SCell shall only be initiated by a PDCCH order with ra-PreambleIndex different from 0b000000.
  NOTE 1: If a new Random Access procedure is triggered while another is already ongoing in the MAC entity, it is up to WD implementation whether to continue with the ongoing procedure or start with the new procedure (e.g., for SI request).
RRC configures the following parameters for the Random Access procedure:
  prach-ConfigurationIndex: the available set of PRACH occasions for the transmission of the Random Access Preamble;
  preambleReceivedTargetPower: initial Random Access Preamble power;
  rsrp-ThresholdSSB: an RSRP threshold for the selection of the SSB. If the Random Access procedure is initiated for beam failure recovery, rsrp-ThresholdSSB used for the selection of the SSB within candidateBeamRSList refers to rsrp-ThresholdSSB in BeamFailureRecoveryConfig IE;
  rsrp-ThresholdCSI-RS: an RSRP threshold for the selection of CSI-RS. If the Random Access procedure is initiated for beam failure recovery, rsrp-ThresholdCSI-RS is equal to rsrp-ThresholdSSB in BeamFailureRecoveryConfig IE;
  rsrp-ThresholdSSB-SUL: an RSRP threshold for the selection between the NUL carrier and the SUL carrier;
  candidateBeamRSList: a list of reference signals (CSI-RS and/or SSB) identifying the candidate beams for recovery and the associated Random Access parameters; that may contain a list of candidate beams with configured 2-step RA resources;
  recoverySearchSpaceId: the search space identity for monitoring the response of the beam failure recovery request;
  powerRampingStep: the power-ramping factor;
  powerRampingStepMsg3: the power-ramping factor for msg3 in 2-step RA;

powerRampingStepHighPriority: the power-ramping factor in case of prioritized Random Access procedure;
scalingFactorBI: a scaling factor for prioritized Random Access procedure;
ra-PreambleIndex: Random Access Preamble;
ra-ssb-OccasionMaskIndex: defines PRACH occasion(s) associated with an SSB in which the MAC entity may transmit a Random Access Preamble (see subclause 7.4);
ra-OccasionList: defines PRACH occasion(s) associated with a CSI-RS in which the MAC entity may transmit a Random Access Preamble;
ra-PreambleStartIndex: the starting index of Random Access Preamble(s) for on-demand SI request;
preambleTransMax: the maximum number of Random Access Preamble transmission;
ssb-perRACH-OccasionAndCB-PreamblesPerSSB: defines the number of SSBs mapped to each PRACH occasion and the number of contention-based Random Access Preambles mapped to each SSB;
if groupBconfigured is configured, then Random Access Preambles group B is configured.
Amongst the contention-based Random Access Preambles associated with an SSB (as defined in 3GPP TS 38.213), the first numberOfRA-PreamblesGroupA Random Access Preambles belong to Random Access Preambles group A. The remaining Random Access Preambles associated with the SSB belong to Random Access Preambles group B (if configured).
NOTE 2: If Random Access Preambles group B is supported by the cell Random Access Preambles group B is included for each SSB.
if Random Access Preambles group B is configured:
ra-Msg3SizeGroupA: the threshold to determine the groups of Random Access Preambles;
msg3-DeltaPreamble: $\Delta_{PREAMBLE\_Msg3}$ in 3GPP TS 38.213;
messagePowerOffsetGroupB: the power offset for preamble selection;
numberOfRA-PreamblesGroupA: defines the number of Random Access Preambles in Random Access Preamble group A for each SSB.
the set of Random Access Preambles and/or PRACH occasions for SI request, if any;
the set of Random Access Preambles and/or PRACH occasions for beam failure recovery request, if any;
the set of Random Access Preambles and/or PRACH occasions for reconfiguration with sync, if any;
ra-Response Window: the time window to monitor RA response(s) (SpCell only);
ra-ContentionResolutionTimer: the Contention Resolution Timer (SpCell only).
In addition, the following information for related Serving Cell is assumed to be available for WDs:
if Random Access Preambles group B is configured:
if the Serving Cell for the Random Access procedure is configured with supplementary uplink as specified in 3GPP TS 38.331, and SUL carrier is selected for performing Random Access Procedure:
$P_{CMAX,f,c}$ of the SUL carrier as specified in 3GPP TS 38.101-1, 3GPP TS 38.101-2, and 3GPP TS 38.101-3.
else:
$P_{CMAX,f,c}$ of the NUL carrier as specified in 3GPP TS 38.101-1, 3GPP TS 38.101-2, and 3GPP TS 38.101-3.

The following WD variables are used for the Random Access procedure:
PREAMBLE_INDEX;
PREAMBLE_TRANSMISSION_COUNTER;
PREAMBLE_POWER_RAMPING_COUNTER;
PREAMBLE_POWER_RAMPING_STEP;
PREAMBLE_RECEIVED_TARGET_POWER;
PREAMBLE_BACKOFF;
PCMAX;
SCALING_FACTOR_BI;
TEMPORARY_C-RNTL
When the Random Access procedure is initiated on a Serving Cell, the MAC entity shall:
1> flush the Msg3 buffer;
1> set the PREAMBLE_TRANSMISSION_COUNTER to 1;
1> set the PREAMBLE_POWER_RAMPING_ COUNTER to 1;
1> set the PREAMBLE BACKOFF to 0 ms;
1> if the carrier to use for the Random Access procedure is explicitly signalled:
2> select the signalled carrier for performing Random Access procedure;
2> set the PCMAX to $P_{CMAX,f,c}$ of the signalled carrier.
1> else if the carrier to use for the Random Access procedure is not explicitly signalled; and
1> if the Serving Cell for the Random Access procedure is configured with supplementary uplink as specified in 3GPP TS 38.331; and
1> if the RSRP of the downlink pathloss reference is less than rsrp-ThresholdSSB-SUL:
2> select the SUL carrier for performing Random Access procedure;
2> set the PCMAX to $P_{CMAX,f,c}$ of the SUL carrier.
1> else:
2> select the NUL carrier for performing Random Access procedure;
2> set the PCMAX to $P_{CMAX,f,c}$ of the NUL carrier.
1> perform the BWP operation as specified in subclause 5.15;
1> set PREAMBLE_POWER_RAMPING_STEP to powerRampingStep;
1> set SCALING_FACTOR_BI to 1;
1> if the Random Access procedure was initiated for beam failure recovery (as specified in subclause 5.17); and
1> if beamFailureRecoveryConfig is configured for the active UL BWP of the selected carrier:
2> start the beamFailureRecoveryTimer, if configured;
2> apply the parameters powerRampingStep, preambleReceivedTargetPower, and preambleTransMax configured in the beamFailureRecoveryConfig;
2> ifpowerRampingStepHighPriority is configured in the beamFailureRecoveryConfig:
3> set PREAMBLE_POWER_RAMPING_STEP to the powerRampingStepHighPriority.
2> else:
3> set PREAMBLE_POWER_RAMPING_STEP to powerRampingStep.
2> if scalingFactorBI is configured in the beamFailureRecoveryConfig:
3> set SCALING_FACTOR_BI to the scalingFactorBI.
1> else if the Random Access procedure was initiated for handover; and
1> if rach-ConfigDedicated is configured for the selected carrier:

2> ifpowerRampingStepHighPriority is configured in the rach-ConfigDedicated:
   3> set PREAMBLE_POWER_RAMPING_STEP to the powerRampingStepHighPriority.
2> if scalingFactorBI is configured in the rach-ConfigDedicated:
   3> set SCALING_FACTOR_BI to the scalingFactorBI.
1> perform the Random Access Resource selection procedure (see subclause 5.1.2).

5.1.2 Random Access Resource selection

The MAC entity shall:
1> if the Random Access procedure was initiated for beam failure recovery (as specified in subclause 5.17); and
1> if the beamFailureRecoveryTimer (in subclause 5.17) is either running or not configured; and
1> if 2-step Random Access Resources timer for beam failure recovery is running; and
1> if 2-step Random Access Resources for beam failure recovery request (e.g., PRACH and PUSCH resources) associated with any of the SSBs and/or CSI-RSs have been explicitly provided by RRC; and
1> if at least one of the SSBs with SS-RSRP above rsrp-ThresholdSSB2-stepRA and rsrp-ThresholdSSB amongst the SSBs in candidateBeamRSList or the CSI-RSs with CSI-RSRP above rsrp-ThresholdCSI-RS2-stepRA and rsrp-ThresholdCSI-RS and amongst the CSI-RSs in candidateBeamRSList is available:
   2> select an SSB with SS-RSRP above rsrp-ThresholdSSB and rsrp-ThresholdSSB2-stepRA amongst the SSBs in candidateBeamRSList or a CSI-RS with CSI-RSRP above rsrp-ThresholdCSI-RS2-stepRA and rsrp-ThresholdCSI-RS amongst the CSI-RSs in candidateBeamRSList;
   2> if CSI-RS is selected, and there is no ra-PreambleIndex associated with the selected CSI-RS:
     3> set the PREAMBLE INDEX to a ra-PreambleIndex corresponding to the SSB in candidateBeamRSList which is quasi-co-located with the selected CSI-RS as specified in 3GPP TS 38.214.
   2> else:
     3> set the PREAMBLE INDEX to a ra-PreambleIndex corresponding to the selected SSB or CSI-RS from the set of Random Access Preambles for beam failure recovery request.
1> else, if the contention-free Random Access Resources for beam failure recovery request associated with any of the SSBs and/or CSI-RSs have been explicitly provided by RRC; and
1> if at least one of the SSBs with SS-RSRP above rsrp-ThresholdSSB amongst the SSBs in candidateBeamRSList or the CSI-RSs with CSI-RSRP above rsrp-ThresholdCSI-RS amongst the CSI-RSs in candidateBeamRSList is available:
   2> select an SSB with SS-RSRP above rsrp-ThresholdSSB amongst the SSBs in candidateBeamRSList or a CSI-RS with CSI-RSRP above rsrp-ThresholdCSI-RS amongst the CSI-RSs in candidateBeamRSList;
   2> if CSI-RS is selected, and there is no ra-PreambleIndex associated with the selected CSI-RS:
     3> set the PREAMBLE INDEX to a ra-PreambleIndex corresponding to the SSB in candidateBeamRSList which is quasi-colocated with the selected CSI-RS as specified in 3GPP TS 38.214.
   2> else:
     3> set the PREAMBLE INDEX to a ra-PreambleIndex corresponding to the selected SSB or CSI-RS from the set of Random Access Preambles for beam failure recovery request.
1> else if the ra-PreambleIndex has been explicitly provided by PDCCH; and
1> if the ra-PreambleIndex is not 0b000000:
   2> set the PREAMBLE INDEX to the signalled ra-PreambleIndex;
   2> select the SSB signalled by PDCCH.
1> else if 2-step Random Access Resources (e.g., PRACH and PUSCH resources) associated with SSBs have been explicitly provided in by RRC (e.g., in system information or RRCReconfiguration) and at least one SSB with SS-RSRP above rsrp-ThresholdSSB2-stepRA and rsrp-ThresholdSSB and amongst the associated SSBs is available and if 2-step Random Access Resources timer is running:
   2> select an SSB with SS-RSRP above rsrp-ThresholdSSB2-stepRA and rsrp-ThresholdSSB amongst the associated SSBs (i.e. WD prioritizes 2-step RA if available and if conditions are fulfilled);
   2> set the PREAMBLE INDEX to a ra-PreambleIndex corresponding to the selected SSB.
1> else if the contention-free Random Access Resources associated with SSBs have been explicitly provided in rach-ConfigDedicated and at least one SSB with SS-RSRP above rsrp-ThresholdSSB amongst the associated SSBs is available:
   2> select an SSB with SS-RSRP above rsrp-ThresholdSSB amongst the associated SSBs;
   2> set the PREAMBLE INDEX to a ra-PreambleIndex corresponding to the selected SSB.
1> else if 2-step Random Access Resources (e.g., PRACH and PUSCH resources) associated with CSI-RS have been explicitly provided in by RRC (e.g., in system information or RRCReconfiguration) and at least one CSI-RS with CSI-RSRP above rsrp-ThresholdCSI-RS2-stepRA and rsrp-ThresholdCSI-RS and amongst the associated CSI-RSs is available and if 2-step Random Access Resources timer is running:
   2> select a CSI-RS with CSI-RSRP above rsrp-ThresholdCSI-RS2-stepRA and rsrp-ThresholdCSI-RS amongst the associated CSI-RSs;
   2> set the PREAMBLE INDEX to a ra-PreambleIndex corresponding to the selected CSI-RS.
1> else if the contention-free Random Access Resources associated with CSI-RSs have been explicitly provided in rach-ConfigDedicated and at least one CSI-RS with CSI-RSRP above rsrp-ThresholdCSI-RS amongst the associated CSI-RSs is available:
   2> select a CSI-RS with CSI-RSRP above rsrp-ThresholdCSI-RS amongst the associated CSI-RSs;
   2> set the PREAMBLE INDEX to a ra-PreambleIndex corresponding to the selected CSI-RS.
1> else if the Random Access procedure was initiated for SI request (as specified in 3GPP TS 38.331); and
1> if the Random Access Resources for SI request have been explicitly provided by RRC:
   2> if at least one of the SSBs with SS-RSRP above rsrp-ThresholdSSB is available:
     3> select an SSB with SS-RSRP above rsrp-ThresholdSSB.
   2> else:
     3> select any SSB.

2> select a Random Access Preamble corresponding to the selected SSB, from the Random Access Preamble(s) determined according to ra-PreambleStartIndex as specified in 3GPP TS 38.331; 2> set the PREAMBLE INDEX to selected Random Access Preamble.
1> else (i.e., for the 4-step contention-based Random Access preamble selection):
   2> if at least one of the SSBs with SS-RSRP above rsrp-ThresholdSSB is available:
      3> select an SSB with SS-RSRP above rsrp-ThresholdSSB.
   2> else:
      3> select any SSB.
   2> if Msg3 has not yet been transmitted:
      3> if Random Access Preambles group B is configured:
         4> if the potential Msg3 size (UL data available for transmission plus MAC header and, where required, MAC CEs) is greater than ra-Msg3SizeGroupA and the pathloss is less than PCMAX (of the Serving Cell performing the Random Access Procedure)−preambleReceivedTargetPower−msg3-DeltaPreamble−messagePowerOffsetGroupB; or
         4> if the Random Access procedure was initiated for the CCCH logical channel and the CCCH SDU size plus MAC subheader is greater than ra-Msg3SizeGroupA:
            5> select the Random Access Preambles group B.
         4> else:
            5> select the Random Access Preambles group A.
      3> else:
         4> select the Random Access Preambles group A.
   2> else (i.e., Msg3 is being retransmitted):
      3> select the same group of Random Access Preambles as was used for the Random Access Preamble transmission attempt corresponding to the first transmission of Msg3.
   2> select a Random Access Preamble randomly with equal probability from the Random Access Preambles associated with the selected SSB and the selected Random Access Preambles group.
   2> set the PREAMBLE INDEX to the selected Random Access Preamble.
1> if the Random Access procedure was initiated for SI request (as specified in 3GPP TS 38.331); and
1> if ra-AssociationPeriodIndex and si-RequestPeriod are configured:
   2> determine the next available PRACH occasion from the PRACH occasions corresponding to the selected SSB in the association period given by ra-AssociationPeriodIndex in the si-RequestPeriod permitted by the restrictions given by the ra-ssb-OccasionMaskIndex if configured (the MAC entity shall select a PRACH occasion randomly with equal probability amongst the consecutive PRACH occasions according to subclause 8.1 of 3GPP TS 38.213 corresponding to the selected SSB).
1> else if an SSB is selected above:
   2> determine the next available PRACH occasion from the PRACH occasions corresponding to the selected SSB permitted by the restrictions given by the ra-ssb-OccasionMaskIndex if configured or indicated by PDCCH (the MAC entity shall select a PRACH occasion randomly with equal probability amongst the consecutive PRACH occasions according to subclause 8.1 of 3GPP TS 38.213, corresponding to the selected SSB; the MAC entity may take into account the possible occurrence of measurement gaps when determining the next available PRACH occasion corresponding to the selected SSB).
1> else if a CSI-RS is selected above:
   2> if there is no contention-free Random Access Resource associated with the selected CSI-RS:
      3> determine the next available PRACH occasion from the PRACH occasions, permitted by the restrictions given by the ra-ssb-OccasionMaskIndex if configured, corresponding to the SSB in candidateBeamRSList which is quasi-colocated with the selected CSI-RS as specified in 3GPP TS 38.214 (the MAC entity shall select a PRACH occasion randomly with equal probability amongst the consecutive PRACH occasions according to subclause 8.1 of 3GPP TS 38.213, corresponding to the SSB which is quasi-colocated with the selected CSI-RS; the MAC entity may take into account the possible occurrence of measurement gaps when determining the next available PRACH occasion corresponding to the SSB which is quasi-colocated with the selected CSI-RS).
   2> else:
      3> determine the next available PRACH occasion from the PRACH occasions in ra-OccasionList corresponding to the selected CSI-RS (the MAC entity shall select a PRACH occasion randomly with equal probability amongst the PRACH occasions occurring simultaneously but on different subcarriers, corresponding to the selected CSI-RS; the MAC entity may take into account the possible occurrence of measurement gaps when determining the next available PRACH occasion corresponding to the selected CSI-RS).
1> perform the Random Access Preamble transmission procedure (see subclause 5.1.3).
NOTE: When the WD determines if there is an SSB with SS-RSRP above rsrp-ThresholdSSB or a CSI-RS with CSI-RSRP above rsrp-ThresholdCSI-RS, the WD uses the latest unfiltered L1-RSRP measurement.

5.1.3 Random Access Preamble transmission

The MAC entity shall, for each Random Access Preamble:
   1> if PREAMBLE_TRANSMISSION_COUNTER is greater than one; and
   1> if the notification of suspending power ramping counter has not been received from lower layers; and
   1> if SSB or CSI-RS selected is not changed from the selection in the last Random Access Preamble transmission:
      2> increment PREAMBLE_POWER_RAMPING_COUNTER by 1.
1> select the value of DELTA_PREAMBLE according to subclause 7.3;
1> set PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP;
1> except for contention-free Random Access Preamble for beam failure recovery request, compute the RA-RNTI associated with the PRACH occasion in which the Random Access Preamble is transmitted;

1> instruct the physical layer to transmit the Random Access Preamble using the selected PRACH occasion, corresponding RA-RNTI (if available), PREAMBLE_INDEX and PREAMBLE_RECEIVED_TARGET_POWER.

The RA-RNTI associated with the PRACH occasion in which the Random Access Preamble is transmitted, is computed as:

RA-RNTI=1+s_id+14×t_id+14×80×f_id+14×80×8×ul_carrier_id where s_id is the index of the first OFDM symbol of the PRACH occasion (0≤s_id≤14), t_id is the index of the first slot of the PRACH occasion in a system frame (0≤t_id<80), where the subcarrier spacing to determine t_id is based on the value of μ specified in subclause 5.3.2 in 3GPP TS 38.211, fid is the index of the PRACH occasion in the frequency domain (0≤f_id<8), and ul_carrier_id is the UL carrier used for Random Access Preamble transmission (0 for NUL carrier, and 1 for SUL carrier).

5.1.4 Random Access Response reception

Once the Random Access Preamble is transmitted and regardless of the possible occurrence of a measurement gap, and regardless of the possible joint transmission with msg3 in 2-step RA, the MAC entity shall:

1> if the contention-free Random Access Preamble for beam failure recovery request was transmitted by the MAC entity:
  2> start the ra-ResponseWindow configured in BeamFailureRecoveryConfig at the first PDCCH occasion as specified in 3GPP TS 38.213 from the end of the Random Access Preamble transmission;
  2> monitor for a PDCCH transmission on the search space indicated by recoverySearchSpaceId of the SpCell identified by the C-RNTI while ra-ResponseWindow is running.
1> else:
  2> start the ra-ResponseWindow configured in RACH-ConfigCommon at the first PDCCH occasion as specified in 3GPP TS 38.213 from the end of the Random Access Preamble transmission;
  2> monitor the PDCCH of the SpCell for Random Access Response(s) identified by the RA-RNTI while the ra-ResponseWindow is running.
1> if notification of a reception of a PDCCH transmission on the search space indicated by recoverySearchSpaceId is received from lower layers on the Serving Cell where the preamble was transmitted; and
1> if PDCCH transmission is addressed to the C-RNTI; and
1> if the contention-free Random Access Preamble for beam failure recovery request was transmitted by the MAC entity:
  2> consider the Random Access procedure successfully completed.
1> else if a downlink assignment has been received on the PDCCH for the RA-RNTI and the received TB is successfully decoded:
  2> if the Random Access Response contains a MAC subPDU with Backoff Indicator:
    3> set the PREAMBLE BACKOFF to value of the BI field of the MAC subPDU using Table 7.2-1, multiplied with SCALING_FACTOR_BI.
  2> else:
    3> set the PREAMBLE BACKOFF to 0 ms.
  2> if the Random Access Response contains a MAC subPDU with Random Access Preamble identifier corresponding to the transmitted PREAMBLE_INDEX (see subclause 5.1.3):
    3> consider this Random Access Response reception successful.
  2> if the Random Access Response reception is considered successful:
    3> if the Random Access Response includes a MAC subPDU with RAPID only:
      4> consider this Random Access procedure successfully completed;
      4> indicate the reception of an acknowledgement for SI request to upper layers.
    3> else:
      4> apply the following actions for the Serving Cell where the Random Access Preamble was transmitted:
        5> process the received Timing Advance Command (see subclause 5.2);
        5> indicate the preambleReceivedTargetPower and the amount of power ramping applied to the latest Random Access Preamble transmission to lower layers (i.e., (PREAMBLE_POWER_RAMPING_COUNTER−1)×PREAMBLE_POWER_RAMPING_STEP);
        5> if the Serving Cell for the Random Access procedure is SRS-only SCell:
          a 6> ignore the received UL grant.
        5> else:
          b 6> process the received UL grant value and indicate it to the lower layers.
      4> if the Random Access Preamble was not selected by the MAC entity among the contention-based Random Access Preamble(s):
        5> consider the Random Access procedure successfully completed.
      4> else:
        5> set the TEMPORARY C-RNTI to the value received in the Random Access Response;
        5> if this is the first successfully received Random Access Response within this Random Access procedure:
          c 6> if the transmission is not being made for the CCCH logical channel:
            7> indicate to the Multiplexing and assembly entity to include a C-RNTI MAC CE in the subsequent uplink transmission.
          d 6> obtain the MAC PDU to transmit from the Multiplexing and assembly entity and store it in the Msg3 buffer.

NOTE: If within a Random Access procedure, an uplink grant provided in the Random Access Response for the same group of contention-based Random Access Preambles has a different size than the first uplink grant allocated during that Random Access procedure, the WD behavior is not defined.

1> if ra-Response Window configured in BeamFailureRecoveryConfig expires and if a PDCCH transmission on the search space indicated by recoverySearchSpaceId addressed to the C-RNTI has not been received on the Serving Cell where the preamble was transmitted; or
1> if ra-ResponseWindow2stepRA configured in BeamFailureRecoveryConfig expires and if a PDCCH transmission on the search space indicated by recoverySearchSpaceId addressed to the C-RNTI has not been received on the Serving Cell where the preamble was transmitted; or
1> if ra-ResponseWindow2stepRA configured in RACH-ConfigCommon expires, and if the Random Access Response containing Random Access Preamble identifiers that matches the transmitted PREAMBLE INDEX has not been received; or
1> if ra-Response Window configured in RACH-Config-Common expires, and if the Random Access Response containing Random Access Preamble identifiers that matches the transmitted PREAMBLE_INDEX has not been received:
  2> consider the Random Access Response reception not successful;
  2> increment PREAMBLE_TRANSMISSION_COUNTER by 1;
  2> if this is a 2-step RA attempt:
    3> increment PREAMBLE_TRANSMISSION_COUNTER_2_STEP_RA by 1;
      4> if PREAMBLE_TRANSMISSION_ COUNTER_ 2_STEP_RA=preambleTransMax2Step+1:
        5> if the Random Access Preamble is transmitted on the SpCell:
          6> indicate a 2-step RA problem to upper layers;
          6> if this Random Access procedure was triggered for SI request:
            7> consider the 2-step RA procedure unsuccessfully completed.
        5> else if the Random Access Preamble is transmitted on a SCell:
          6> consider the 2-step RA procedure unsuccessfully completed.
        5> continue the procedure with 4-step RA only.
  2> if PREAMBLE_TRANSMISSION_COUNTER= preambleTransMax+1:
    3> if the Random Access Preamble is transmitted on the SpCell:
      4> indicate a Random Access problem to upper layers;
      4> if this Random Access procedure was triggered for SI request:
        5> consider the Random Access procedure unsuccessfully completed.
    3> else if the Random Access Preamble is transmitted on a SCell:
      4> consider the Random Access procedure unsuccessfully completed.
  2> if the Random Access procedure is not completed:
    3> select a random backoff time according to a uniform distribution between 0 and the PREAMBLE BACKOFF;
    3> if the criteria (as defined in subclause 5.1.2) to select contention-free Random Access Resources is met during the backoff time:
      4> perform the Random Access Resource selection procedure (see subclause 5.1.2);
    3> else:
      4> perform the Random Access Resource selection procedure (see subclause 5.1.2) after the backoff time.

The MAC entity may stop ra-Response Window (and hence monitoring for Random Access Response(s)) after successful reception of a Random Access Response containing Random Access Preamble identifiers that matches the transmitted PREAMBLE_INDEX.

HARQ operation is not applicable to the Random Access Response reception.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C"

programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| 3GPP | 3rd Generation Partnership Project |
| 4G | 4th Generation |
| 5G | 5th Generation |
| 5GC | 5G Core network |
| 5GS | 5G System |
| AMF | Access and Mobility Management Function |
| BFR | Beam Failure Recovery |
| CBRA | Contention-Based Random Access |
| CCA | Clear Channel Assessment |
| CFRA | Contention-Free Random Access |
| CN | Core Network |
| C-RNTI | Cell Radio Network Temporary Identifier |
| CRS | Cell specific Reference Signal |
| DCI | Downlink Control Information |
| DL | Downlink |
| DMRS | Demodulation Reference Signal |
| eNB | Evolved NodeB (A radio base station in LTE.) |
| EPC | Evolved Packet Core |
| EPS | Evolved Packet System |
| E-UTRA | Evolved Universal Terrestrial Radio Access |
| E-UTRAN | Evolved Universal Terrestrial Radio Access Network |
| GHz | Gigahertz |
| gNB | A radio base station in NR. |
| HO | Handover |
| IE | Information Element |
| kHz | kilohertz |
| LAA | License Assisted Access |
| LBT | Listen Before Talk |
| LTE | Long Term Evolution |
| MAC | Medium Access Control |
| MCS | Modulation and Coding Scheme |
| MIB | Master Information Block |
| MME | Mobility Management Entity |
| ms | millisecond |
| Msg | Message |
| NGC | Next Generation Core |
| NG-RAN | Next Generation RAN |
| NR | New Radio |
| NR-U | NR Unlicensed (I.e. NR operated in unlicensed spectrum.) |
| OFDM | Orthogonal Frequency Division Multiplex |
| O&M | Operation and Maintenance |
| PBCH | Physical Broadcast Channel |
| PCI | Physical Cell Identity |
| PDCCH | Physical Downlink Control Channel |
| PDSCH | Physical Downlink Shared Channel |
| PRACH | Physical Random Access Channel |
| PSS | Primary Synchronization Signal |
| PUCCH | Physical Uplink Control Channel |

-continued

| Abbreviation | Explanation |
| --- | --- |
| PUSCH | Physical Uplink Shared Channel |
| RA | Random Access |
| RACH | Random Access Channel |
| RAN | Radio Access Network |
| RB | Resource Block |
| RMSI | Remaining Minimum System Information |
| RNTI | Radio Network Temporary Identifier |
| RRC | Radio Resource Control |
| RTT | Round trip time |
| S1 | The interface between the RAN and the CN in EPS/LTE (i.e. between E-UTRAN and EPC) |
| SCS | Subcarrier Spacing |
| SGW | Serving Gateway |
| SI | System Information |
| SIB | System Information Block |
| SON | Self-Organizing Network/Self-Optimizing Network |
| SRB | Signaling Radio Bearer |
| SS | Synchronization Signal |
| SSB | Synchronization Signal Block |
| SSS | Secondary Synchronization Signal |
| TA | Timing Advance |
| TDD | Time Division Duplex |
| TS | Technical Specification |
| TSG | Technical Specification Group |
| UE | User Equipment |
| UL | Uplink |
| UPF | User Plane Function |
| URLLC | Ultra Reliable Low Latency Communication |
| Uu | The interface between the RAN and the WD (e.g. between a gNB and a WD in NR). |
| WG | Working Group |
| X2 | The interface/reference point between two eNBs. |
| Xn | The interface/reference point between two gNBs. |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A wireless device configured to communicate with a network node, the wireless device comprising:
processing circuitry configured to:
trigger a random access (RA) process;
select a first beam for the RA process, the selected first beam being associated with a two-step RA configuration, a characteristic of the selected first beam being determined to meet a predefined threshold;
perform a two-step RA process associated with the two-step RA configuration using the selected first beam;
determine that a step of the two-step RA process has failed; and
in response to determining the step of the two-step RA process has failed, retransmit an uplink shared channel portion of a message A, msgA, of the two-step RA process as an uplink shared channel message in a four step RA process.

2. The wireless device of claim 1, wherein the processing circuitry is further configured to:
receive system information; and
determine whether the selected first beam is associated with the two-step RA configuration based at least on the system information, the two-step RA configuration corresponding to a mapping of the selected first beam to a physical uplink shared channel, PUSCH, configuration.

3. The wireless device of claim 1, wherein the selected first beam is selected from a plurality of beams, a subset of the plurality of beams being associated with the two-step RA configuration.

4. The wireless device of claim 3, wherein the subset of the plurality of beams are one of a subset of synchronization signal blocks, SSBs, beams and a set of channel state information reference signal, CSI-RS, beams.

5. The wireless device of claim 1, wherein the characteristic of the selected first beam is a channel quality and the predefined threshold is a channel quality threshold.

6. The wireless device of claim 3, wherein the determination that the step of the two-step RA process has failed comprises receiving a fallback random access response, RAR.

7. The wireless device of claim 6, wherein the determination that the step of the two-step RA process has failed based on one of:
an absence of a response to the msgA;
receiving a random access response, RAR, message that includes fallback information; and
receiving a message B, msgB, containing first information indicating that the step of the two-step RA process has failed.

8. The wireless device of claim 6, wherein the retransmission is performed based on reselection of a beam from the plurality of beams, the reselection includes using contention-free RA resources configured for one of channel state information reference signal, CSI-RS, and synchronization signal block, SSB.

9. A method implemented by a wireless device that is configured to communicate with a network node, the method comprising:
triggering a random access (RA) process;
selecting a first beam for the RA process, the selected first beam being associated with a two-step RA configuration, a characteristic of the selected first beam being determined to meet a predefined threshold;
performing a two-step RA process associated with the two-step RA configuration using the selected first beam;
determining that a step of the two-step RA process has failed; and
in response to determining the step of the two-step RA process has failed, retransmitting an uplink shared channel portion of a message A, msgA, of the two-step RA process as an uplink shared channel message in a four step RA process.

10. The method of claim 9, further comprising:
receiving system information; and
determining whether the selected first beam is associated with the two-step RA configuration based at least on the system information, the two-step RA configuration corresponding to a mapping of the selected first beam to a physical uplink shared channel, PUSCH, configuration.

11. The method of claim 9, wherein the selected first beam is selected from a plurality of beams, a subset of the plurality of beams being associated with the two-step RA configuration.

12. The method of claim 11, wherein the subset of the plurality of beams are one of a subset of synchronization signal blocks, SSBs, beams and a set of channel state information reference signal, CSI-RS, beams.

13. The method of claim 12, wherein the subset of SSBs beams are associated with contention free RA resources for contention free RA.

14. The method of claim 12, wherein at least one other beam of the plurality of beams is not associated with the two-step RA configuration.

15. The method of claim 11, wherein the retransmission is performed based on reselection of a beam from the plurality of beams, the reselection includes using contention-free RA resources configured for one of channel state information reference signal, CSI-RS, and synchronization signal block, SSB.

16. A network node configured to communicate with a wireless device, the network node comprising:
processing circuitry configured to:
associate a plurality of beams with a plurality of random access, RA, configurations, a first beam of the plurality of beams being associated with a two-step RA configuration;
perform a two-step RA process using the first beam based on the two-step RA configuration associated with the first beam;
determine that a step of the two-step RA process has failed; and
in response to the failed step of the two-step RA process, receive a retransmission of uplink shared channel portion of a message A, msgA, of the two-step RA process as an uplink shared channel message in a four step RA process.

17. The network node of claim 16, wherein one of:
the processing circuitry is further configured to transmit system information, the system information indicating the plurality of RA configurations; and
a subset of the plurality of beams are associated with the two-step RA configuration.

18. The network node of claim 16, wherein one of:
the subset of the plurality of beams are one of a subset of synchronization signal blocks, SSBs, beams and a set of channel state information reference signal, CSI-RS, beams; and
the subset of SSBs beams are associated with contention free RA resources for contention free RA.

19. The network node of claim 16, wherein the processing circuitry is further configured to,
in response to the determination that the step of the two-step RA process has failed, transmit a fallback random access response, RAR.

20. The network node of claim 16, wherein the processing circuitry is further configured to
in response to the determination that the step of the two-step RA process has failed, one of:
transmit a random access response, RAR, message that includes fallback information; and
transmit a message B, msgB, containing first information indicating that the step of the two-step RA process has failed.

21. A method implemented by a network node that is configured to communicate with a wireless device, the method comprising:
associating a plurality of beams with a plurality of random access, RA, configurations, a first beam of the plurality of beams being associated with a two-step RA configuration;
performing a two-step RA process using the first beam based on the two-step RA configuration associated with the first beam;

determining a step of the two-step RA process has failed; and in response to the failed step of the two-step RA process, receiving a retransmission of uplink shared channel portion of a message A, msgA, of the two-step RA process as an uplink shared channel message in a four step RA process.

22. The method of claim 21, further comprising transmitting system information, the system information indicating the plurality of RA configurations.

23. The method of claim 21, wherein a subset of the plurality of beams are associated with the two-step RA configuration; and wherein the subset of the plurality of beams are one of a subset of synchronization signal blocks, SSBs, beams and a set of channel state information reference signal, CSI-RS, beams.

24. The method of claim 21, further comprising:
in response to the determination that the step of the two-step RA process has failed, transmitting a fallback random access response, RAR.

25. The method of claim 21, further comprising:
in response to the determination that the step of the two-step RA process has failed, one of:
transmitting a random access response, RAR, message that includes fallback information; and
transmitting a message B, msgB, containing first information indicating that the step of the two-step RA process has failed.

* * * * *